(12) United States Patent
Bowling et al.

(10) Patent No.: US 12,472,003 B2
(45) Date of Patent: Nov. 18, 2025

(54) SYSTEMS AND METHODS FOR GUIDING MOVEMENT OF A TOOL

(71) Applicant: MAKO Surgical Corp., Weston, FL (US)

(72) Inventors: David Gene Bowling, Los Ranchos De Albuquerque, NM (US); Richard Thomas DeLuca, Kalamazoo, MI (US); Michael Dale Dozeman, Portage, MI (US); Patrick Roessler, Merzhausen (DE); Michael Ferko, Warwick, NY (US); Gregory Garcia, Parkland, FL (US); Rishabh Khurana, Fort Lauderdale, FL (US)

(73) Assignee: MAKO Surgical Corp., Weston, FL (US)

( * ) Notice: Subject to any disclaimer, the term of this patent is extended or adjusted under 35 U.S.C. 154(b) by 496 days.

(21) Appl. No.: 17/701,989

(22) Filed: Mar. 23, 2022

(65) Prior Publication Data
US 2022/0233251 A1 Jul. 28, 2022

Related U.S. Application Data

(63) Continuation of application No. PCT/US2020/053548, filed on Sep. 30, 2020.
(Continued)

(51) Int. Cl.
A61B 34/20 (2016.01)
A61B 34/00 (2016.01)
(Continued)

(52) U.S. Cl.
CPC .............. *A61B 34/20* (2016.02); *A61B 34/35* (2016.02); *A61B 34/76* (2016.02);
(Continued)

(58) Field of Classification Search
CPC ......... A61B 34/20; A61B 34/35; A61B 34/76; A61B 2034/104; A61B 2034/107;
(Continued)

(56) References Cited

U.S. PATENT DOCUMENTS

| 5,118,907 | A | * | 6/1992 | Stout | ...................... | H02G 11/02 |
| | | | | | | 174/69 |
| 7,725,162 | B2 | * | 5/2010 | Malackowski | ........ | A61B 90/36 |
| | | | | | | 606/1 |

(Continued)

FOREIGN PATENT DOCUMENTS

| CN | 107635486 A | 1/2018 |
| CN | 109152615 A | 1/2019 |

(Continued)

OTHER PUBLICATIONS

Catto, Erin, "Modeling and Solving Constraints", 2018, 81 pages.
(Continued)

*Primary Examiner* — Robert F Long
(74) *Attorney, Agent, or Firm* — Howard & Howard Attorneys PLLC

(57) ABSTRACT

Systems and methods are provided for guiding movement of a tool. The system includes a tool and a manipulator. A guide handler obtains a target state for the tool and generates virtual constraints based on the target state and a current state of the tool. A constraint solver calculates a constraint force adapted to attract the tool toward the target state or repel the tool away from the target state based on the virtual constraints. A virtual simulator simulates dynamics of the tool in a virtual simulation based on the constraint force and input from one or more sensors, to output a commanded pose. The control system commands the manipulator to move the tool based on the commanded pose to thereby provide haptic feedback to the user that guides the user (Continued)

toward placing the tool at the target state or away from target state.

32 Claims, 30 Drawing Sheets

Related U.S. Application Data

(60) Provisional application No. 62/908,056, filed on Sep. 30, 2019.

(51) Int. Cl.
*A61B 34/35* (2016.01)
*A61B 34/10* (2016.01)
*A61B 90/00* (2016.01)

(52) U.S. Cl.
CPC ... *A61B 2034/104* (2016.02); *A61B 2034/107* (2016.02); *A61B 2034/2055* (2016.02); *A61B 2090/066* (2016.02)

(58) Field of Classification Search
CPC ...... A61B 2034/2055; A61B 2090/066; A61B 2034/102; A61B 34/70; A61B 34/30; A61B 2018/00565; A61B 34/10
USPC ................................ 227/175.1–182.1, 8, 19
See application file for complete search history.

(56) References Cited

U.S. PATENT DOCUMENTS

| | | | |
|---|---|---|---|
| 7,747,311 B2* | 6/2010 | Quaid, III | A61B 34/74 345/157 |
| 7,831,292 B2 | 11/2010 | Quaid et al. | |
| 8,010,180 B2 | 8/2011 | Quaid et al. | |
| 8,095,200 B2 | 1/2012 | Quaid, III | |
| 8,317,746 B2 | 11/2012 | Sewell et al. | |
| 8,394,054 B2 | 3/2013 | Wallace et al. | |
| 8,657,781 B2 | 2/2014 | Sewell et al. | |
| 9,008,757 B2 | 4/2015 | Wu | |
| 9,119,655 B2 | 9/2015 | Bowling et al. | |
| 9,345,544 B2* | 5/2016 | Hourtash | A61B 34/30 |
| 9,566,122 B2 | 2/2017 | Bowling et al. | |
| 9,566,125 B2 | 2/2017 | Bowling et al. | |
| 9,681,920 B2 | 6/2017 | Bowling et al. | |
| 9,707,043 B2 | 7/2017 | Bozung | |
| 9,757,203 B2* | 9/2017 | Hourtash | B25J 9/1607 |
| 9,775,682 B2 | 10/2017 | Quaid et al. | |
| 9,937,014 B2 | 4/2018 | Bowling et al. | |
| 9,974,613 B2 | 5/2018 | Kang et al. | |
| 10,117,713 B2 | 11/2018 | Moctezuma de la Barrera et al. | |
| 10,492,875 B2 | 12/2019 | Janik et al. | |
| 10,568,640 B2 | 2/2020 | Bozung | |
| 10,828,120 B2 | 11/2020 | Kostrzewski et al. | |
| 11,234,775 B2 | 2/2022 | Shiels et al. | |
| 11,298,191 B2 | 4/2022 | Quaid, III | |
| 11,937,881 B2 | 3/2024 | Roessler | |
| 11,944,392 B2 | 4/2024 | Krebs et al. | |
| 12,035,986 B2 | 7/2024 | Bowling et al. | |
| 2004/0024311 A1* | 2/2004 | Quaid, III | A61B 90/39 600/428 |
| 2004/0106916 A1* | 6/2004 | Quaid | A61B 34/71 606/1 |
| 2004/0267121 A1* | 12/2004 | Sarvazyan | A61B 90/36 600/587 |
| 2007/0013336 A1* | 1/2007 | Nowlin | A61B 34/37 318/568.21 |
| 2007/0138992 A1* | 6/2007 | Prisco | A61B 34/70 318/568.21 |
| 2008/0221591 A1* | 9/2008 | Farritor | A61B 34/70 606/130 |
| 2009/0000627 A1* | 1/2009 | Quaid | A61N 1/3605 128/898 |
| 2011/0257661 A1 | 10/2011 | Choi et al. | |
| 2011/0307020 A1* | 12/2011 | Geist | A61B 34/70 606/86 R |
| 2012/0330429 A1 | 12/2012 | Axelson, Jr. et al. | |
| 2013/0060278 A1 | 3/2013 | Bozung et al. | |
| 2014/0276949 A1 | 9/2014 | Staunton et al. | |
| 2015/0173840 A1* | 6/2015 | Lohmeier | A61B 17/00 606/130 |
| 2015/0265358 A1 | 9/2015 | Bowling et al. | |
| 2015/0289941 A1* | 10/2015 | Bowling | A61B 34/30 606/130 |
| 2015/0366624 A1 | 12/2015 | Kostrzewski et al. | |
| 2016/0228204 A1* | 8/2016 | Quaid | A61B 34/10 |
| 2016/0278870 A1 | 9/2016 | Quaid et al. | |
| 2016/0314710 A1* | 10/2016 | Jarc | G09B 23/28 |
| 2017/0095301 A1* | 4/2017 | Brisson | B25J 9/1607 |
| 2017/0128136 A1 | 5/2017 | Post | |
| 2018/0325608 A1 | 11/2018 | Kang et al. | |
| 2018/0326507 A1* | 11/2018 | Halvorsen | B25J 9/1679 |
| 2018/0353253 A1 | 12/2018 | Bowling | |
| 2019/0090966 A1 | 3/2019 | Kang et al. | |
| 2019/0110850 A1* | 4/2019 | Hares | B25J 9/1689 |
| 2019/0133790 A1 | 5/2019 | Viscardi et al. | |
| 2019/0133791 A1 | 5/2019 | Yadav et al. | |
| 2019/0206565 A1* | 7/2019 | Shelton, IV | A61B 90/90 |
| 2019/0314097 A1* | 10/2019 | Diolaiti | A61B 17/00 |
| 2020/0205919 A1 | 7/2020 | Penny | |
| 2020/0237468 A1 | 7/2020 | Johnson | |
| 2020/0253678 A1* | 8/2020 | Hulford | A61B 34/25 |
| 2020/0281676 A1 | 9/2020 | Rohs et al. | |
| 2021/0016445 A1 | 1/2021 | Zhou et al. | |
| 2021/0038333 A1 | 2/2021 | Kostrzewski et al. | |
| 2021/0063205 A1 | 3/2021 | LeBoeuf, II et al. | |
| 2021/0228288 A1 | 7/2021 | Crawford et al. | |
| 2021/0298795 A1 | 9/2021 | Bowling et al. | |
| 2021/0298846 A1 | 9/2021 | Dozeman et al. | |
| 2021/0338331 A1 | 11/2021 | Quaid, III | |
| 2022/0032473 A1* | 2/2022 | Maret | A61B 34/74 |
| 2023/0255701 A1* | 8/2023 | Post | A61B 34/30 606/82 |
| 2023/0270510 A1* | 8/2023 | Diolaiti | A61B 34/37 606/1 |
| 2024/0081934 A1* | 3/2024 | Khurana | A61B 34/32 |
| 2025/0221782 A1* | 7/2025 | Dozeman | A61B 17/14 |

FOREIGN PATENT DOCUMENTS

| | | | |
|---|---|---|---|
| CN | 109688963 A | 4/2019 | |
| EP | 3705074 A1 | 9/2020 | |
| TW | 200304608 A * | 10/2003 | A61B 90/36 |
| WO | 03077101 A2 | 9/2003 | |
| WO | 2017147596 A1 | 8/2017 | |
| WO | 2021011646 A2 | 1/2021 | |
| WO | 2022055980 A1 | 3/2022 | |

OTHER PUBLICATIONS

International Search Report for Application No. PCT/US2020/053548 dated Jan. 19, 2021, 3 pages.
Tamis, Marijn et al., "Constrain Based Physics Solver", Version 1.02, http://www.mft-spirit.nl/files/MTamis_ConstraintBasedPhysics-Solver.pdf, Jun. 15, 2015, 31 pages.
Tamis, Marijn, "Comparison Between Projected Gauss-Seidel and Sequential Impulse Solvers for Real-Time Physics Simulations," Version 1.01, http://www.mft-spirit.nl/files/MTamis_PGS_SI_Comparison.pdf, Jul. 1, 2015, 11 pages.
English language abstract for CN 109152615 A extracted from espacenet.com database on Feb. 10, 2025, 2 pages.
English language abstract for CN 107635486 A extracted from espacenet.com database on Feb. 10, 2025, 2 pages.
English language abstract for CN 109688963 A extracted from espacenet.com database on Feb. 10, 2025, 2 pages.

* cited by examiner

Constraint Equation

- Calculate force for each constraint ($F_{p_i}$) in constraint space by solving system of n linear equations ($Ax = b \rightarrow x = A^{-1}b = F = (M^{-1})^{-1}a$)

$$F_p = \left(J_p M^{-1} J_p^T + \frac{C}{\Delta t}\right)^{-1} \left(\frac{v_{p_2}}{\Delta t} - \frac{J_p v_{cg_1}}{\Delta t} - \frac{\epsilon \Delta d}{\Delta t^2} - \left(J_p M^{-1} + \frac{C}{\Delta t} J_p^{-T}\right)(F_{inertial} + F_{damping} + F_{cg_{ext}})\right) \geq 0$$

FIG. 12

Forward Dynamics Algorithm

Configuration Parameters :

Mass matrix, $M_{6DOF}$ [6 × 6] combination of Mass and Inertia [3 × 3] matrices Velocity Limits, $v_{max}$, $\omega_{max}$ Inputs :

initial pose, $_n^0T(t_0)$ initial velocity, $^n v(t_0)$ total force applied at CG, $^n F_{total}$ time interval, dT Outputs :

final pose, $_n^0T(t_0 + dT)$ final velocity, $^n v(t_0 + dT)$

FIG. 13

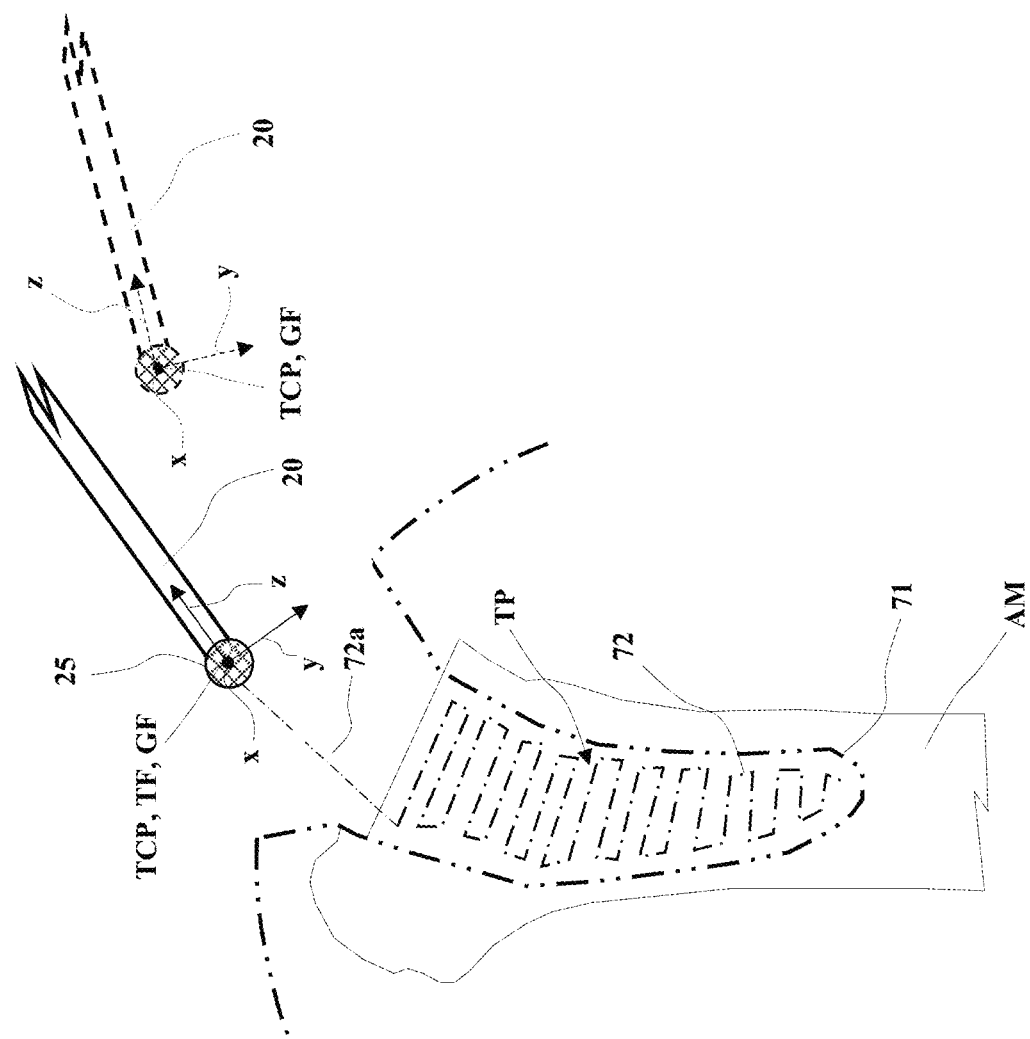

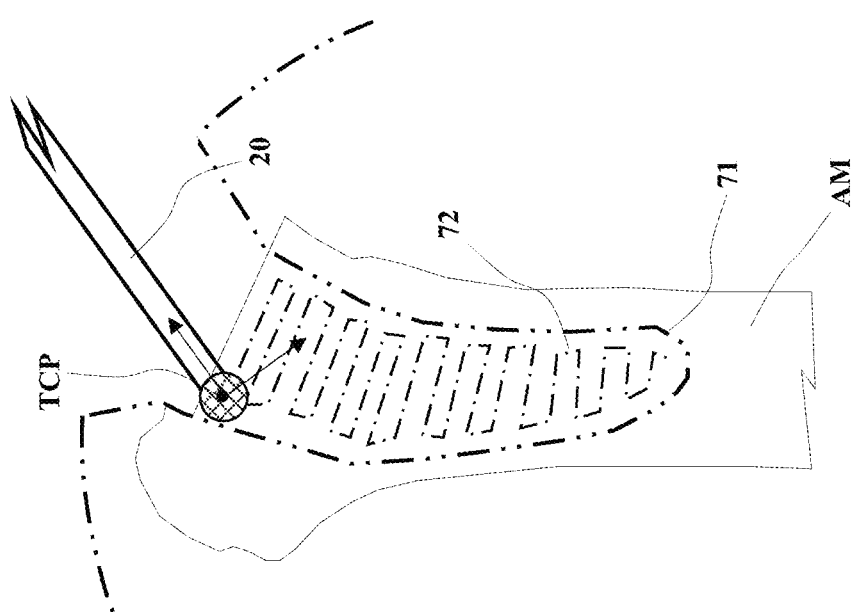

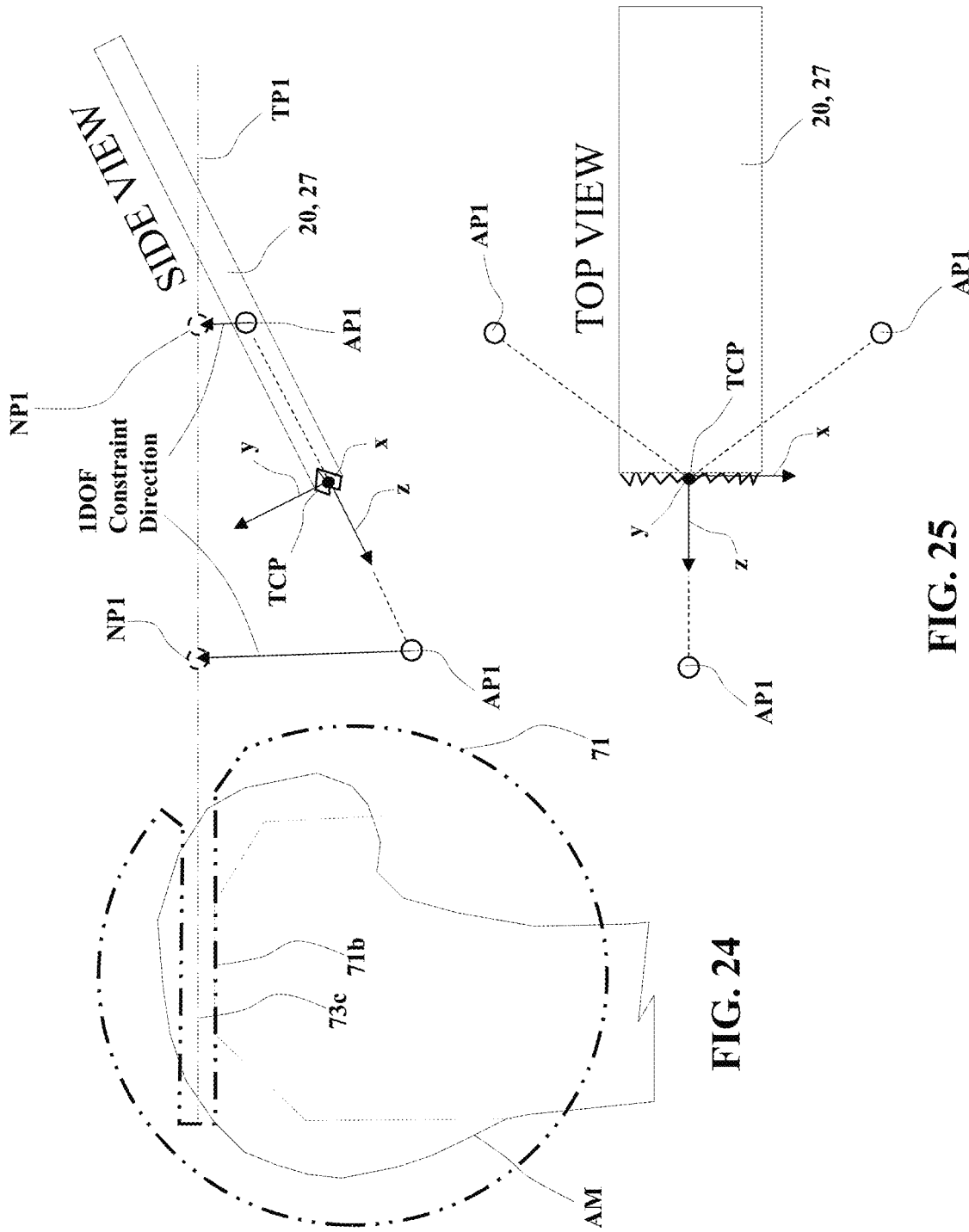

SYSTEMS AND METHODS FOR GUIDING MOVEMENT OF A TOOL

CROSS-REFERENCE TO RELATED APPLICATIONS

The subject application is a U.S. bypass continuation of International Patent App. No. PCT/US2020/053548, filed on Sep. 30, 2020, which claims priority to and all the benefits of U.S. Provisional Patent App. No. 62/908,056, filed Sep. 30, 2019, the contents of each of the aforementioned applications being hereby incorporated by reference in their entirety.

TECHNICAL FIELD

The present disclosure relates generally to systems and methods for guiding movement of a tool.

BACKGROUND

Surgical systems may include a robotic manipulator and a tool coupled to the manipulator to perform a surgical procedure on a patient. In a manual mode of operation, one type of surgical system senses forces and torques manually applied to the tool by a user. The surgical system commands the manipulator, which may comprise a robotic arm, to position the tool to emulate motion expected by the user from application of the sensed forces and torques. Thus, the surgical system generally positions the tool in accordance with the user's intentions and expectations so that the user, for example, is able to remove a desired volume of tissue. However, in the manual mode, it can be difficult for the user to precisely place the tool at a target position and/or target orientation. Accordingly, the surgical system may also command the manipulator to move the tool autonomously to place the tool in the target position and/or orientation. However, when moving the tool autonomously, there may be a perception that the user has less control over the tool. For this reason, the manual mode, in which the user at least partially engages the tool, may be preferred by some users and/or preferred in certain situations.

There is a need in the art for systems and methods to address these challenges.

SUMMARY

This Summary introduces a selection of concepts in a simplified form that are further described below in the Detailed Description below. This Summary is not intended to limit the scope of the claimed subject matter and does not necessarily identify each and every key or essential feature of the claimed subject matter.

According to a first aspect, a surgical system is provided that comprises a tool and a manipulator to support the tool and move the tool in response to user forces and torques applied to the tool by a user. One or more sensors measure forces and torques applied to the tool. A control system comprises a guide handler to obtain a target state for the tool and generate one or more virtual constraints based on the target state and a current state of the tool. The control system also comprises a constraint solver to calculate a constraint force adapted to attract the tool toward the target state from the current state based on the one or more virtual constraints. The control system further comprises a virtual simulator to simulate dynamics of the tool in a virtual simulation based on input from the one or more sensors and based on the constraint force, and to output a commanded pose. The control system is configured to command the manipulator to move the tool based on the commanded pose to thereby provide haptic feedback to the user that guides the user toward placing the tool at the target state.

According to a second aspect, a method is provided for guiding a tool supported by a manipulator of a surgical system. The manipulator supports and moves the tool in response to user forces and torques applied to the tool by a user. The method comprises receiving input from one or more sensors that measure forces and torques applied to the tool. The method also comprises obtaining a target state for the tool and generating one or more virtual constraints based on the target state and a current state of the tool. A constraint force is calculated that is adapted to attract the tool toward the target state from the current state based on the one or more virtual constraints. Dynamics of the tool are simulated in a virtual simulation based on the input from the one or more sensors and based on the constraint force. A commanded pose is output based on the virtual simulation. The manipulator is commanded to move the tool based on the commanded pose to thereby provide haptic feedback to the user that guides the user toward placing the tool at the target state.

According to a third aspect, a surgical system is provided that comprises a tool and a manipulator to support the tool and move the tool. The manipulator is operable in a first mode in which the manipulator autonomously moves the tool along a tool path and is operable in a second mode in which the manipulator moves the tool in response to user forces and torques applied to the tool by a user. One or more sensors measure forces and torques applied to the tool. A control system comprises a guide handler to obtain a target state for the tool and generate one or more virtual constraints based on the target state and a current state of the tool. The target state is located off of the tool path. The control system also comprises a constraint solver to calculate a constraint force adapted to attract the tool toward the target state from the current state based on the one or more virtual constraints. The control system further comprises a virtual simulator to simulate dynamics of the tool in a virtual simulation based on input from the one or more sensors and based on the constraint force, and to output a commanded pose. The control system is configured to command the manipulator to move the tool based on the commanded pose to thereby provide haptic feedback to the user that guides the user toward placing the tool at the target state.

According to a fourth aspect, a method is provided for guiding a tool supported by a manipulator of a surgical system. The manipulator is operable in a first mode in which the manipulator autonomously moves the tool along a tool path and is operable in a second mode in which the manipulator moves the tool in response to user forces and torques applied to the tool by a user. The method comprises receiving input from one or more sensors that measure forces and torques applied to the tool and obtaining a target state for the tool. The method further comprises generating one or more virtual constraints based on the target state and a current state of the tool. The target state is located off of the tool path. A constraint force is calculated that is adapted to attract the tool toward the target state from the current state based on the one or more virtual constraints. Dynamics of the tool are simulated in a virtual simulation based on the input from the one or more sensors and based on the constraint force. A commanded pose is output based on the virtual simulation. The manipulator is commanded to move the tool based on the commanded pose to thereby provide haptic feedback to the user that guides the user toward placing the tool at the target state.

According to a fifth aspect, a surgical system is provided that comprises a tool and a manipulator. The manipulator is operable in a semi-autonomous mode in which the manipulator autonomously moves the tool along a tool path and is operable to reorient the tool in response to user forces and torques applied to the tool by a user while the tool remains on the tool path. One or more sensors measure forces and torques applied to the tool. A control system comprises a guide handler to obtain a preferred orientation for the tool and generate one or more virtual constraints based on the preferred orientation and a current orientation of the tool. The control system also comprises a constraint solver to calculate a constraint force adapted to attract the tool toward the preferred orientation from the current orientation based on the one or more virtual constraints. The control system further comprises a virtual simulator to simulate dynamics of the tool in a virtual simulation based on input from the one or more sensors and based on the constraint force, and to output a commanded pose. The control system is configured to command the manipulator to move the tool based on the commanded pose to thereby provide haptic feedback to the user that guides the user toward placing the tool at the preferred orientation.

According to a sixth aspect, a method is provided for guiding a tool supported by a manipulator of a surgical system. The manipulator is operable in a semi-autonomous mode in which the manipulator autonomously moves the tool along a tool path and is operable to reorient the tool in response to user forces and torques applied to the tool by a user while the tool remains on the tool path. The method comprises the steps of receiving input from one or more sensors that measure forces and torques applied to the tool and obtaining a preferred orientation for the tool. The method further comprises generating one or more virtual constraints based on the preferred orientation and a current orientation of the tool. A constraint force is calculated that is adapted to attract the tool toward the preferred orientation from the current orientation based on the one or more virtual constraints. Dynamics of the tool are simulated in a virtual simulation based on the input from the one or more sensors and based on the constraint force. A commanded pose is output based on the virtual simulation. The manipulator is commanded to move the tool based on the commanded pose to thereby provide haptic feedback to the user that guides the user toward placing the tool at the preferred orientation.

According to a seventh aspect, a surgical system is provided that comprises a tool and a manipulator to support the tool and move the tool in response to user forces and torques applied to the tool by a user. One or more sensors measure forces and torques applied to the tool. A control system comprises a guide handler to obtain a plurality of alignment points and one or more target planes for the tool and generate one or more virtual constraints based on relative positions of the plurality of alignment points and the one or more target planes. The control system comprises a constraint solver calculates a constraint force adapted to attract the tool toward the one or more target planes based on the one or more virtual constraints. The control system further comprises a virtual simulator to simulate dynamics of the tool in a virtual simulation based on input from the one or more sensors and based the constraint force, and to output a commanded pose. The control system is configured to command the manipulator to move the tool based on the commanded pose to thereby provide haptic feedback to the user that guides the user toward placing the tool at the one or more target planes.

According to an eighth aspect, a method is provided for guiding a tool supported by a manipulator of a surgical system. The manipulator supports and moves the tool in response to user forces and torques applied to the tool by a user. The method comprises receiving input from one or more sensors that measure forces and torques applied to the tool and obtaining a plurality of alignment points and one or more target planes for the tool. The method also comprises generating one or more virtual constraints based on relative positions of the plurality of alignment points and the one or more target planes. A constraint force is calculated that is adapted to attract the tool toward the one or more target planes based on the one or more virtual constraints. Dynamics of the tool are simulated in a virtual simulation based on the input from the one or more sensors and based on the constraint force. A commanded pose is output based on the virtual simulation. The manipulator is commanded to move the tool based on the commanded pose to thereby provide haptic feedback to the user that guides the user toward placing the tool at the one or more target planes.

According to a ninth aspect, a method is provided for controlling movement of a tool to create a plurality of features, wherein each of the features has a different target state for the tool. The method comprises determining, in a known coordinate system, a current state of the tool relative to the target states of the tool for the plurality of features to determine which one of the plurality of features is being selected by a user. The method also comprises enabling one or more guide constraints, from a plurality of guide constraints, based on the feature selected by the user. Movement of the tool is controlled based on the one or more guide constraints, wherein the one or more guide constraints act to generate haptic feedback to the user so that the user understands how the tool is to be moved relative to the target state associated with the feature selected by the user.

According to a tenth aspect, a method is provided for controlling movement of a tool to create a plurality of features, wherein each of the features has a different virtual boundary for the tool. The method comprises determining, in a known coordinate system, a current state of the tool relative to the virtual boundaries for the plurality of features to determine which one of the plurality of features is being selected by a user. The method also comprises enabling one or more guide constraints, from a plurality of guide constraints, based on the feature selected by the user and enabling one or more of the boundary constraints, from a plurality of boundary constraints, based on the feature selected by the user. Movement of the tool is controlled based on the one or more guide constraints and the one or more boundary constraints, wherein the one or more guide constraints and the one or more boundary constraints act to generate haptic feedback to the user to create the feature selected by the user.

According to an eleventh aspect, a surgical system is provided that comprises a tool and a manipulator to support the tool and move the tool. A control system comprises a guide handler to obtain a target state for the tool and generate one or more virtual constraints based on the target state and a current state of the tool. The control system also comprises a constraint solver to calculate a constraint force adapted to attract the tool toward the target state or repel the tool away from the target state based on the one or more virtual constraints. Movement of the tool is controlled by the manipulator, based on the constraint force, to provide haptic feedback to the user that guides the user toward placing the tool at the target state or away from the target state.

According to a twelfth aspect, a surgical system is provided that comprises a tool and a manipulator to support the tool and move the tool. The manipulator is operable in a first mode in which the manipulator moves the tool along a tool path and is operable in a second mode in which forces and torques are applied to the tool by a user to move the tool. A control system comprises a guide handler to obtain a target state for the tool and generate one or more virtual constraints based on the target state and a current state of the tool. The control system also comprises a constraint solver to calculate a constraint force adapted to attract the tool toward the target state from the current state based on the one or more virtual constraints. Movement of the tool is controlled by the manipulator in the second mode, based on the constraint force, to provide haptic feedback to the user that guides the user toward placing the tool at the target state.

According to a thirteenth aspect, a surgical system is provided that comprises a tool and a manipulator operable in a semi-autonomous mode in which the manipulator moves the tool along a tool path. The tool is movable in response to user forces and torques applied to the tool by a user while the tool remains on the tool path. A control system comprises a guide handler to obtain a preferred orientation for the tool and generate one or more virtual constraints based on the preferred orientation and a current orientation of the tool. The control system also comprises a constraint solver to calculate a constraint force adapted to attract the tool toward the preferred orientation from the current orientation based on the one or more virtual constraints. Movement of the tool is controlled by the manipulator, based on the constraint force, to provide haptic feedback to the user that guides the user toward placing the tool at the preferred orientation.

According to a fourteenth aspect, a surgical system is provided that comprises a tool and a manipulator to support the tool and move the tool. A control system comprises a guide handler to obtain a plurality of alignment points and one or more target planes for the tool and generate one or more virtual constraints based on relative positions of the plurality of alignment points and the one or more target planes. The control system also comprises a constraint solver to calculate a constraint force adapted to attract the tool toward the one or more target planes based on the one or more virtual constraints. Movement of the tool is controlled by the manipulator, based on the constraint force, to provide haptic feedback to the user that guides the user toward placing the tool at the one or more target planes.

According to a fifteenth aspect, a method is provided for guiding a tool supported by a manipulator of a surgical system. The method comprises obtaining a target state for the tool and generating one or more virtual constraints based on the target state and a current state of the tool. The method also comprises calculating a constraint force adapted to attract the tool toward the target state or repel the tool away from the target state based on the one or more virtual constraint. Movement of the tool is controlled based on the constraint force to provide haptic feedback to the user that guides the user toward placing the tool at the target state or away from the target state.

According to a sixteenth aspect, a method is provided for guiding a tool supported by a manipulator of a surgical system. The manipulator is operable in a first mode in which the manipulator moves the tool along a tool path and is operable in a second mode in which the tool moves in response to user forces and torques being applied to the tool by a user. The method comprises obtaining a target state for the tool and generating one or more virtual constraints based on the target state and a current state of the tool. The method also comprises calculating a constraint force adapted to attract the tool toward the target state from the current state based on the one or more virtual constraints. Movement of the tool is controlled in the second mode based on the constraint force to provide haptic feedback to the user that guides the user toward placing the tool at the target state.

According to a seventeenth aspect, a method is provided for guiding a tool supported by a manipulator of a surgical system. The manipulator is operable in a semi-autonomous mode in which the manipulator moves the tool along a tool path. The tool is movable to reorient the tool in response to user forces and torques applied to the tool by a user while the tool remains on the tool path. The method comprises the steps of obtaining a preferred orientation for the tool and generating one or more virtual constraints based on the preferred orientation and a current orientation of the tool. The method also comprises calculating a constraint force adapted to attract the tool toward the preferred orientation from the current orientation based on the one or more virtual constraints. Movement of the tool is controlled based on the constraint force to provide haptic feedback to the user that guides the user toward placing the tool at the preferred orientation.

According to an eighteenth aspect, a method is provided for guiding a tool supported by a manipulator of a surgical system. The method comprises obtaining a plurality of alignment points and one or more target planes for the tool and generating one or more virtual constraints based on relative positions of the plurality of alignment points and the one or more target planes. The method also comprises calculating a constraint force adapted to attract the tool toward the one or more target planes based on the one or more virtual constraints. Movement of the tool is controlled based on the constraint force to provide haptic feedback to the user that guides the user toward placing the tool at the one or more target planes.

According to a nineteenth aspect, a hand-held manipulator system is provided for performing surgery, the hand-held manipulator system comprising: a hand-held manipulator comprising a base portion to be held free-hand by a user and a tool tip movable relative to the base portion, the tool tip including a sagittal saw blade; and a control system to control movement of the tool tip, said control system comprising: a guide handler to obtain a target state for the saw blade and generate one or more virtual constraints based on the target state and a current state of the saw blade, the one or more virtual constraints including a guide constraint; a constraint solver to calculate a constraint force adapted to move the saw blade toward the target state based on the one or more virtual constrains; and a virtual simulator to simulate dynamics of the saw blade in a virtual simulation based on input from the constraint force, and to output a commanded pose, the control system being configured to command the hand-held manipulator to move the saw blade based on the commanded pose and to place the saw blade at the target state.

According to a twentieth aspect, a hand-held manipulator system is provided comprising: a hand-held manipulator comprising a base portion to be held free-hand by a user and a tool tip movable relative to the base portion, the tool tip including a sagittal saw blade; and a control system to control movement of the tool tip, said control system comprising: a guide handler to obtain a plurality of alignment points and one or more target planes for the saw blade and generate one or more virtual constraints based on relative positions of the plurality of alignment points and the one or more target planes; a constraint solver to calculate a constraint force adapted to move the saw blade toward the one or more target planes based on the one or more virtual constraints; and a virtual simulator to simulate dynamics of the saw blade in a virtual simulation based on input from the constraint force, and to output a commanded pose, the control system being configured to command the manipulator to move the saw blade based on the commanded pose to place the saw blade at the one or more target planes.

According to a twenty-first aspect, a method is provided of controlling a saw blade of a hand-held manipulator comprising a base portion to be held free-hand by a user and a tool tip movable relative to the base portion, the tool tip including a sagittal saw blade, the method comprising the steps of: obtaining a target state for the saw blade; generating one or more virtual constraints based on the target state and a current state of the saw blade; calculating a constraint force adapted to move the saw blade toward the target state based on the one or more virtual constraints; simulating dynamics of the saw blade in a virtual simulation based on the constraint force; outputting a commanded pose based on the virtual simulation; and commanding the manipulator to move the saw blade based on the commanded pose to place the saw blade at the target state.

According to a twenty-second aspect, a method is provided of guiding a saw blade supported by a hand-held manipulator comprising a base portion to be held free-hand by a user and a tool tip movable relative to the base portion, the tool tip including a sagittal saw blade, the manipulator supporting and moving the saw blade, the method comprising the steps of: obtaining a plurality of alignment points and one or more target planes for the saw blade; generating one or more virtual constraints based on relative positions of the plurality of alignment points and the one or more target planes; calculating a constraint force adapted to move the saw blade toward the one or more target planes based on the one or more virtual constraints; simulating dynamics of the saw blade in a virtual simulation based on the input from the constraint force; outputting a commanded pose based on the virtual simulation; and commanding the manipulator to move the saw blade based on the commanded pose to place the saw blade at the one or more target planes.

According to a twenty-third aspect, a method is provided of controlling movement of a saw blade of a hand-held manipulator to create a plurality of features, wherein each of the plurality of features has a different target state for the saw blade, the method comprising the steps of: determining, in a known coordinate system, a current state of the saw blade relative to the target states of the saw blade for the plurality of features to determine which one of the plurality of features is being selected be created; enabling one or more guide constraints for the hand-held manipulator, from a plurality of guide constraints, based on the feature selected; and controlling movement of the saw blade based on the one or more guide constraints, wherein the one or more guide constraints act to place the saw blade at the target state for the feature selected.

According to a twenty-fourth aspect, a hand-held manipulator system is provided for performing surgery, the hand-held manipulator system comprising: a hand-held manipulator comprising a base portion to be held free-hand by a user and a tool tip movable relative to the base portion, the tool tip including a sagittal saw blade; and a control system to control movement of the tool tip, said control system comprising: a guide handler to obtain a target state for the saw blade and generate one or more virtual constraints based on the target state and a current state of the saw blade; and a constraint solver to calculate a constraint force adapted to move the saw blade toward the target state based on the one or more virtual constraints, wherein movement of the saw blade is controlled by the manipulator, based on the constraint force, to place the saw blade at the target state.

According to a twenty-fifth aspect, a hand-held manipulator system is provided for performing surgery, the hand-held manipulator system comprising: a hand-held manipulator comprising a base portion to be held free-hand by a user and a tool tip movable relative to the base portion, the tool tip including a sagittal saw blade; and a control system to control movement of the tool tip, said control system comprising: a guide handler to obtain a plurality of alignment points and one or more target planes for the saw blade and generate one or more virtual constraints based on relative positions of the plurality of alignment points and the one or more target planes; and a constraint solver to calculate a constraint force adapted to move the saw blade toward the one or more target planes based on the one or more virtual constraints, wherein movement of the saw blade is controlled by the manipulator, based on the constraint force, to place the saw blade at the one or more target planes.

According to a twenty-sixth aspect, a method is provided of guiding a saw blade of a hand-held manipulator, the method comprising the steps of: obtaining a target state for the saw blade; generating one or more virtual constraints based on the target state and a current state of the saw blade; calculating a constraint force adapted to move the saw blade toward the target state based on the one or more virtual constraints; and controlling movement of the saw blade based on the constraint force to place the saw blade at the target state.

According to a twenty-seventh aspect, a method is provided of guiding a saw blade supported by a hand-held manipulator, the method comprising the steps of: obtaining a plurality of alignment points and one or more target planes for the saw blade; generating one or more virtual constraints based on relative positions of the plurality of alignment points and the one or more target planes; calculating a constraint force adapted to move the saw blade toward the one or more target planes based on the one or more virtual constraints; and controlling movement of the saw blade based on the constraint force to place the saw blade at the one or more target planes.

According to a twenty-eighth aspect, a hand-held manipulator system is provided for performing surgery, the hand-held manipulator system comprising: a hand-held manipulator comprising a base portion to be held free-hand by a user and a tool tip movable relative to the base portion, the tool tip including a sagittal saw blade; and a control system to control movement of the tool tip, said control system comprising: a guide handler to obtain a target state for the saw blade and generate one or more virtual constraints based on the target state and a current state of the saw blade, the one or more virtual constraints comprising a guide constraint, the guide handler is configured to compute the guide constraint based on a relationship between the current state and the target state, wherein the guide constraint has a value for a tuning parameter, the guide handler being configured to change the value of the tuning parameter based on a relationship between the current state and the target state, a constraint solver to calculate a constraint force adapted to move the saw blade toward the target state based on the guide constraint; and a virtual simulator to simulate dynamics of the saw blade in a virtual simulation based on input from the constraint force, and to output a commanded pose, the control system being configured to command the manipulator to move the saw blade based on the commanded pose and to place the saw blade at the target state.

According to a twenty-ninth aspect, a surgical system is provided comprising: a tool; a manipulator to support the tool and move the tool in response to user forces and torques applied to the tool by a user; one or more sensors to provide a sensor input signal; and a control system comprising: a guide handler to obtain a target state for the tool and generate one or more virtual constraints based on the target state and a current state of the tool; a constraint solver to calculate a constraint force adapted to attract the tool toward the target state or repel the tool away from the target state based on the one or more virtual constraints; and a virtual simulator to simulate dynamics of the tool in a virtual simulation based on the sensor input signal from the one or more sensors and the constraint force, and to output a commanded pose, the control system being configured to command the manipulator to move the tool based on the commanded pose and to thereby provide haptic feedback to the user that guides the user toward placing the tool at the target state or away from the target state.

Any of the aspects above can be combined in part, or in whole. Furthermore, any of the aspects above can be implemented with any of the following implementations:

In one implementation, the target state comprises a target position, a target orientation, or a target pose, and the current state comprises a current position, a current orientation, or a current pose. In one implementation, the one or more virtual constraints comprise up to three virtual constraints associated with the target position and up to three virtual constraints associated with the target orientation. In one implementation, the control system is configured to enable the user to reorient the tool away from the target orientation. In one implementation, the control system is configured to enable the user to reposition the tool away from the target position.

In one implementation, the control system is configured to select the starting position from a plurality of possible starting positions. In one implementation, the control system is configured to select the starting position from the plurality of possible starting positions based on a last known position of the tool on the tool path before being moved off the tool path.

In one implementation, the control system is configured to define the starting position as a restart position along a restart path. In one implementation, the control system is configured to: determine a last known point on the tool path traversed by the tool before the tool moved off the tool path; and calculate the restart position on the restart path based on the last known point. In one implementation, the control system is configured to calculate the last known point on the tool path traversed by the tool based on a last known position of the tool on the tool path before being moved off the tool path. In one implementation, the control system is configured to: calculate a lead-in path from the restart position to the last known point; and move the tool along the lead-in path from the restart position to the last known point in the first mode. In one implementation, the tool comprises an energy applicator and the control system comprises a tool controller to supply energy to the energy applicator when the energy applicator moves along the lead-in path in the first mode. In one implementation, the restart path is based on a shape of a virtual boundary. In one implementation, the target state comprises a restart position on a restart path, wherein the restart path is defined based on a withdrawal path along which the user caused the tool to move when moving the tool off the tool path. In one implementation, the target state comprises a restart position selected from a plurality of possible restart positions defined along a restart path, the control system configured to select the restart position based on cutting progress made by the tool with respect to the plurality of possible restart positions.

In one implementation, the target state comprises a target coordinate system and the tool comprises a guided coordinate system, the constraint force adapted to attract the guided coordinate system toward the target coordinate system.

In one implementation, the guide handler is configured to compute the one or more virtual constraints with respect to one or more degrees of freedom based on a difference between the current state and the target state.

In one implementation, the control system comprises a user interface to activate the one or more virtual constraints so that the constraint force comprises components of force and torque associated with attracting the tool toward the target state.

In one implementation, the guide handler is configured to compute the one or more virtual constraints based on a relationship between the current state and the target state.

In one implementation, each of the one or more virtual constraints has a value for a tuning parameter, the guide handler being configured to change the value of the tuning parameter based on a relationship between the current state and the target state.

In one implementation, the one or more virtual constraints comprises a first virtual constraint that has a first value for a tuning parameter and a second virtual constraint that has a second value for the tuning parameter, the first value being different than the second value so that the resulting constraint force is adapted to attract or repel the tool more strongly as a result of the first virtual constraint as compared the second virtual constraint.

In one implementation, the virtual simulator is configured to simulate dynamics of the tool by representing the tool as a virtual rigid body having a virtual mass and by applying the constraint force to the virtual mass in the virtual simulation to yield the commanded pose.

In one implementation, the control system is configured to: calculate an external force based on the input from the one or more sensors; and calculate a total force for use in the virtual simulation based on the constraint force and the external force, wherein the external force is capable of having components of force with magnitude and direction sufficient to overcome the constraint force.

In one implementation, the tool comprises a bur or a drill and the one or more virtual constraints comprise two virtual constraints defined to attract the bur or the drill toward a desired orientation.

In one implementation, the tool comprises a bur and the one or more virtual constraints comprise three virtual constraints defined to attract the bur toward a desired starting position.

In one implementation, the tool comprises a saw blade and the one or more virtual constraints comprise three virtual constraints defined to attract the saw blade toward a desired cutting plane.

In one implementation, the first mode comprises a semi-autonomous mode and the second mode comprises a guided-haptic mode.

In one implementation, enabling the one or more guide constraints includes generating the one or more guide constraints based on the target state associated with the feature selected by the user and based on the current state of the tool and wherein controlling movement of the tool based on the one or more guide constraints includes: calculating a constraint force adapted to attract the tool toward the target state from the current state based on the one or more guide constraints; simulating dynamics of the tool in a virtual simulation based at least partially on the constraint force; outputting a commanded pose based on the virtual simulation; and commanding the manipulator to move the tool based on the commanded pose to thereby provide haptic feedback to the user that guides the user toward placing the tool at the target state.

In one implementation, enabling the one or more guide constraints includes generating the one or more guide constraints based on the target state associated with the feature selected by the user and based on the current state of the tool and wherein controlling movement of the tool based on the one or more guide constraints includes: calculating a constraint force adapted repel the tool away from the target state based on the one or more guide constraints; simulating dynamics of the tool in a virtual simulation based at least partially on the constraint force; outputting a commanded pose based on the virtual simulation; and commanding the manipulator to move the tool based on the commanded pose to thereby provide haptic feedback to the user that guides the user toward placing the tool away from the target state.

In one implementation, determining, in the known coordinate system, the current state of the tool relative to the target states of the tool for the plurality of features includes determining a location of a plane defined by a saw blade relative to a plurality of cutting planes in the known coordinate system.

In one implementation, determining, in the known coordinate system, the current state of the tool relative to the target states of the tool for the plurality of features includes determining a location of an axis defined by a bur or drill shaft relative to a plurality of cutting axes.

In one implementation, determining, in the known coordinate system, a current state of the tool relative to the target states of the tool for the plurality of features includes determining angles between a current orientation of the tool and a plurality of target orientations of the tool, determining distances between a current position of the tool and a plurality of target positions of the tool, or determining both the angles and the distances, and determining the one of the plurality of features selected by the user based on values of the angles, values of the distances, or both the values of the angles and the values of the distances.

In one implementation, one or more virtual boundaries are enabled for the tool based on the feature selected by the user. In one implementation, defining a selection region with respect to the plurality of features wherein the one or more virtual boundaries and the one or more guide constraints associated with the feature selected by the user are enabled when the tool is inside the selection region to create the feature selected by the user and are disabled when the tool is moved outside of the selection region so that the user can select a new feature to be created.

In some implementations, a force torque sensor measures forces or torques applied to the tool. Additionally or alternatively, other sensors may be used, such as one or more current sensors configured to measure electrical current to any one or more actuators. In some implementations, the current measurements can be used to derive or estimate a measure of force and torque applied to the tool.

Any of the above implementations can be utilized for any of the aspects described above. Any of the above implementations can be combined in whole, or in part, for any one or more aspects described above.

DESCRIPTION OF THE DRAWINGS

Advantages of the present disclosure will be readily appreciated as the same becomes better understood by reference to the following detailed description when considered in connection with the accompanying drawings.

FIG. 12 shows a sample constraint equation.

FIGS. 13 and 14 show a sample forward dynamics algorithm for carrying out a virtual simulation.

FIGS. 22A-22C illustrate movements of the tool along a milling path in a semi-autonomous mode of operation to remove material from a femur.

FIGS. 24-27 illustrates another application of guide constraints to attract the tool to target planes, wherein the tool comprises a saw blade.

DETAILED DESCRIPTION

I. Overview

Figure 1:
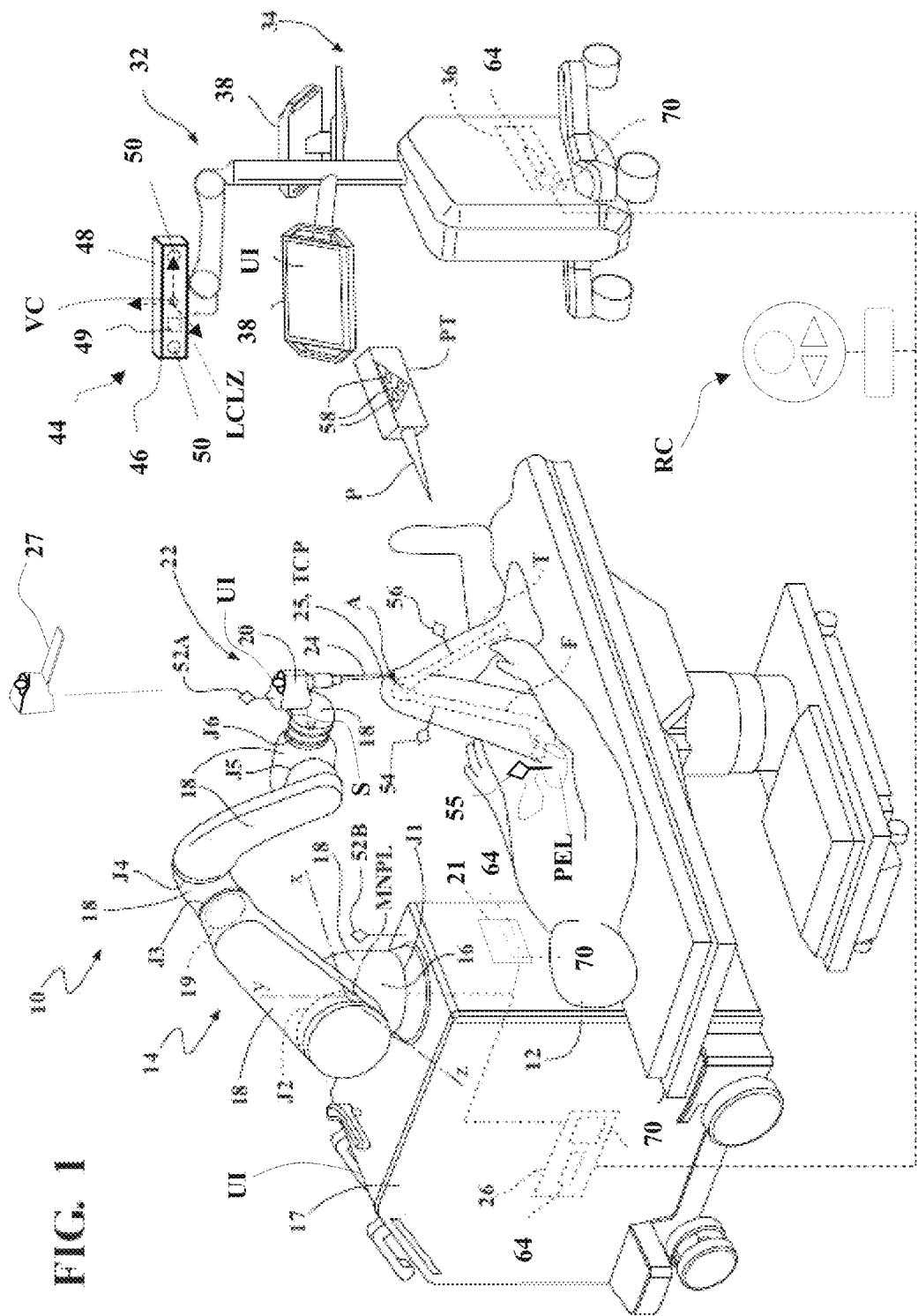
FIG. 1 is a perspective view of a surgical system.

Referring to FIG. 1, a surgical system 10 is illustrated. The system 10 is useful for treating a surgical site or anatomical volume A of a patient 12, such as treating bone or soft tissue. In FIG. 1, the patient 12 is undergoing a surgical procedure. The anatomy in FIG. 1 includes a femur F, pelvis PEL, and a tibia T of the patient 12. The surgical procedure may involve tissue removal or other forms of treatment. Treatment may include cutting, coagulating, lesioning the tissue, other in-situ tissue treatments, or the like. In some examples, the surgical procedure involves partial or total knee or hip replacement surgery, shoulder replacement surgery, spine surgery, or ankle surgery. In some examples, the system 10 is designed to cut away material to be replaced by surgical implants, such as hip and knee implants, including unicompartmental, bicompartmental, multicompartmental, or total knee implants, acetabular cup implants, femur stem implants, screws, anchors, other fasteners, and the like. Some of these types of implants are shown in U.S. Patent Application Publication No. 2012/0330429, entitled, "Prosthetic Implant and Method of Implantation," the disclosure of which is hereby incorporated by reference. The system 10 and techniques disclosed herein may be used to perform other procedures, surgical or non-surgical, or may be used in industrial applications or other applications.

The system 10 includes a robotic manipulator 14, also referred to as a surgical robot. The manipulator 14 has a base 16 and plurality of links 18. A manipulator cart 17 supports the manipulator 14 such that the manipulator 14 is fixed to the manipulator cart 17. The links 18 collectively form one or more arms of the manipulator 14 (e.g., robotic arms). The manipulator 14 may have a serial arm configuration (as shown in FIG. 1), a parallel arm configuration, or any other suitable manipulator configuration. In other examples, more than one manipulator 14 may be utilized in a multiple arm configuration.

In the example shown in FIG. 1, the manipulator 14 comprises a plurality of joints J and a plurality of joint encoders 19 located at the joints J for determining position data of the joints J. For simplicity, only one joint encoder 19 is illustrated in FIG. 1, although other joint encoders 19 may be similarly illustrated. The manipulator 14 according to one example has six joints J1-J6 implementing at least six-degrees of freedom (DOF) for the manipulator 14. However, the manipulator 14 may have any number of degrees of freedom and may have any suitable number of joints J and may have redundant joints.

The manipulator 14 need not require joint encoders 19 but may alternatively, or additionally, utilize motor encoders present on motors at each joint J. Also, the manipulator 14 need not require rotary joints, but may alternatively, or additionally, utilize one or more prismatic joints. Any suitable combination of joint types are contemplated.

The base 16 of the manipulator 14 is generally a portion of the manipulator 14 that provides a fixed reference coordinate system for other components of the manipulator 14 or the system 10 in general. Generally, the origin of a manipulator coordinate system MNPL is defined at the fixed reference of the base 16. The base 16 may be defined with respect to any suitable portion of the manipulator 14, such as one or more of the links 18. Alternatively, or additionally, the base 16 may be defined with respect to the manipulator cart 17, such as where the manipulator 14 is physically attached to the cart 17. In one example, the base 16 is defined at an intersection of the axes of joints J1 and J2. Thus, although joints J1 and J2 are moving components in reality, the intersection of the axes of joints J1 and J2 is nevertheless a virtual fixed reference pose, which provides both a fixed position and orientation reference and which does not move relative to the manipulator 14 and/or manipulator cart 17.

Figure 29:
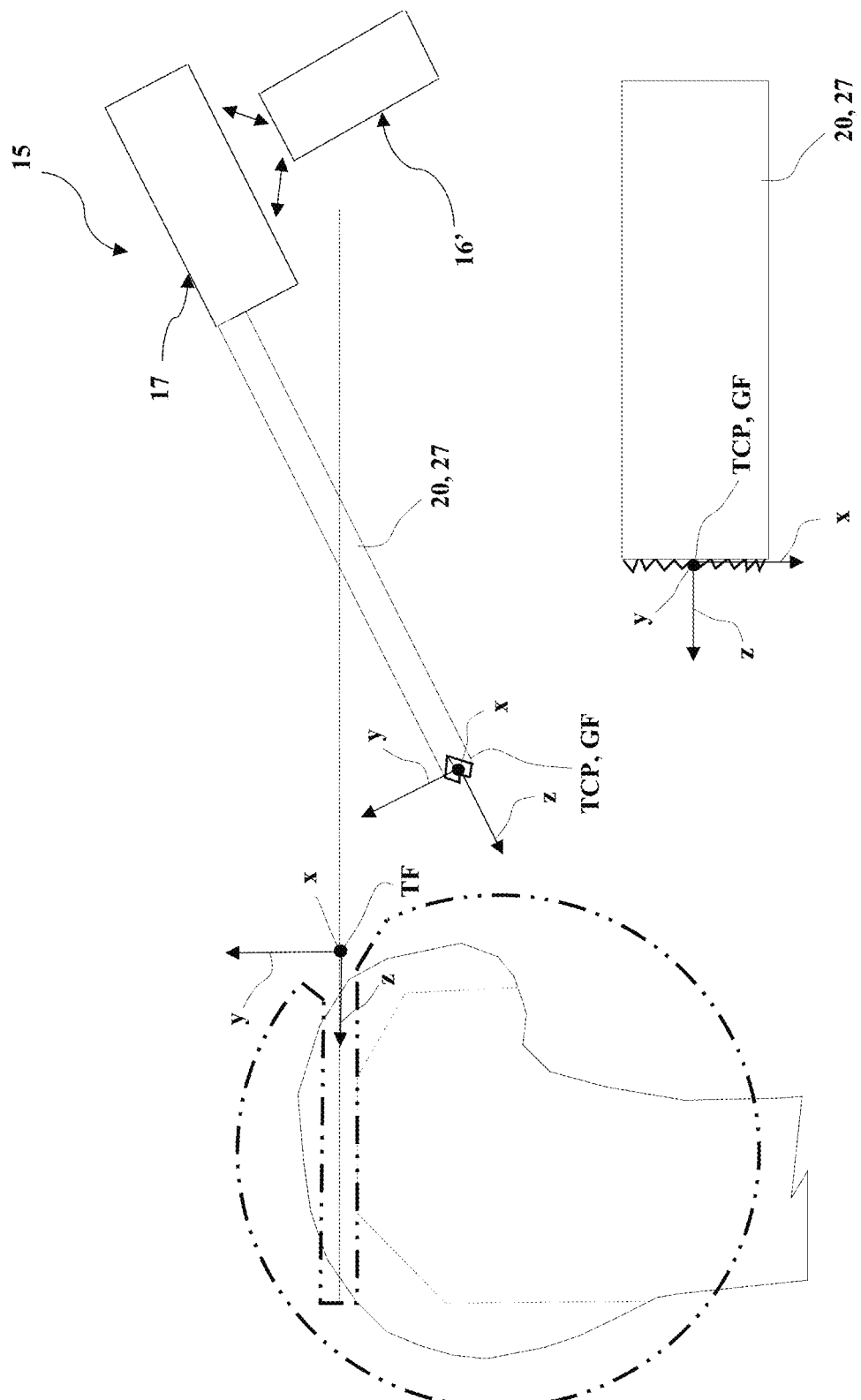
FIG. 29 illustrates another application of guide constraints to attract the tool to target planes, wherein the tool is saw blade of a hand-held manipulator.

In some examples, with reference to FIG. 29, the manipulator can be a hand-held manipulator 15 where the base 16' is a base portion of a tool (e.g., a portion held free-hand by the user) and the tool tip 17 is movable relative to the base portion. The base portion has a reference coordinate system that is tracked and the tool tip has a tool tip coordinate system that is computed relative to the reference coordinate system (e.g., via motor and/or joint encoders and forward kinematic calculations). Movement of the tool tip 17 can be controlled to follow the path since its pose relative to the path can be determined. Such a hand-held manipulator 15 can be like that shown in U.S. Pat. No. 9,707,043, filed on Aug. 31, 2012, entitled, "Surgical Instrument Including Housing, A Cutting Accessory that Extends from the Housing and Actuators that Establish the Position of the Cutting Accessory Relative to the Housing," which is hereby incorporated herein by reference. An example of a hand-held manipulator which can be utilized with the systems, methods, and techniques described herein can be like that described in PCT application No. PCT/US2020/042128, entitled "Robotic Hand-Held Surgical Instrument Systems and Methods", filed on Jul. 15, 2020, the entire contents of which are hereby incorporated by reference herein.

The manipulator 14 and/or manipulator cart 17 house a manipulator controller 26, or other type of control unit. The manipulator controller 26 may comprise one or more computers, or any other suitable form of controller that directs the motion of the manipulator 14. The manipulator controller 26 may have a central processing unit (CPU) and/or other processors, memory (not shown), and storage (not shown). The manipulator controller 26 is loaded with software as described below. The processors could include one or more processors to control operation of the manipulator 14. The processors can be any type of microprocessor, multi-processor, and/or multi-core processing system. The manipulator controller 26 may additionally, or alternatively, comprise one or more microcontrollers, field programmable gate arrays, systems on a chip, discrete circuitry, and/or other suitable hardware, software, or firmware that is capable of carrying out the functions described herein. The term processor is not intended to limit any embodiment to a single processor. The manipulator 14 may also comprise a user interface UI with one or more displays and/or input devices (e.g., push buttons, keyboard, mouse, microphone (voice-activation), gesture control devices, touchscreens, etc.).

A surgical tool 20 couples to the manipulator 14 and is movable relative to the base 16 to interact with the anatomy in certain modes. The tool 20 is or forms part of an end effector 22 supported by the manipulator 14 in certain embodiments. The tool 20 may be grasped by the user. One possible arrangement of the manipulator 14 and the tool 20 is described in U.S. Pat. No. 9,119,655, filed on Aug. 2, 2013, entitled, "Surgical Manipulator Capable of Controlling a Surgical Instrument in Multiple Modes," the disclosure of which is hereby incorporated by reference. The manipulator 14 and the tool 20 may be arranged in alternative configurations. The tool 20 can be like that shown in U.S. Patent Application Publication No. 2014/0276949, filed on Mar. 15, 2014, entitled, "End Effector of a Surgical Robotic Manipulator," hereby incorporated by reference.

The tool 20 includes an energy applicator 24 designed to contact the tissue of the patient 12 at the surgical site. In one example, the energy applicator 24 is a bur 25. The bur 25 may be substantially spherical and comprise a spherical center, radius (r) and diameter. Alternatively, the energy applicator 24 may be a drill bit, a saw blade 27 (see alternative tool in FIG. 1), an ultrasonic vibrating tip, or the like. The tool 20 and/or energy applicator 24 may comprise any geometric feature, e.g., perimeter, circumference, radius, diameter, width, length, volume, area, surface/plane, range of motion envelope (along any one or more axes), etc. The geometric feature may be considered to determine how to locate the tool 20 relative to the tissue at the surgical site to perform the desired treatment. In some of the embodiments described herein, a spherical bur having a tool center point (TCP) and a sagittal saw blade having a TCP will be described for convenience and ease of illustration, but is not intended to limit the tool 20 to any particular form.

The tool 20 may comprise a tool controller 21 to control operation of the tool 20, such as to control power to the tool (e.g., to a rotary motor of the tool 20), control movement of the tool 20, control irrigation/aspiration of the tool 20, and/or the like. The tool controller 21 may be in communication with the manipulator controller 26 or other components. The tool 20 may also comprise a user interface UI with one or more displays and/or input devices (e.g., push buttons, keyboard, mouse, microphone (voice-activation), gesture control devices, touchscreens, foot pedals, etc.). The manipulator controller 26 controls a state (position and/or orientation) of the tool 20 (e.g., of the TCP) with respect to a coordinate system, such as the manipulator coordinate system MNPL. The manipulator controller 26 can control (linear or angular) velocity, acceleration, or other derivatives of motion of the tool 20.

The tool center point (TCP), in one example, is a predetermined reference point defined at the energy applicator 24. The TCP has a known, or able to be calculated (i.e., not necessarily static), pose relative to other coordinate systems. The geometry of the energy applicator 24 is known in or defined relative to a TCP coordinate system (or other tool coordinate system associated with the tool). The TCP may be located at the spherical center of the bur 25 of the tool 20 or at the distal end of the saw blade 27 such that only one point is tracked. The TCP may be defined in various ways depending on the configuration of the energy applicator 24. The manipulator 14 could employ the joint/motor encoders, or any other non-encoder position sensing method, to enable a pose of the TCP to be determined. The manipulator 14 may use joint measurements to determine TCP pose and/or could employ techniques to measure TCP pose directly. The control of the tool 20 is not limited to a center point. For example, any suitable primitives, meshes, etc., can be used to represent the tool 20.

The system 10 further includes a navigation system 32. One example of the navigation system 32 is described in U.S. Pat. No. 9,008,757, filed on Sep. 24, 2013, entitled, "Navigation System Including Optical and Non-Optical Sensors," hereby incorporated by reference. The navigation system 32 tracks movement of various objects. Such objects include, for example, the manipulator 14, the tool 20 and the anatomy, e.g., femur F, pelvis PEL, and tibia T. The navigation system 32 tracks these objects to gather state information of each object with respect to a (navigation) localizer coordinate system LCLZ. Coordinates in the localizer coordinate system LCLZ may be transformed to the manipulator coordinate system MNPL, to other coordinate systems, and/or vice-versa, using transformations.

The navigation system 32 includes a cart assembly 34 that houses a navigation controller 36, and/or other types of control units. A navigation user interface UI is in operative communication with the navigation controller 36. The navigation user interface includes one or more displays 38. The navigation system 32 is capable of displaying a graphical representation of the relative states of the tracked objects to the user using the one or more displays 38. The navigation user interface UI further comprises one or more input devices to input information into the navigation controller 36 or otherwise to select/control certain aspects of the navigation controller 36. Such input devices include interactive touchscreen displays. However, the input devices may include any one or more of push buttons, a keyboard, a mouse, a microphone (voice-activation), gesture control devices, foot pedals, and the like.

The navigation system 32 also includes a navigation localizer 44 coupled to the navigation controller 36. In one example, the localizer 44 is an optical localizer and includes a camera unit 46. The camera unit 46 has an outer casing 48 that houses one or more optical sensors 50. The localizer 44 may comprise its own localizer controller 49 and may further comprise a video camera VC.

The navigation system 32 includes one or more trackers. In one example, the trackers include a pointer tracker PT, one or more manipulator trackers 52A, 52B, a first patient tracker 54, a second patient tracker 55, and a third patient tracker 56. In the illustrated example of FIG. 1, the manipulator tracker is firmly attached to the tool 20 (i.e., tracker 52A), the first patient tracker 54 is firmly affixed to the femur F of the patient 12, the second patient tracker 55 is firmly affixed to the pelvis PEL of the patient 12, and the third patient tracker 56 is firmly affixed to the tibia T of the patient 12. In this example, the patient trackers 54, 55, 56 are firmly affixed to sections of bone. The pointer tracker PT is firmly affixed to a pointer P used for registering the anatomy to the localizer coordinate system LCLZ. The manipulator tracker 52A, 52B may be affixed to any suitable component of the manipulator 14, in addition to, or other than the tool 20, such as the base 16 (i.e., tracker 52B), or any one or more links 18 of the manipulator 14. The trackers 52A, 52B, 54, 55, 56, PT may be fixed to their respective components in any suitable manner. For example, the trackers may be rigidly fixed, flexibly connected (optical fiber), or not physically connected at all (ultrasound), as long as there is a suitable (supplemental) way to determine the relationship (measurement) of that respective tracker to the object that it is associated with.

Any one or more of the trackers may include active markers 58. The active markers 58 may include light emitting diodes (LEDs). Alternatively, the trackers 52A, 52B, 54, 55, 56, PT may have passive markers, such as reflectors, which reflect light emitted from the camera unit 46. Other suitable markers not specifically described herein may be utilized.

The localizer 44 tracks the trackers 52A, 52B, 54, 55, 56, PT to determine a state of each of the trackers 52A, 52B, 54, 55, 56, PT, which correspond respectively to the state of the object respectively attached thereto. The localizer 44 may perform known triangulation techniques to determine the states of the trackers 52, 54, 55, 56, PT, and associated objects. The localizer 44 provides the state of the trackers 52A, 52B, 54, 55, 56, PT to the navigation controller 36. In one example, the navigation controller 36 determines and communicates the state the trackers 52A, 52B, 54, 55, 56, PT to the manipulator controller 26. As used herein, the state of an object includes, but is not limited to, data that defines the position and/or orientation of the tracked object or equivalents/derivatives of the position and/or orientation. For example, the state may be a pose of the object, and may include linear velocity data, and/or angular velocity data, and the like.

The navigation controller 36 may comprise one or more computers, or any other suitable form of controller. Navigation controller 36 has a central processing unit (CPU) and/or other processors, memory (not shown), and storage (not shown). The processors can be any type of processor, microprocessor or multi-processor system. The navigation controller 36 is loaded with software. The software, for example, converts the signals received from the localizer 44 into data representative of the position and orientation of the objects being tracked. The navigation controller 36 may additionally, or alternatively, comprise one or more microcontrollers, field programmable gate arrays, systems on a chip, discrete circuitry, and/or other suitable hardware, software, or firmware that is capable of carrying out the functions described herein. The term processor is not intended to limit any embodiment to a single processor.

Although one example of the navigation system 32 is shown that employs triangulation techniques to determine object states, the navigation system 32 may have any other suitable configuration for tracking the manipulator 14, tool 20, and/or the patient 12. In another example, the navigation system 32 and/or localizer 44 are ultrasound-based. For example, the navigation system 32 may comprise an ultrasound imaging device coupled to the navigation controller 36. The ultrasound imaging device images any of the aforementioned objects, e.g., the manipulator 14, the tool 20, and/or the patient 12, and generates state signals to the navigation controller 36 based on the ultrasound images. The ultrasound images may be 2-D, 3-D, or a combination of both. The navigation controller 36 may process the images in near real-time to determine states of the objects. The ultrasound imaging device may have any suitable configuration and may be different than the camera unit 46 as shown in FIG. 1.

In another example, the navigation system 32 and/or localizer 44 are radio frequency (RF)-based. For example, the navigation system 32 may comprise an RF transceiver coupled to the navigation controller 36. The manipulator 14, the tool 20, and/or the patient 12 may comprise RF emitters or transponders attached thereto. The RF emitters or transponders may be passive or actively energized. The RF transceiver transmits an RF tracking signal and generates state signals to the navigation controller 36 based on RF signals received from the RF emitters. The navigation controller 36 may analyze the received RF signals to associate relative states thereto. The RF signals may be of any suitable frequency. The RF transceiver may be positioned at any suitable location to track the objects using RF signals effectively. Furthermore, the RF emitters or transponders may have any suitable structural configuration that may be much different than the trackers 52A, 52B, 54, 55, 56, PT shown in FIG. 1.

In yet another example, the navigation system 32 and/or localizer 44 are electromagnetically based. For example, the navigation system 32 may comprise an EM transceiver coupled to the navigation controller 36. The manipulator 14, the tool 20, and/or the patient 12 may comprise EM components attached thereto, such as any suitable magnetic tracker, electro-magnetic tracker, inductive tracker, or the like. The trackers may be passive or actively energized. The EM transceiver generates an EM field and generates state signals to the navigation controller 36 based upon EM signals received from the trackers. The navigation controller 36 may analyze the received EM signals to associate relative states thereto. Again, such navigation system 32 examples may have structural configurations that are different than the navigation system 32 configuration shown in FIG. 1.

The navigation system 32 may have any other suitable components or structure not specifically recited herein. Furthermore, any of the techniques, methods, and/or components described above with respect to the navigation system 32 shown may be implemented or provided for any of the other examples of the navigation system 32 described herein. For example, the navigation system 32 may utilize solely inertial tracking or any combination of tracking techniques, and may additionally or alternatively comprise, fiber optic-based tracking, machine-vision tracking, and the like.

Figure 2:
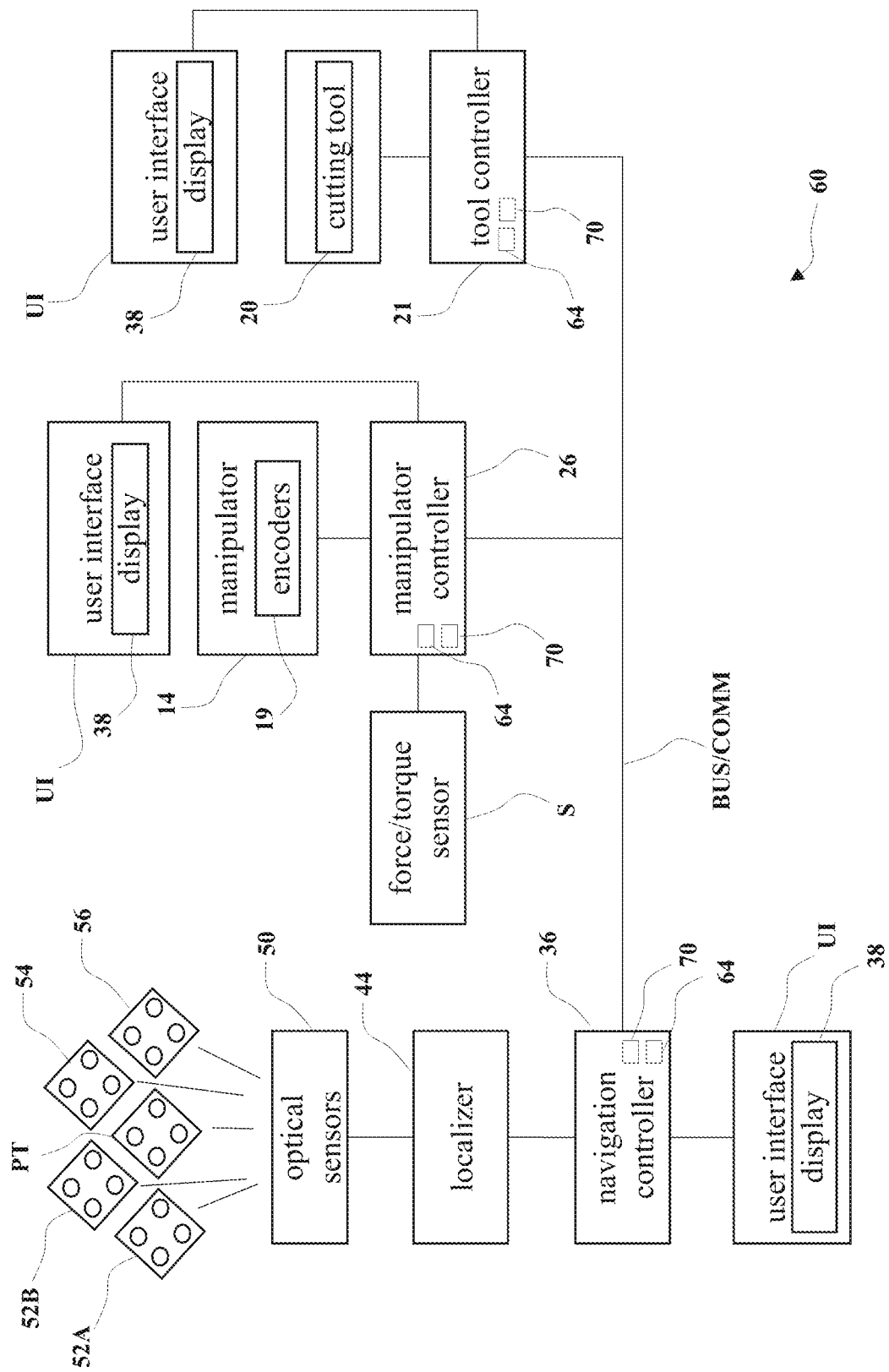
FIG. 2 is a block diagram of a control system for controlling the surgical system.

Referring to FIG. 2, the system 10 includes a control system 60 that comprises, among other components, the manipulator controller 26, the navigation controller 36, and the tool controller 21. The control system 60 further includes one or more software programs and software modules shown in FIG. 3. The software modules may be part of the program or programs that operate on the manipulator controller 26, navigation controller 36, tool controller 21, or any combination thereof, to process data to assist with control of the system 10. The software programs and/or modules include computer readable instructions stored in non-transitory memory 64 on the manipulator controller 26, navigation controller 36, tool controller 21, or a combination thereof, to be executed by one or more processors 70 of the controllers 21, 26, 36. The memory 64 may be any suitable configuration of memory, such as RAM, non-volatile memory, etc., and may be implemented locally or from a remote database. Additionally, software modules for prompting and/or communicating with the user may form part of the program or programs and may include instructions stored in memory 64 on the manipulator controller 26, navigation controller 36, tool controller 21, or any combination thereof. The user may interact with any of the input devices of the navigation user interface UI or other user interface UI to communicate with the software modules. The user interface software may run on a separate device from the manipulator controller 26, navigation controller 36, and/or tool controller 21.

The control system 60 may comprise any suitable configuration of input, output, and processing devices suitable for carrying out the functions and methods described herein. The control system 60 may comprise the manipulator controller 26, the navigation controller 36, or the tool controller 21, or any combination thereof, or may comprise only one of these controllers. These controllers may communicate via a wired bus or communication network as shown in FIG. 2, via wireless communication, or otherwise. The control system 60 may also be referred to as a controller. The control system 60 may comprise one or more microcontrollers, field programmable gate arrays, systems on a chip, discrete circuitry, sensors, displays, user interfaces, indicators, and/or other suitable hardware, software, or firmware that is capable of carrying out the functions described herein.

Figure 3:
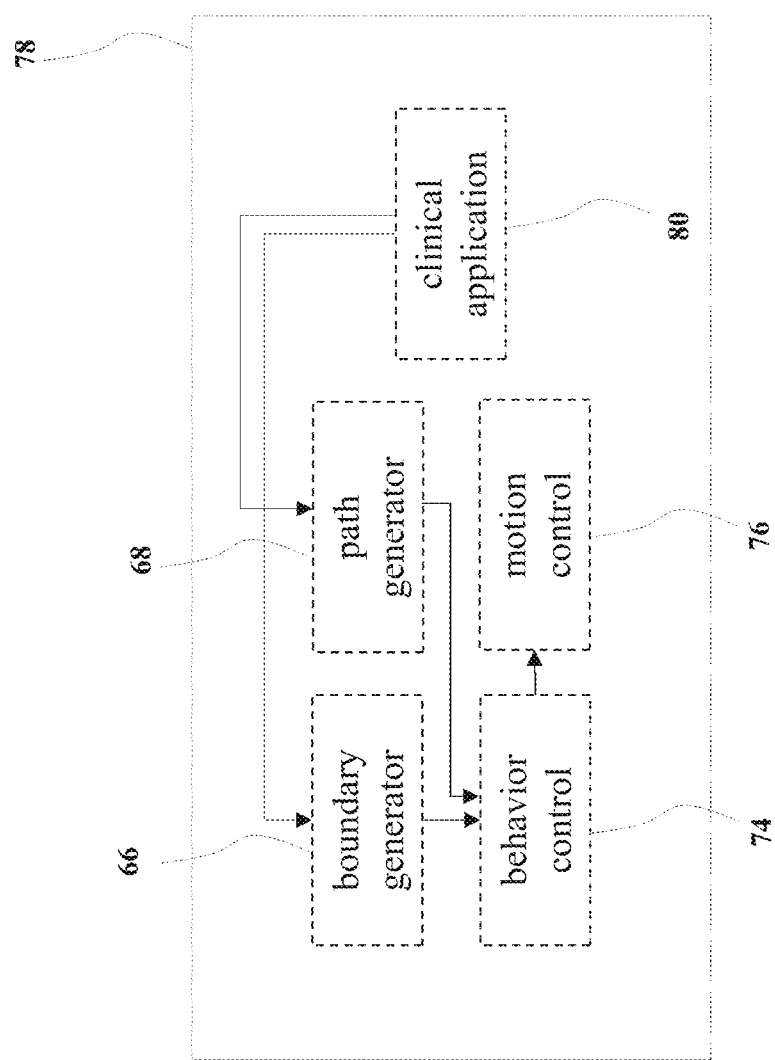
FIG. 3 is a functional block diagram of a software program used for control of the surgical system.
Figure 4:
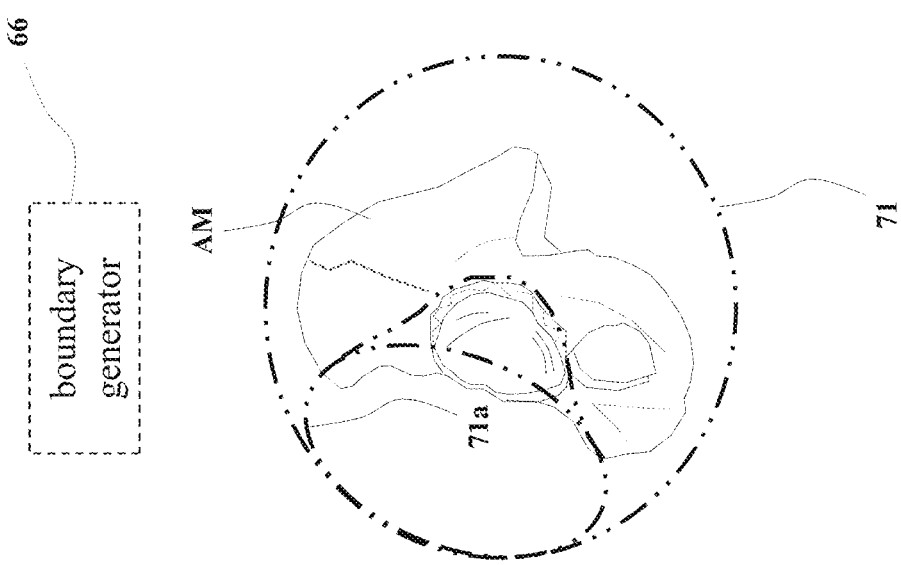
FIG. 4 illustrates output of a boundary generator for a surgical procedure on an acetabulum.

Referring to FIG. 3, the software employed by the control system 60 includes a boundary generator 66. As shown in FIG. 4, the boundary generator 66 is a software program or module that generates a virtual boundary 71 for constraining movement and/or operation of the tool 20. The virtual boundary 71 may be one-dimensional, two-dimensional, three-dimensional, and may comprise a point, line, axis, trajectory, plane, volume, surface, triangle mesh, or the like. The virtual boundary 71 may have a simple shape or complex geometric shape. In some embodiments, the virtual boundary 71 is a surface defined by a triangle mesh. The virtual boundaries 71 may also be referred to as virtual objects. The virtual boundaries 71 may be defined with respect to an anatomical model AM, such as a 3-D bone model. The anatomical model AM is associated with the real patient anatomy by virtue of the anatomical model AM being mapped to the patient's anatomy via registration or other process. In the example of FIG. 4, the virtual boundary 71 comprises a generally spherical mesh substantially surrounding an acetabulum with an entry portion 71a (opening) that provides access to the acetabulum. The entry portion has a funnel or conical shape. This virtual boundary 71 is associated with a 3-D model of the acetabulum.

The anatomical model AM and associated virtual boundaries 71 are registered to the one or more patient trackers 54, 55, 56. Thus, the anatomical model AM (and associated real patient anatomy) and the virtual boundaries 71 fixed to the anatomical model AM can be tracked by the patient trackers 54, 55, 56. The virtual boundaries 71 may be implant-specific, e.g., defined based on a size, shape, volume, etc. of an implant and/or patient-specific, e.g., defined based on the patient's anatomy. The virtual boundaries 71 may be boundaries that are created pre-operatively, intra-operatively, or combinations thereof. In other words, the virtual boundaries 71 may be defined before the surgical procedure begins, during the surgical procedure (including during tissue removal), or combinations thereof. In any case, the control system 60 obtains the virtual boundaries 71 by storing/retrieving the virtual boundaries 71 in/from memory, obtaining the virtual boundaries 71 from memory, creating the virtual boundaries 71 pre-operatively, creating the virtual boundaries 71 intra-operatively, or the like.

The manipulator controller 26 and/or the navigation controller 36 track the state of the tool 20 relative to the virtual boundaries 71. In one example, the state of the TCP is measured relative to the virtual boundaries 71 for purposes of determining haptic forces to be applied to a virtual rigid body model via a virtual simulation so that the tool 20 remains in a desired positional relationship to the virtual boundaries 71 (e.g., not moved beyond them). The results of the virtual simulation are commanded to the manipulator 14. The control system 60 controls/positions the manipulator 14 in a manner that emulates the way a physical handpiece would respond in the presence of physical boundaries/barriers. The boundary generator 66 may be implemented on the manipulator controller 26. Alternatively, the boundary generator 66 may be implemented on other components, such as the navigation controller 36.

Figure 5:
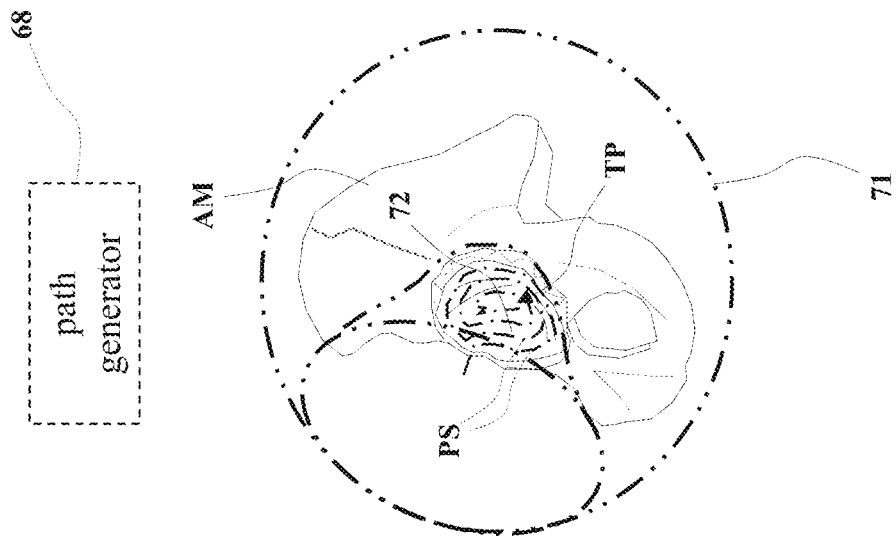
FIG. 5 illustrates output of a path generator for the surgical procedure on the acetabulum.

Referring to FIGS. 3 and 5, a path generator 68 is another software program or module run by the control system 60. In one example, the path generator 68 is run by the manipulator controller 26. The path generator 68 generates a tool path TP for the tool 20 to traverse, such as for removing sections of the anatomy to receive an implant. The tool path TP may comprise a plurality of path segments PS, or may comprise a single path segment PS. The path segments PS may be straight segments, curved segments, combinations thereof, or the like. The tool path TP may also be defined with respect to the anatomical model AM and may be tracked via one or more of the patient trackers 54, 55, 56. The tool path TP may be implant-specific, e.g., defined based on a size, shape, volume, etc. of an implant and/or patient-specific, e.g., defined based on the patient's anatomy.

In one version described herein, the tool path TP is defined as a tissue removal path, but, in other versions, the tool path TP may be used for treatment other than tissue removal. One example of the tissue removal path described herein comprises a milling path 72. It should be understood that the term "milling path" generally refers to the path of the tool 20 in the vicinity of the target site for milling the anatomy and is not intended to require that the tool 20 be operably milling the anatomy throughout the entire duration of the path. For instance, the milling path 72 may comprise sections or segments where the tool 20 transitions from one location to another without milling Additionally, other forms of tissue removal along the milling path 72 may be employed, such as tissue ablation, and the like. The milling path 72 may be a predefined path that is created pre-operatively, intra-operatively, or combinations thereof. In other words, the milling path 72 may be defined before the surgical procedure begins, during the surgical procedure (including during tissue removal), or combinations thereof. In any case, the control system 60 obtains the milling path 72 by storing/retrieving the milling path 72 in/from memory, obtaining the milling path 72 from memory, creating the milling path 72 pre-operatively, creating the milling path 72 intra-operatively, or the like. The milling path 72 may have any suitable shape, or combinations of shapes, such as circular, helical/corkscrew, linear, curvilinear, combinations thereof, and the like. The milling path 72 shown in FIG. 5, when traversed by the tool 20, is intended to remove material from the acetabulum to make room for an acetabular cup implant to be fitted to the acetabulum.

Example virtual boundaries 71 and/or milling paths 72 are shown in FIGS. 4-9. The particular shapes and arrangements of the virtual boundaries 71 and/or milling paths 72 shown are for illustrative purposes. Other shapes and arrangements are possible. As previously described, FIGS. 4 and 5 illustrate a virtual boundary 71 and a milling path 72 that are generated for use in a surgical procedure in which the acetabulum is being prepared (e.g., milled) to receive an acetabular cup implant.

Figure 6:
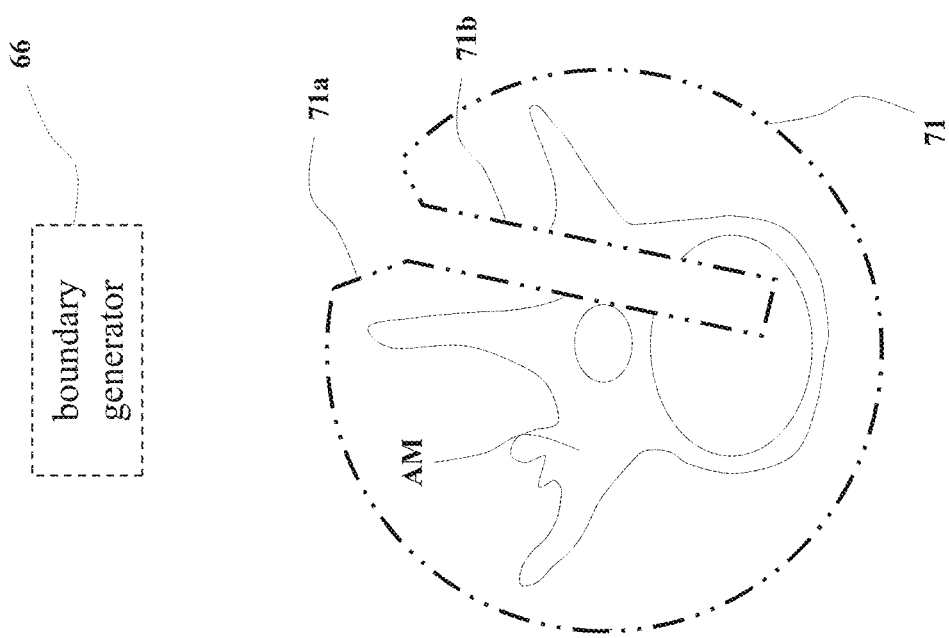
FIG. 6 illustrates output of a boundary generator for a surgical procedure on a vertebral body.

FIG. 6 illustrates a virtual boundary 71 comprising a generally spherical mesh substantially surrounding a vertebral body with an entry portion 71a (opening) that provides access to the vertebral body. The entry portion 71a has a funnel or conical shape and extends into a cylindrical portion 71b. This virtual boundary 71 is associated with a 3-D model of the vertebral body. This virtual boundary 71 is generated for use in a surgical procedure in which the vertebral body is being prepared (e.g. milled) to receive a screw or other implant.

Figure 8:
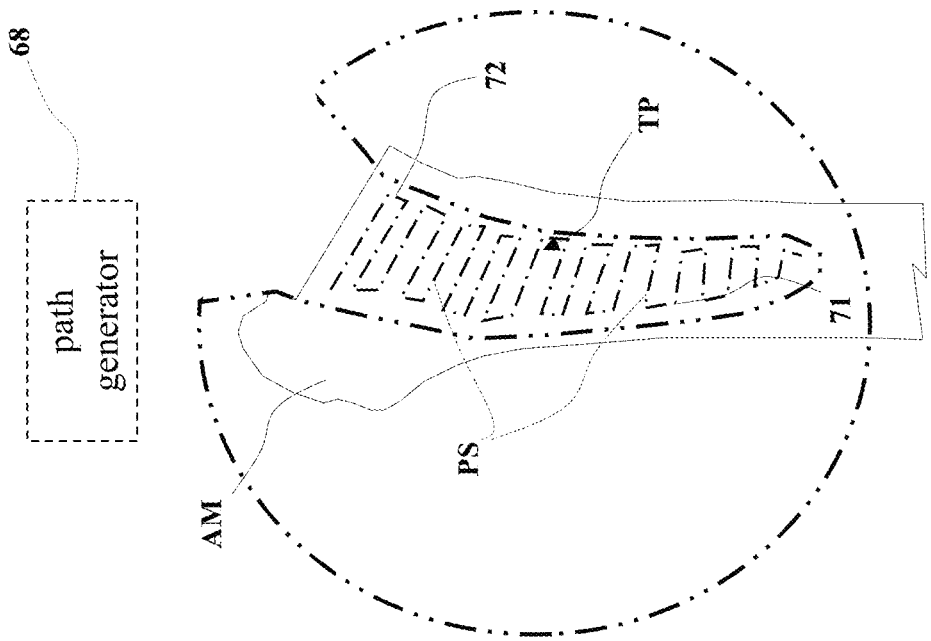
FIG. 8 illustrates output of a path generator for the surgical procedure on the femur.
Figure 7:
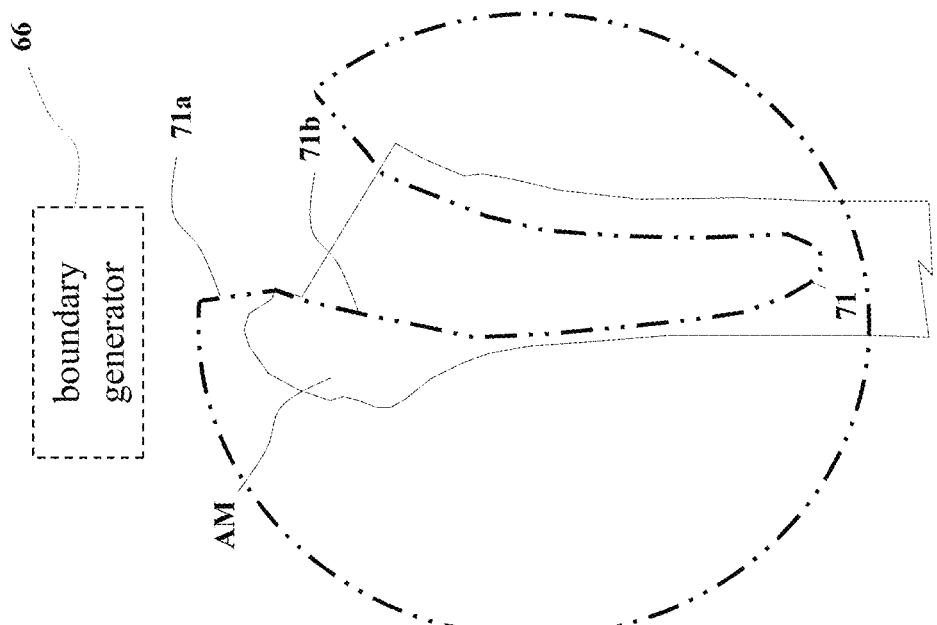
FIG. 7 illustrates output of a boundary generator for a surgical procedure on a femur.

FIG. 7 illustrates a virtual boundary 71 comprising a generally spherical mesh substantially surrounding one end of a femur with an entry portion 71a (opening) providing access to the femur. The entry portion 71a has a funnel or conical shape and extends to a canal portion 71b continuing down a medullary canal of the femur. This virtual boundary 71 is associated with a 3-D model of the femur. FIG. 8 illustrates a milling path 72 defined so that the tool 20 is able to remove material from the femur to make way for a femur stem implant. Thus, FIGS. 7 and 8 illustrate a virtual boundary 71 and a milling path 72 that are generated for use in a surgical procedure in which the femur F is being prepared (e.g., milled) to receive the femur stem implant.

Figure 9:
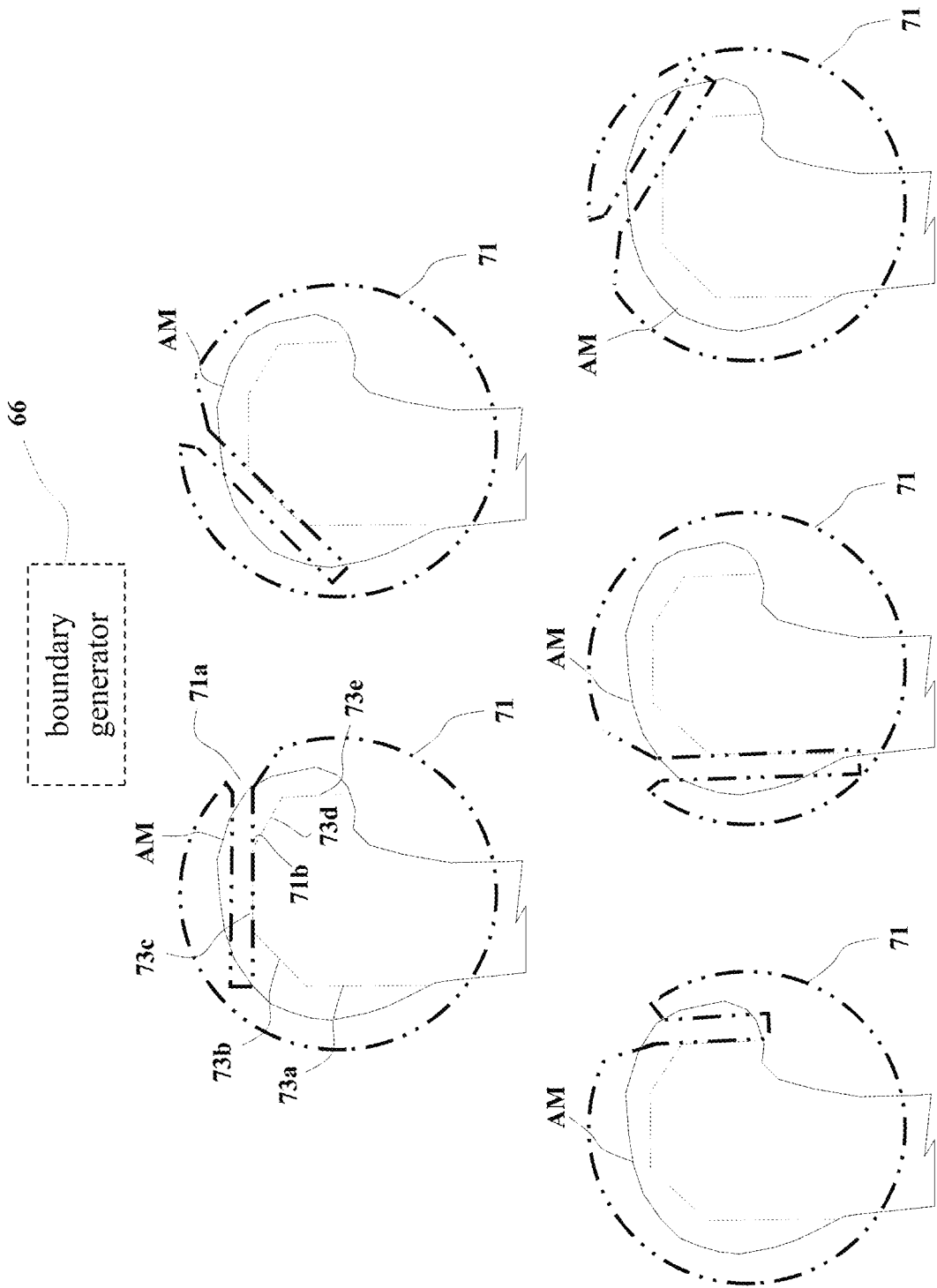
FIG. 9 illustrates output of a boundary generator for a surgical procedure on a femur.

FIG. 9 illustrates a series of virtual boundaries 71 that are generated for five cutting planes through a distal end of a femur. Each of the virtual boundaries 71 in FIG. 9 comprises a generally spherical mesh substantially surrounding the distal end of the femur with an entry portion 71a (opening) that provides access to the femur. The entry portion 71a continues into a cutting slot 7 lb defined along one of the five cutting planes 73a-73e. These virtual boundaries 71 are generated for use in a surgical procedure in which the femur F is being prepared (e.g., via planar resections with a saw blade) to receive a total knee implant. Other types/shapes of virtual boundaries and/or milling paths 72 are contemplated for use in other surgical procedures.

One example of a system and method for generating the virtual boundaries 71 and/or the milling path 72 is described in U.S. Pat. No. 9,119,655, entitled, "Surgical Manipulator Capable of Controlling a Surgical Instrument in Multiple Modes," the disclosure of which is hereby incorporated by reference. In some examples, the virtual boundaries 71 and/or milling paths 72 may be generated offline rather than on the manipulator controller 26 or navigation controller 36. Thereafter, the virtual boundaries 71 and/or milling paths 72 may be utilized at runtime by the manipulator controller 26.

Referring back to FIG. 3, two additional software programs or modules run on the manipulator controller 26 and/or the navigation controller 36. One software module performs behavior control 74. Behavior control 74 is the process of computing data that indicates the next commanded position and/or orientation (e.g., pose) for the tool 20. In some cases, only the position of the TCP is output from the behavior control 74, while in other cases, the position and orientation of the tool 20 is output. Output from the boundary generator 66, the path generator 68, and one or more sensors, such as a force/torque sensor S, may feed as inputs into the behavior control 74 to determine the next commanded position and/or orientation for the tool 20. The behavior control 74 may process these inputs, along with one or more virtual constraints described further below, to determine the commanded pose.

The second software module performs motion control 76. One aspect of motion control is the control of the manipulator 14. The motion control 76 receives data defining the next commanded pose from the behavior control 74. Based on these data, the motion control 76 determines the next position of the joint angles of the joints J of the manipulator 14 (e.g., via inverse kinematics and Jacobian calculators) so that the manipulator 14 is able to position the tool 20 as commanded by the behavior control 74, e.g., at the commanded pose. In other words, the motion control 76 processes the commanded pose, which may be defined in Cartesian space, into joint angles of the manipulator 14, so that the manipulator controller 26 can command the joint motors accordingly, to move the joints J of the manipulator 14 to commanded joint angles corresponding to the commanded pose of the tool 20. In one version, the motion control 76 regulates the joint angle of each joint J and continually adjusts the torque that each joint motor outputs to, as closely as possible, ensure that the joint motor drives the associated joint J to the commanded joint angle.

The boundary generator 66, path generator 68, behavior control 74, and motion control 76 may be sub-sets of a software program 78. Alternatively, each may be software programs that operate separately and/or independently in any combination thereof. The term "software program" is used herein to describe the computer-executable instructions that are configured to carry out the various capabilities of the technical solutions described. For simplicity, the term "software program" is intended to encompass, at least, any one or more of the boundary generator 66, path generator 68, behavior control 74, and/or motion control 76. The software program 78 can be implemented on the manipulator controller 26, navigation controller 36, or any combination thereof, or may be implemented in any suitable manner by the control system 60.

A clinical application 80 may be provided to handle user interaction. The clinical application 80 handles many aspects of user interaction and coordinates the surgical workflow, including pre-operative planning, implant placement, registration, bone preparation visualization, and post-operative evaluation of implant fit, etc. The clinical application 80 is configured to output to the displays 38. The clinical application 80 may run on its own separate processor or may run alongside the navigation controller 36. In one example, the clinical application 80 interfaces with the boundary generator 66 and/or path generator 68 after implant placement is set by the user, and then sends the virtual boundary 71 and/or tool path TP returned by the boundary generator 66 and/or path generator 68 to the manipulator controller 26 for processing and execution. Manipulator controller 26 executes the tool path TP as described herein, including generating path constraints as described below. The manipulator controller 26 may additionally create certain segments (e.g., lead-in segments) when starting or resuming machining to smoothly get back to the generated tool path TP. The manipulator controller 26 may also process the virtual boundaries 71 to generate corresponding virtual constraints as described further below.

II. Guided-Haptic Mode

The system 10 may operate in a manual mode, such as described in U.S. Pat. No. 9,119,655, incorporated herein by reference. Here, the user manually directs, and the manipulator 14 executes movement of the tool 20 and its energy applicator 24 at the surgical site. The user physically contacts the tool 20 to cause movement of the tool 20 in the manual mode. In one version, the manipulator 14 monitors forces and torques placed on the tool 20 by the user in order to position the tool 20. For example, the manipulator 14 may comprise the one or more sensors (e.g., the force/torque sensor S) that detects and measures the forces and torques applied by the user to the tool 20 and generates corresponding input used by the control system 60 (e.g., one or more corresponding input/output signals). The forces and torques applied by the user at least partially define an external force $F_{ext}$ that is used to determine how to move the tool 20 in the manual mode. The external force $F_{ext}$ may comprise other forces and torques, aside from those applied by the user, such as gravity-compensating forces, backdrive forces, and the like, as described in U.S. Pat. No. 9,119,655, incorporated herein by reference. Thus, the forces and torques applied by the user at least partially define the external force $F_{ext}$, and in some cases may fully define the external force $F_{ext}$ that influences overall movement of the tool 20 in the manual mode.

The force/torque sensor S may comprise a 6-DOF force/torque transducer, as disclosed, for example, in U.S. Pat. No. 9,119,655, incorporated herein by reference. The force/torque sensor S may form part of the tool 20, the manipulator 14, or both. The force/torque sensor S may form part of an interface between the tool 20 and the manipulator 14, or may be placed in any suitable location so that forces and torques applied by the user to the tool 20 are transmitted to the force/torque sensor S. The manipulator controller 26 and/or the navigation controller 36 receives the input (e.g., signals) from the force/torque sensor S. In response to the forces and torques applied by the user, the manipulator 14 moves the tool 20 in a manner that emulates the movement that would have occurred based on the forces and torques applied by the user. Movement of the tool 20 in the manual mode may also be constrained in relation to the virtual boundaries 71 generated by the boundary generator 66. In some versions, measurements taken by the force/torque sensor S are transformed from a force/torque coordinate system FT of the force/torque sensor S to another coordinate system, such as a virtual mass coordinate system VM in which a virtual simulation is carried out on the virtual rigid body model of the tool 20 so that the forces and torques can be virtually applied to the virtual rigid body in the virtual simulation to ultimately determine how those forces and torques (among other inputs) would affect movement of the virtual rigid body, as described below.

The system 10 may also operate in a semi-autonomous mode in which the manipulator 14 autonomously moves the tool 20 along the milling path 72 (e.g., the active joints J of the manipulator 14 operate to move the tool 20 without requiring force/torque on the tool 20 from the user). An example of operation in the semi-autonomous mode is also described in U.S. Pat. No. 9,119,655, incorporated herein by reference. In some embodiments, when the manipulator 14 operates in the semi-autonomous mode, the manipulator 14 is capable of moving the tool 20 free of user assistance. Free of user assistance may mean that a user does not physically contact the tool 20 to move the tool 20. Instead, the user may use some form of remote control RC (see FIG. 1) that is in communication with the manipulator 14 (e.g., wired or wireless) to control starting and stopping of movement. For example, the user may hold down a button of the remote control RC to start movement of the tool 20 and release the button to stop movement of the tool 20. Such a remote control RC embodied as a user pendant is disclosed in U.S. Pat. No. 10,117,713 to Moctezuma de La Barrera et al., entitled "Robotic Systems and Methods for Controlling a Tool Removing Material from a Workpiece," which is hereby incorporated herein by reference.

In the manual mode, it may be challenging for the user to move the tool 20 from its current state to a target state, i.e., to a target position, a target orientation, or a target pose (position and orientation). It may be desirable for the tool 20 to be moved to a particular target state for any number of reasons, such as to place the tool 20 in a desired proximity to the milling path 72, to place the tool 20 at an orientation suitable for preparing tissue to receive an implant, for aligning the tool 20 with a particular trajectory/plane, or the like. The difficulty in moving the tool 20 to the target state can be exacerbated when the patient's anatomy is partially obstructed from the user's view by soft tissue, fluids, etc. To this end, the system 10 may be switched from the manual mode to the semi-autonomous mode, such as in the manner described in U.S. Pat. No. 9,119,655, incorporated herein by reference. To place the tool 20 at the target state, the manipulator 14 autonomously moves the tool 20 from the current state to the target state.

Should the user wish to maintain manual contact with the tool 20 to effect control of the tool 20 during movement toward the target state, the system 10 may also operate in a guided-haptic mode. The guided-haptic mode may be used to help guide the user into placing the tool 20 at the target state (attractive) or to guide the user away from the target state (repulsive). In the guided-haptic mode, aspects of control used in both the manual mode and the semi-autonomous mode are utilized. For example, forces and torques applied by the user are still detected by the force/torque sensor S to determine the external force $F_{ext}$ that is fed into the virtual simulation to at least partially influence overall movement of the tool 20. Additionally, in the guided-haptic mode, the system 10 generates virtual attractive (or repulsive) forces and torques embodied in a virtual constraint force $F_c$ that is fed, along with the external force $F_{ext}$, into the virtual simulation. While the guided-haptic mode may be used to keep the user away from the target state (repulsive haptics), the examples described below focus on the use of the guided-haptic mode to attract the tool 20 toward the target state (attractive haptics). Hence, any of the software, hardware, techniques, methods and/or computations described below with respect to attractive haptics can be applied fully to repulsive haptics.

The virtual attractive forces and torques that can be applied to the virtual rigid body in the virtual simulation are adapted to attract the tool 20 toward the target state. The virtual attractive forces and torques influence overall movement of the tool 20 in a way that ultimately provides the user with haptic feedback to indicate to the user how the tool 20 should be moved to reach the target state. More specifically, in the virtual simulation, the virtual attractive forces and/or torques may supplement and/or counteract the effects of the forces and/or torques of the external force $F_{ext}$ (and/or other forces and torques) such that the tool 20 is ultimately moved in a way that provides the user with haptic interaction effects that indicate the direction/rotation in which the tool 20 needs to be moved to reach the target state. Thus, the guided-haptic mode relies on manual manipulation of the tool 20 to move the tool 20, but such movement, instead of merely emulating the movement that would have occurred based on the forces and torques applied by the user, is actively controlled to guide the user toward the target state via the virtual attractive forces and torques. Therefore, the guided-haptic mode combines direct user engagement with the tool 20 and the benefits associated with autonomous movement of the tool 20.

Figure 10:
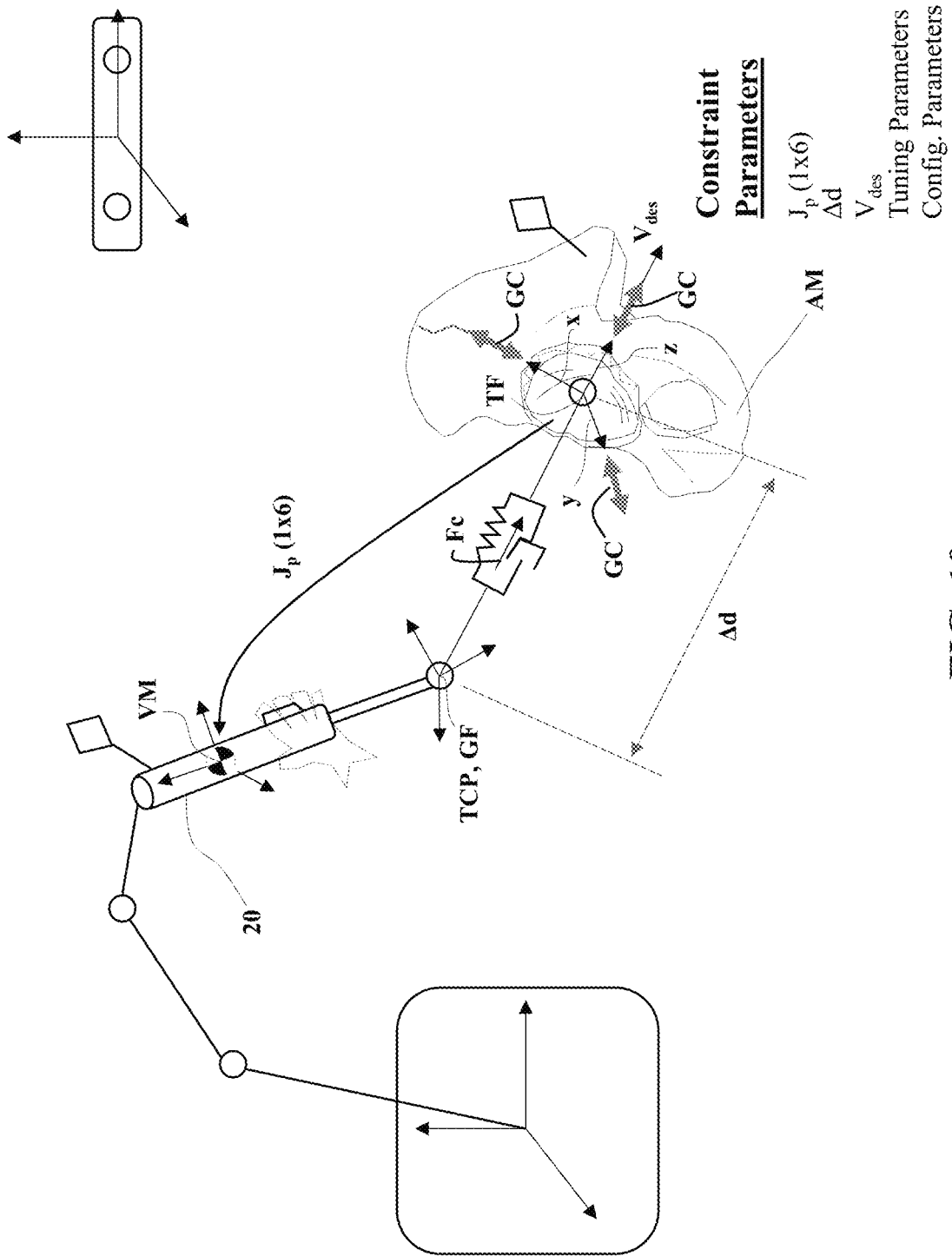
FIG. 10 is an illustration of virtual constraints and a virtual attractive force.

In the guided-haptic mode, the tool 20 is effectively attracted toward the target state to provide haptic interaction effects to the user. These effects may be generated in one or more degrees of freedom to attract the tool 20 toward the target state. Thus, the target state may be defined such that the tool 20 is being attracted in only one degree of freedom, or may be defined such that the tool 20 is being attracted in more than one degree of freedom. Accordingly, the target state may comprise a target position, target orientation, or both, defined in a target coordinate system TF (also referred to as a target frame TF). As shown in FIG. 10, the target position may comprise one or more position components with respect to x, y, and/or z axes of the target coordinate system TF, e.g., a target x position, a target y position, and/or a target z position. In some cases, the target position is represented as the origin of the target coordinate system TF. The target orientation may comprise one or more orientation components with respect to the x, y, and/or z axes of the target coordinate system TF, e.g., a target x orientation, a target y orientation, and/or a target z orientation. In some cases, the target orientation is represented as the orientation of the x, y, and z axes of the target coordinate system TF. Target pose means a combination of the one or more position components and the one or more orientation components. In some cases, the target pose may comprise a target position and target orientation in all six degrees of freedom of the target coordinate system TF. In some cases, the target position and/or target orientation may also be referred to as starting position and/or starting orientation.

The target coordinate system TF can be any coordinate system in which the target state is defined, and the target state can be transformed to any other coordinate system desired for monitoring the current state of the tool 20 relative to the target state of the tool 20. The target state can be tracked in a tracker coordinate system, the localizer coordinate system LCLZ, the manipulator coordinate system MNPL, the virtual mass coordinate system VM, the TCP coordinate system, or the like. The target state may be defined with respect to the anatomical model AM for the patient and may be fixed with respect to the patient's anatomy in an anatomical model coordinate system, an anatomy tracker coordinate system, or the like.

The current state of the tool 20 may be defined with respect to a guided coordinate system GF (also referred to as a guided frame GF). The guided coordinate system GF may be tied to another coordinate system, such as the virtual mass coordinate system VM, or the current state may be transformed to any other coordinate system to enable tracking of the current state relative to the target state. The current state can be tracked in a tracker coordinate system, the localizer coordinate system LCLZ, the manipulator coordinate system MNPL, the virtual mass coordinate system VM, the TCP coordinate system, or the like. In some of the versions described herein, the current state of the tool 20 is initially defined by the TCP coordinate system (e.g., the TCP coordinate system and the guided coordinate system GF are shown as being the same for ease of illustration). Both the guided coordinate system GF and the target coordinate system TF can be transformed to a common coordinate system for tracking purposes. The target state may be defined pre-operatively, intraoperatively, or both.

III. Guide Constraints

The control system 60 employs virtual constraints that are defined to yield the virtual attractive forces and torques employed in the virtual simulation that attracts the tool 20 to the target state. These virtual constraints are referred to herein as guide constraints. The guide constraints are defined to ultimately influence movement of the tool 20 toward the target state so that the user is provided with one or more of the haptic interaction effects described above. Generally, virtual constraints are restrictions on the motion of rigid bodies that are considered by the control system 60, along with other motion-related information, to determine how to command the manipulator 14 to move the tool 20. The guide constraints, as described further below, have configurable spring and damping properties so that the guide constraints are not infinitely stiff. More specifically, in some versions, the guide constraints are defined as "soft constraints" such that they do not prevent motion that violates them, such as motion resulting from forces and torques applied by the user in opposite directions to the target state. Thus, in the guided-haptic mode the user may still be able to influence motion of the tool 20 into a direction opposing the target state, in violation of the guide constraints, yet the guide constraints still act to generate attractive forces and torques opposing the user that the user feels (haptic interaction effects) so that the user knows which direction the tool 20 should be moved to reach the target state. For example, the user may feel these haptic interaction effects by virtue of the ease in which the tool 20 may be moved toward the target state, as compared to moving away from the target state, i.e., the user may feel as though more work is needed to move the tool 20 away from the target state as compared to moving toward the target state. In other words, it may feel to the user as though a physical spring interconnects the guided coordinate system GF of the tool 20 with the target coordinate system TF (see illustration of spring and damper in FIG. 10).

One or more guide constraints may be used by the control system 60 to guide the user, including up to three guide constraints associated with the target position and up to three guide constraints associated with the target orientation. As described in more detail below, the control system 60 operates to calculate the constraint force $F_c$ that satisfies, or attempts to satisfy, the guide constraints (and other virtual constraints, if used). The constraint force $F_c$ incorporates the virtual attractive forces and torques therein to attract the tool 20 to the target state. Each of the guide constraints are considered one-dimensional, virtual constraints. In some versions, the guide constraints are velocity impulse constraints in which forces and/or torques are calculated to apply a virtual impulse to an object in the virtual simulation to cause a change in the object's velocity in accordance with desired constraint parameters. In some versions, the constraints are similar to those used in the impulse modeling described in U.S. Pat. No. 9,119,655, incorporated herein by reference. In some versions, virtual constraints are defined exclusively in the guided-haptic mode, and not in the manual mode or the semi-autonomous mode. In some versions, virtual constraints are used in all modes.

In FIG. 10, three guide constraints GC associated with a target position are illustratively represented as being defined in the target coordinate system TF with their respective constraint directions being defined as the x, y, z axes of the target coordinate system TF. The constraint direction of any constraint is the direction along which the constraint can effectively apply force. The constraint directions could also be defined in the guided coordinate system GF, or the constraint directions could be defined using any known relationships to either the target coordinate system TF or the guided coordinate system GF. The constraint force $F_c$ that is ultimately calculated as a result of these three guide constraints GC is illustrated as comprising an attractive force that incorporates spring and damping properties that guides the TCP of the tool 20 to the target position, e.g., to the origin of the target coordinate system TF. This is merely one example. The constraint force $F_c$ may comprise components of force and torque to also align the tool 20 with a target orientation.

Each of the guide constraints (and other virtual constraints, if used) are defined primarily by three runtime parameters: a constraint Jacobian Jp, which maps force/velocity, applied at the guided coordinate system GF along each one-dimensional, guide constraint's constraint direction to a coordinate system employed for the virtual simulation (e.g., along a component of the target coordinate system TF to the virtual mass coordinate system VM); a desired velocity $V_{des}$ (or Vp2) which is a scalar velocity resulting from projecting the velocity of the target coordinate system TF (relative to a stationary reference such as the manipulator coordinate system MNPL at the base 16 of the manipulator 14) onto the constraint direction, wherein the desired velocity may be zero when the patient is immobile, or non-zero when the patient moves, if the target coordinate system TF is specified relative to the patient via a corresponding anatomy tracker; and a constraint distance $\Delta d$, which is a scalar distance resulting from projecting the linear/angular distance between the guided coordinate system GF and the target coordinate system TF onto the constraint direction. In some cases, $\Delta d$ refers to a distance/angle component of the current state (indicated by the guided coordinate system GF) from the target state (indicated by the target coordinate system TF), and a guide constraint is violated any time the current state does not match the target state for the associated degree of freedom. In FIG. 10, three separate guide constraints GC are represented with each of them having a specific constraint direction, e.g., the x, y, and z axes of the target coordinate system TF. The corresponding constraint Jacobian Jp, desired velocity $V_{des}$, and $\Delta d$ for each constraint is computed based on the constraint direction. For simplicity, FIG. 10 only shows a single constraint Jacobian Jp, desired velocity $V_{des}$, and $\Delta d$ for the guide constraint GC having its constraint direction along the z-axis of the target coordinate system TF (e.g., the z-axis guide constraint GC). Thus, the $V_{des}$, and $\Delta d$ shown here are those values for the guide constraint applied along the z direction of the target coordinate system TF, but there would also usually be nonzero values of the $V_{des}$ and $\Delta d$ for the other guide constraints (e.g., the x-axis guide constraint and the y-axis guide constraint), although not represented.

The guide constraints are not infinitely rigid, but instead each of the guide constraints has tuning parameters to adjust the stiffness of the virtual constraints, e.g., by incorporating spring and damping parameters into the constraints. Such parameters may include a constraint force mixing parameter (C) and an error reduction parameter (E), which can be computed to achieve an equivalent spring/damper behavior. The spring and damping parameters may be adjusted during operation in the guided-haptic mode. In some versions, values for the tuning parameters may change based on a relationship between the current state and the target state. For example, the tuning parameters may be configured to increase in stiffness the closer the tool 20 gets to the target state, or the tuning parameters may decrease in stiffness as the tool 20 approaches the target state. The tuning parameters may be different for different guide constraints. For example, the guide constraints may comprise a first virtual constraint that has a first value for a tuning parameter and a second virtual constraint that has a second value for the tuning parameter, the first value being different than (e.g., greater) than the second value so that the resulting virtual attractive forces and/or torques embodied in the constraint force $F_c$ are adapted to attract the tool more strongly as a result of the first virtual constraint as compared the second virtual constraint. The values of the tuning parameters may be greater (e.g., stiffer) for position constraints than for orientation constraints, or vice versa.

The tuning parameters may also be set to: remain constant regardless of the distance/angle from the current state to the target state; rise/fall exponentially with distance; vary linearly with distance between the current state and the target state; vary with constraint direction; emulate the force/distance relationship of a gravitational field; and the like. A tuning parameter for one constraint associated with one degree of freedom may be set based on a relationship associated with another degree of freedom, e.g., the stiffness of an x-axis constraint may change based on the distance along the y-axis between the current state and the target state. The tuning parameters may also vary depending on the direction in which the tool 20 needs to move to reach the target state, e.g., more stiff when moving in one direction along the x-axis vs. the opposite direction along the x-axis. The tuning parameters can also be scaled depending on the constraint force $F_c$ that is ultimately computed based on the guide constraints, such as by increasing/decreasing the stiffness depending on the magnitude of the constraint force $F_c$, or any components thereof. Fixed values for one or more virtual attractive forces could also be added into the virtual simulation in some cases.

The tuning parameters for the guide constraints may be set so that the user can easily cause the tool 20 to move away from the target position and/or target orientation. In other words, the tuning parameters may be set so that, in the virtual simulation, the influence of the forces and torques applied by the user may outweigh the influence of the virtual attractive forces and torques. Thus, the control system 60 may be configured to enable the user to reposition and/or reorient the tool 20 away from the target position and/or target orientation even when the guide constraints are enabled. The tuning parameters for the guide constraints may be: set preoperatively; set intraoperatively; updated intraoperatively; and combinations thereof. The tuning parameters and their values, their correlation to a particular relationship, and the manner in which they may be scaled, may be stored in one or more look-up tables in any suitable memory in the control system 60 for later retrieval.

The guide constraints are activated when the user switches the system 10 to the guided-haptic mode, or when the system 10 automatically switches the system 10 to the guided-haptic mode. Of course, the guide constraints could be activated in other modes. Additionally, or alternatively, the user may be able to manually set the guide constraints (e.g., change one or more parameters of the guide constraints, activate/deactivate the guide constraints, etc., via one or more of the user interfaces UI). The user may employ the clinical application 80 for this purpose. The guide constraints may also be triggered when certain surgical steps are being performed, e.g., cutting a desired volume of tissue, etc.), or when the system 10 detects or otherwise recognizes certain conditions, e.g., the system 10 detects that the user is having difficulty placing the tool 20 in the manual mode.

Each guide constraint also has configuration settings. The configuration settings may comprise: information regarding the tuning parameters, such as the constraint force mixing parameter (C) and the error reduction parameter ($\epsilon$), which can be specified directly, or indirectly via spring and damper parameters from which the constraint force mixing parameter (C) and the error reduction parameter ($\delta$) are computed; upper and/or lower force limits; and/or upper and lower constraint distance offsets. The upper and lower force limits refer to limits on the forces computed for each guide constraint that are ultimately solved by the constraint solver 86 to produce the constraint force $F_c$, as described further below. The guide constraints may be two-sided constraints (e.g., the forces computed to satisfy the constraints can be positive or negative), and the force limits can be set high in positive and negative directions (e.g., −100,000/+100,000 Newtons) or at any desired limit. The upper and lower constraint distance offsets dictate when the constraint is active. With respect to the guide constraints, the upper and lower constraint distance offsets can be set so that the constraint is active any time the current state is different than the target state. Additional configuration settings for each guide constraint may be a pose of the guided coordinate system GF (e.g., defined with respect to the virtual mass coordinate system VM) and the pose of the target coordinate system TF (e.g., defined with respect to an anatomy tracker). The poses of the guided coordinate system GF and the target coordinate system TF are used to compute the current state and the target state, respectively.

Figure 11:
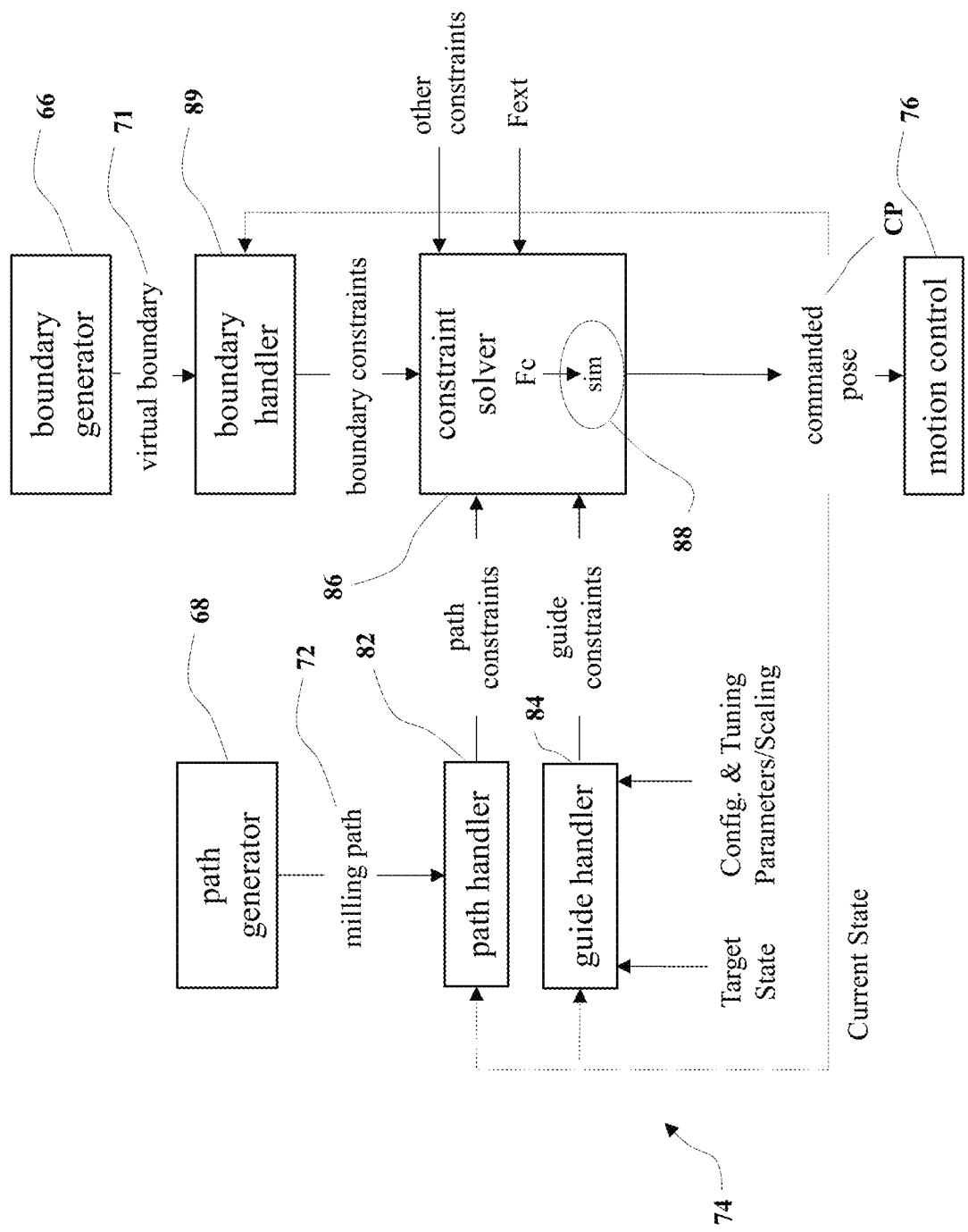
FIG. 11 is a block diagram of modules operable by the control system.

FIG. 11 is a block diagram of processes carried out to execute the guided-haptic mode, in some versions. In these versions, the behavior control 74 comprises a path handler 82, a guide handler 84, a constraint solver 86, and a virtual simulator 88. The behavior control 74 further comprises a boundary handler 89 to generate virtual boundary constraints based on the one or more virtual boundaries 71 generated by the boundary generator 66. The path handler 82, guide handler 84, constraint solver 86, virtual simulator 88, and boundary handler 89 each comprise executable software stored in a non-transitory memory of any one or more of the aforementioned controllers and implemented by the control system 60.

The guide handler 84 obtains the target state for the tool 20 and generates one or more guide constraints based on the target state and the current state of the tool 20. As previously mentioned, the target state (e.g., position, orientation, and/or velocity) can be specified as a target position, a target orientation, and/or a target velocity of the target coordinate system TF and the current state can be specified as a current position, a current orientation, and/or a current velocity of the guided coordinate system GF. As shown in FIG. 11, two inputs into the guide handler 84 comprise the current state and the target state. The current state may be defined with respect to the last commanded pose CP, since the last commanded pose CP correlates to the current pose of the tool 20. The commanded pose CP can be computed as a pose of the virtual mass coordinate system VM or the TCP coordinate system with respect to the manipulator coordinate system MNPL, for example. The target state may be defined in the anatomical coordinate system, anatomy tracker coordinate system, or the like, and transformed to a common coordinate system with the current state, such as the manipulator coordinate system MNPL. Other inputs into the guide handler 84 comprise the configuration and tuning parameters for the guide constraints. The guide handler 84 defines the one or more guide constraints based on the relationship between the current state and the target state and the configuration and tuning parameters. The guide constraints are output from the guide handler 84 into the constraint solver 86.

Various virtual constraints may be fed into the constraint solver 86, including the guide constraints, the path constraints, the boundary constraints, and other constraints. These constraints may be turned on/off by the control system 60. For example, in some cases, there may be no path constraints, no boundary constraints, and no other constraints being generated. Similarly, there may be no guide constraints being generated in some instances, and in certain modes of operation. All of the virtual constraints employed in the behavior control 74 may affect movement of the tool 20. For purposes of illustration, only the guide constraints will be described in detail.

The constraint solver 86 calculates the constraint force $F_c$ to be virtually applied to the tool 20 in the virtual simulator 88 based on the virtual constraints fed into the constraint solver 86. In the guided-haptic mode, the constraint force $F_c$ comprises components of force and/or torque adapted to attract the tool 20 toward the target state from the current state based on the one or more guide constraints. In cases where only the guide constraints are input into the constraint solver 86, the constraint force $F_c$ can be considered to be the virtual attractive force described above. However, when other constraints are employed, the constraint solver 86 is ultimately tasked with providing a solution for the constraint force $F_c$ that satisfies, or attempts to satisfy, all the constraints, and thus other constraints may also influence the magnitude/direction of the constraint force $F_c$. In those cases, the virtual attractive forces and torques are considered those force and torque components of the constraint force $F_c$ that are directed toward the target state as a result of the guide constraints.

Referring to the constraint equation shown in FIG. 12, the constraint solver 86 places the constraint data for each virtual constraint into a corresponding row of a constraint equation, in matrix form, to solve for $F_p$. For the example shown in FIG. 10, and for the case where only the guide constraints are active, $F_p$ is a force vector in the target coordinate system TF, i.e., each component of $F_p$ is a scalar constraint force acting in the corresponding constraint direction. In order to solve for $F_p$, as described below, the equation shown in FIG. 12 is converted into a matrix equation where each row represents a single, one-dimensional constraint. The constraint data is placed in the constraint equation, along with other information known by the constraint solver 86, such as the external force $F_{cgext}$, a damping force $F_{damping}$, an inertial force $F_{inertial}$, the virtual mass matrix M, a virtual mass velocity $V_{cg1}$, and the time step $\Delta t$ (e.g., 125 microseconds).

The virtual mass matrix M combines 3×3 mass and inertia matrices. The damping and inertial forces $F_{damping}$ and $F_{inertial}$ are calculated/known by the virtual simulator 88 and are based on the virtual mass velocity $V_{cg1}$ (e.g., the velocity of the virtual mass coordinate system VM) output by the virtual simulator 88 in a prior time step. The virtual mass velocity $V_{cg1}$ is a 6-DOF velocity vector comprising linear and angular velocity components. The damping force $F_{damping}$ is a 6-DOF force/torque vector computed as a function of the virtual mass velocity $V_{cg1}$ and a damping coefficient matrix (linear and rotational coefficients may not be equal). Damping is applied to the virtual mass to improve its stability and/or to give a desired feel to the user, e.g., how responsive the tool 20 is to the user's applied forces and torques. The inertial force $F_{inertial}$ is also a 6-DOF force/torque vector computed as a function of the virtual mass velocity $V_{cg1}$ and the virtual mass matrix M. The damping and inertial forces, $F_{damping}$ and $F_{inertial}$, can be determined in the manner described in U.S. Pat. No. 9,566,122 to Bowling et al., hereby incorporated herein by reference.

The constraint solver 86 may be configured with any suitable algorithmic instructions (e.g., an iterative constraint solver, Projected Gauss-Seidel solver, etc.) to solve this system of constraint equations in order to provide a solution satisfying the system of equations (e.g., satisfying the various constraints). In some cases, all constraints may not simultaneously be met. For example, in the case where motion is overconstrained by the various constraints, the constraint solver 86 will essentially find a 'best fit' solution given the relative stiffness/damping of the various constraints. The constraint solver 86 solves the system of equations and ultimately outputs the constraint force $F_p$.

When a Projected Gauss-Seidel solver is employed, the constraint solver 86 constructs A and b matrices based on the constraints, uses Projected Gauss-Seidel to solve the system of equations to determine the resulting force vector $F_p$, takes the output of Projected Gauss-Seidel and transforms it from the constraint coordinate system to the virtual mass coordinate system VM. For example, using the equation $F_c = J_p^T F_p$, wherein $F_c$ is the constraint force, the components of force vector $F_p$ are converted to an equivalent force/torque vector $F_c$ applied to the virtual mass coordinate system VM.

Methods of using Project Gauss-Seidel to solve a system of equations for multiple constraints is shown, for example, in "Constraint based physics solver" by Marijn Tamis and Giuseppe Maggiore, dated Jun. 15, 2015 (v1.02), which can be found at http://www.mft-spirit.nl/files/MTamis_ConstraintBasedPhysicsSolver.pdf, or in "Comparison between Projected Gauss-Seidel and Sequential Impulse Solvers for Real-Time Physics Simulations," by Marijn Tamis, dated Jul. 1, 2015 (v1.01), which can be found at http://www.mft-spirit.nl/files/MTamis_PGS_SI_Comparison.pdf, both of which are hereby incorporated herein by reference in their entirety.

The Projected Gauss-Seidel method addresses Linear Complementarity Problems (LCP). Inequality associated with LCP arises since some constraint types (e.g., one-sided constraints, such as the boundary constraints) can only push (apply force) in one direction, e.g., positive constraint force. If the calculated force for such a constraint is negative (or, more broadly, outside its allowed range) for a given iteration of the constraint solver 86, which is invalid, the given constraint must be pruned (or alternately limited/capped at its upper or lower allowed value) and the remaining constraints solved, until a suitable result (i.e., convergence) is found. In this manner, the constraint solver 86 determines the active set of constraints for a given time step, and then solves for their values. Other constraint types can apply forces in both positive and negative directions, e.g., two-sided constraints. Such constraints include the guide constraints used to guide the user into moving the tool toward the target state. Such two-sided constraints, when enabled, are usually active and not pruned/limited during the constraint solver 86 iterations.

The constraint force $F_c$ calculated by the constraint solver 86 comprises three components of force along x, y, z axes and three components of torque about the x, y, z axes. The virtual simulator 88 utilizes the constraint force $F_c$, along with the external force $F_{cgext}$, the damping force $F_{damping}$, and the inertial force $F_{inertial}$ (all of which may comprise six components of force/torque), in its virtual simulation. In some cases, these components of force/torque are first transformed into a common coordinate system (e.g., the virtual mass coordinate system VM) and then summed to define a total force $F_T$. The resulting 6-DOF force (i.e., force and torque) is applied to the virtual rigid body and the resulting motion is calculated by the virtual simulator 88. The virtual simulator 88 thus acts to effectively simulate how the various constraints, all of which are reflected in the total force $F_T$, affects motion of the virtual rigid body. The virtual simulator 88 performs forward dynamics to calculate the resulting 6-DOF pose and velocity of the virtual rigid body based on the given total force $F_T$ being applied to the virtual rigid body. In one example, the virtual simulator 88 comprises a physics engine, which is executable software stored in a non-transitory memory of any one or more of the aforementioned controllers 21, 26, 36 and implemented by the control system 60.

For the virtual simulation, the virtual simulator 88 models the tool 20 as the virtual rigid body in the virtual mass coordinate system VM typically with the origin of the virtual mass coordinate system VM being located at the center of mass of the virtual rigid body, and with the coordinate axes being aligned with the principal axes of the virtual rigid body. The virtual rigid body is a dynamic object and a rigid body representation of the tool 20 for purposes of the virtual simulation. The virtual rigid body is free to move according to six degrees of freedom (6-DOF) in Cartesian space according to the virtual simulation. The virtual simulation may be processed computationally without visual or graphical representations. Thus, it is not required that the virtual simulation display dynamics of the virtual rigid body. In other words, the virtual rigid body need not be modeled within a graphics application executed on a processing unit. The virtual rigid body may exist only for the virtual simulation.

The virtual rigid body and its properties (mass, inertia matrix, center of mass, principal axes, etc.) define how the tool 20 will move in response to applied forces and torques (e.g., from the total force $F_T$, which incorporates forces and torques applied by the user and attractive/repulsive forces and torques, and other forces and torques resulting from other constraints, if any). It governs whether the tool 20 will feel heavy or light and how it will move (e.g., accelerate in translation and rotation) in response to applied forces and torques. By adjusting the properties of the virtual rigid body, the control system 60 can adjust how the tool 20 feels to the user. It may be desirable to have the properties of the virtual rigid body modeled to be reasonably close to the actual properties of the tool 20, for as realistic motion/feel as possible, but that is not required. For control stability reasons (given the finite acceleration of the manipulator, control latencies, etc.), the virtual mass and inertia may be modeled to be somewhat higher than that of the physical tool 20.

The virtual rigid body may correspond to components, which may be on or within the tool 20. Additionally, or alternatively, the virtual rigid body may extend, in part, beyond the physical tool 20. The virtual rigid body may take into account the tool 20 with the energy applicator 24 or may take into account the tool 20 without the energy applicator 24. Furthermore, the virtual rigid body may be based on the TCP. In one example, the center of mass of the virtual rigid body is understood to be the point around which the virtual rigid body would rotate if a virtual force is applied to another point of the virtual rigid body and the virtual rigid body were otherwise unconstrained, i.e., not constrained by the manipulator 14. The center of mass of the virtual rigid body may be close to, but need not be the same as, the actual center of mass of the tool 20. The center of mass of the virtual rigid body can be determined empirically. Once the tool 20 is attached to the manipulator 14, the position of the center of mass can be reset to accommodate the preferences of the individual practitioners.

The virtual simulator 88 effectively simulates rigid body dynamics of the tool 20 by virtually applying forces and/or torques on the virtual rigid body in the virtual simulation, i.e., by virtually applying the components of force and torque from the total force $F_T$ on the center of mass of the virtual rigid body in the virtual mass coordinate system VM. Thus, the forces/torques virtually applied to the virtual rigid body may comprise forces/torques associated with the external force $F_{cgext}$ (e.g., which is based on input from the one or more sensors), the damping force $F_{damping}$, the inertial force $F_{inertial}$, and the forces/torques from the constraint force $F_c$ associated with the various constraints (by virtue of being embodied in the constraint force $F_c$).

Rigid body Jacobians can be used to transform velocities and forces from one coordinate system (reference frame) to another on the same virtual rigid body and may be employed here to transform the forces and torques of $F_{ext}$ to the virtual mass coordinate system VM as well (e.g., to yield $F_{cgext}$ used in the constraint equation). The virtual simulator 88 then internally calculates the damping force $F_{damping}$ and the inertial force $F_{inertial}$ to determine the total force Fr, and also to output the damping force $F_{damping}$ and the inertial force $F_{inertial}$ for use by the constraint solver 86 in its system of equations in the next time step.

Figure 14:
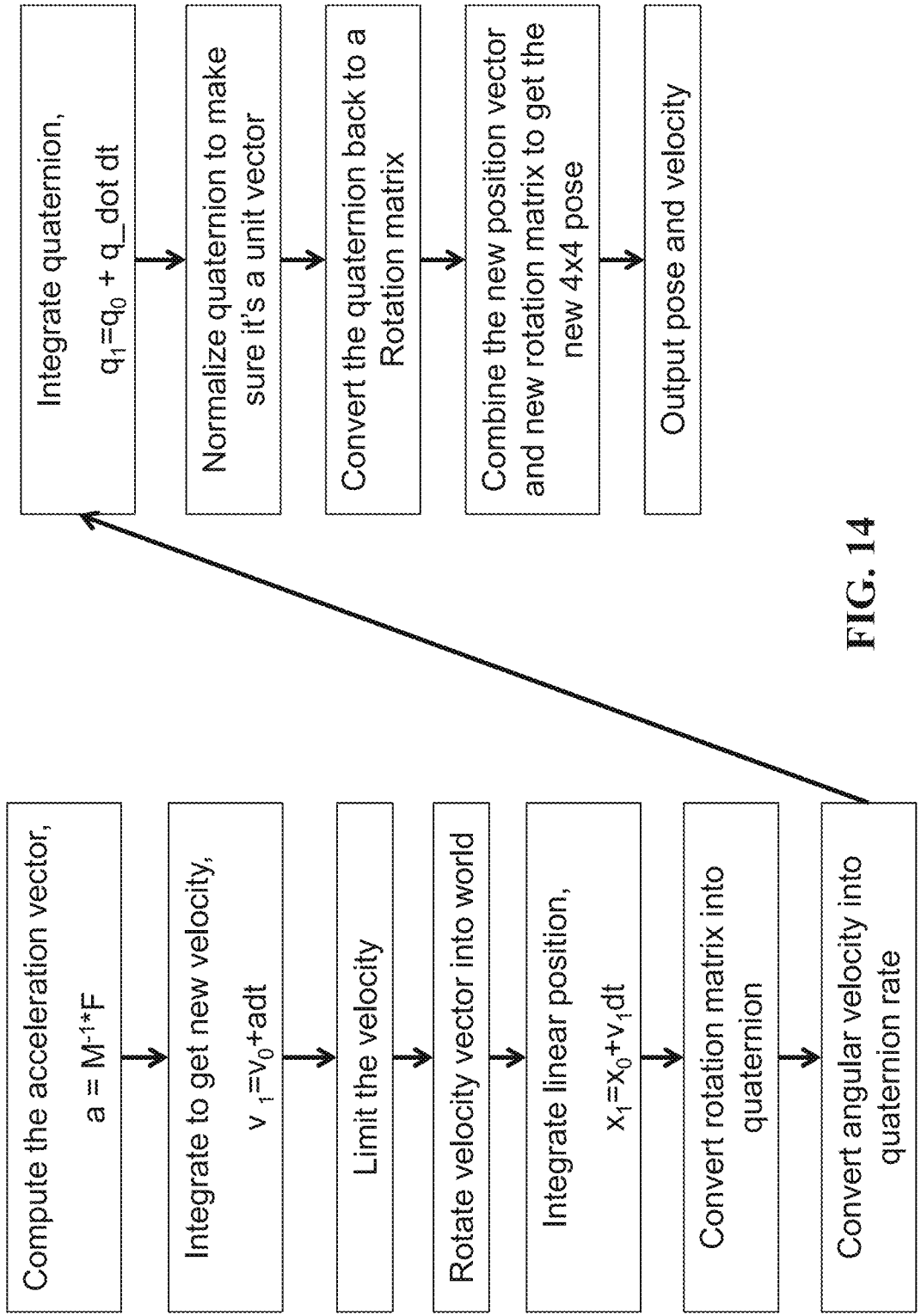

A virtual forward dynamics algorithm, as shown in FIGS. 13 and 14, may be employed in the virtual simulation to simulate the motion of the virtual rigid body as it would move upon application of the total force $F_T$. Effectively, the virtual forward dynamics algorithm solves the equation F=ma (or a=F/m) in 6-DOF and integrates the acceleration to yield velocity, which is then used to determine a new pose, as shown in FIG. 14. The control system 60 inputs the virtual forces and/or torques (e.g., the total force $F_T$) into the virtual simulator 88 and these virtual forces and/or torques are applied to the virtual rigid body at the center of mass (e.g., the CG) in the virtual simulation 88 when the virtual rigid body is in the initial pose with the initial velocity. The virtual rigid body is moved to a final pose having a different state (i.e., position and/or orientation) and with a final velocity within Cartesian space in response to the control system 60 satisfying the inputted virtual forces and/or torques. The next commanded pose CP to be sent to the motion control 76 is based on the final pose calculated by the virtual simulator 88. Thus, the virtual simulator 88 operates to determine the next commanded pose CP by simulating the effects of applying the total force $F_T$ on the virtual rigid body using virtual forward dynamics as shown in FIG. 14.

Velocity limits may be imposed on the virtual rigid body in the simulation. In some cases, the velocity limits may be set high so that they generally don't affect the simulation, or they may be set at any desired value. The virtual rigid body is in an initial pose (initial state) and has an initial velocity at commencement of each iteration of the virtual simulation (e.g., at each time step/interval dt). The initial pose and initial velocity may be defined as the final pose and the final velocity output by the virtual simulator 88 in the previous time step. Velocity limits can also be applied by increasing the damping coefficients used in calculating the damping force $F_{damping}$ as the velocity of the virtual rigid body approaches and/or exceeds a threshold value.

Thereafter, the virtual simulator 88 calculates and outputs the next commanded pose CP based on its virtual simulation. The control system 60 is configured to command the manipulator 14 to move the tool 20 based on the commanded pose CP, which ideally causes movement of the tool 20 in a manner that guides the user into placing the tool 20 at the target state by providing haptic feedback to the user that guides the user toward placing the tool 20 at the target state. Thus, the user is able to manually manipulate the tool 20, while the control system 60 assists in guiding the tool movement by utilizing the guide constraints. The user forces and torques applied to the tool 20 may still influence the overall movement of the tool 20 because the external force $F_{ext}$ is combined with the constraint force $F_c$ before running the virtual simulation to determine the commanded pose CP. In some instances (e.g., time steps), the total force $F_T$ includes components of force and torque from the external force $F_{ext}$ with magnitude and direction sufficient to overcome the forces and torques of the constraint force $F_c$ such that the tool 20 is movable away from the target state. However, the guide constraints have configurable stiffness and damping that can be tuned such that the external force $F_{ext}$ has less influence in certain situations, as previously mentioned.

Figure 15:
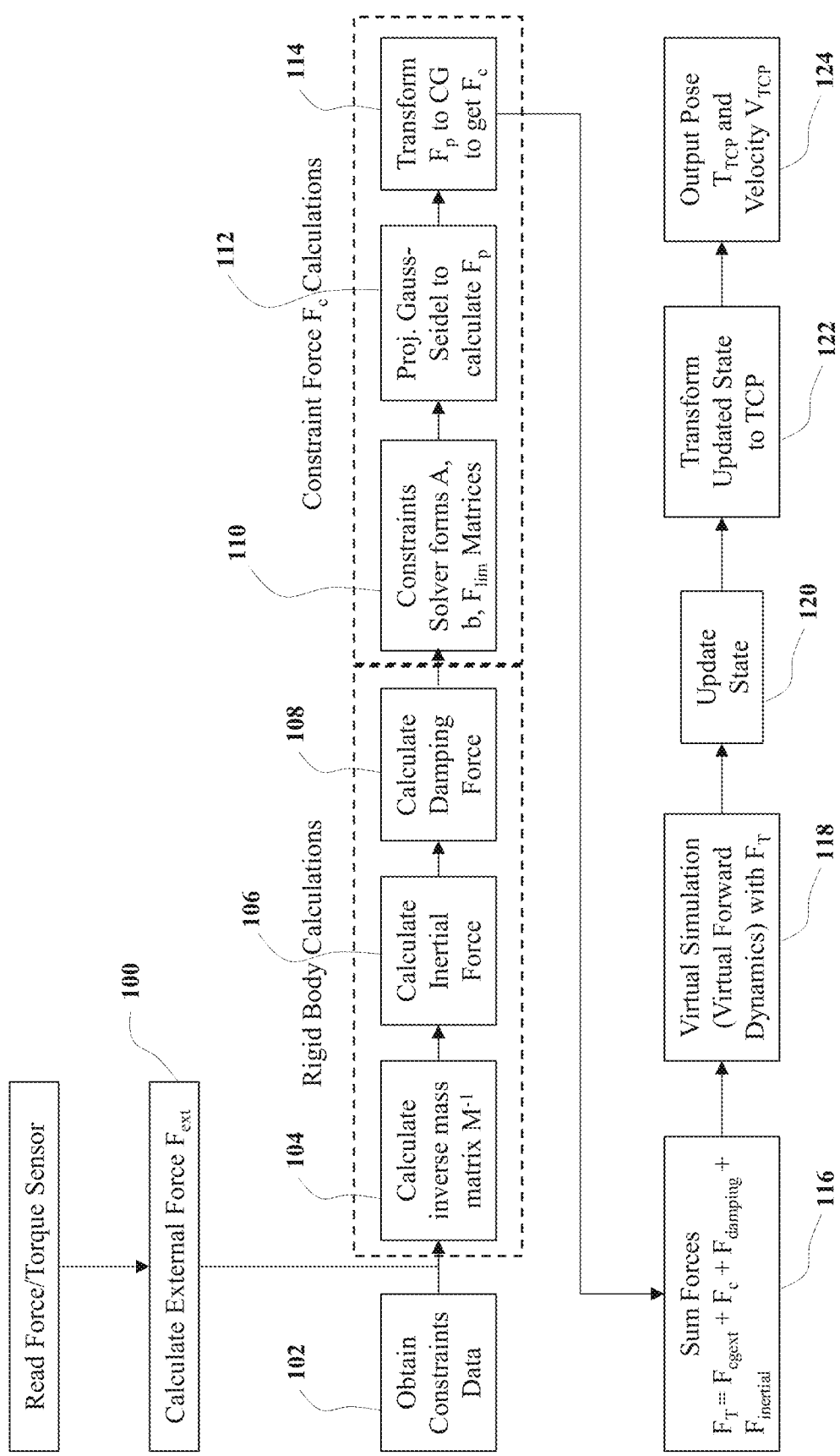
FIG. 15 shows an example set of steps carried out by the control system to solve constraints, perform forward dynamics, and determine a commanded pose.
Figure 16A:
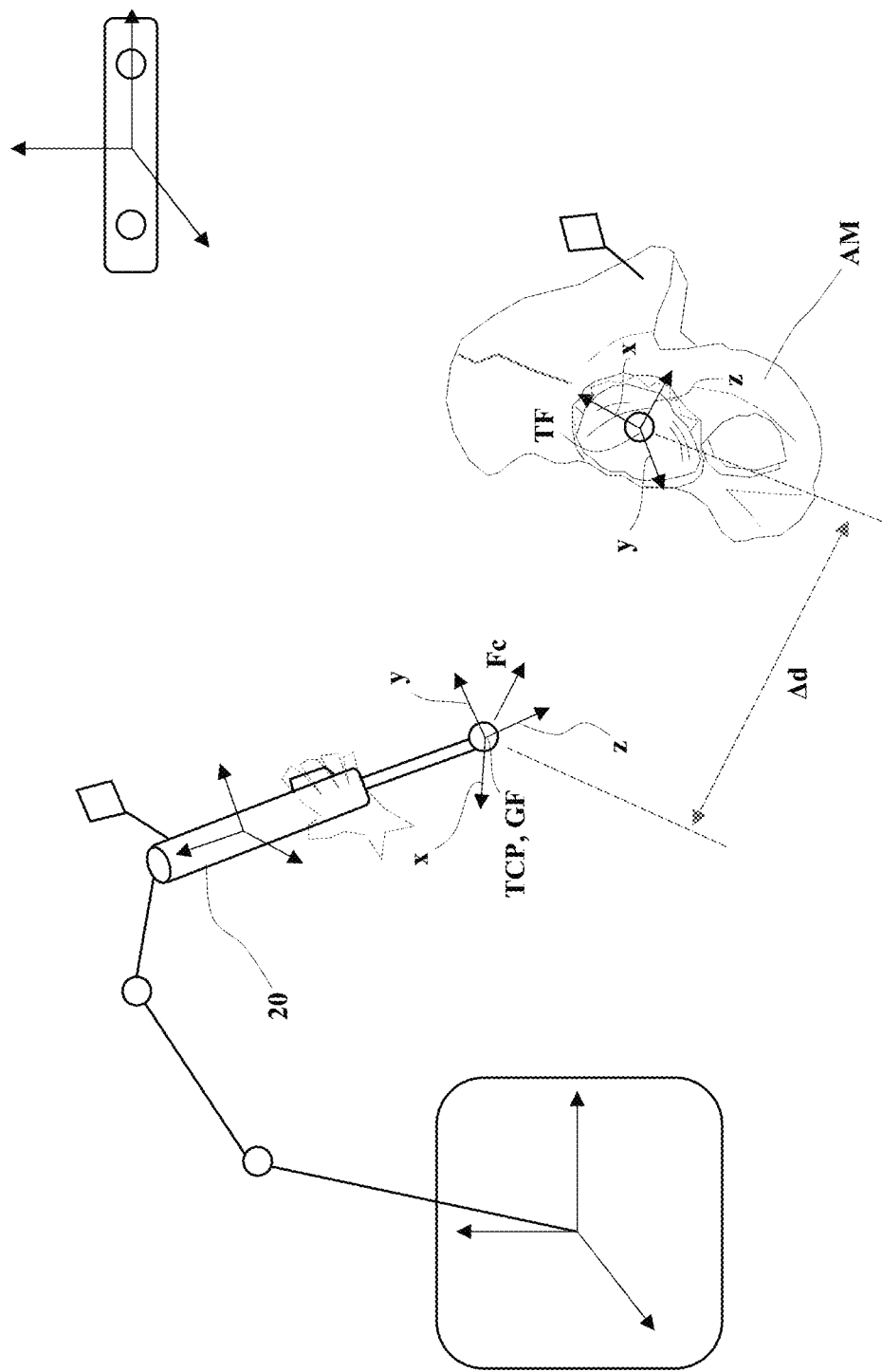
FIGS. 16A-16D illustrate movements of the tool in response to application of guide constraints to attract the tool to a target position and target orientation.
Figure 16B:
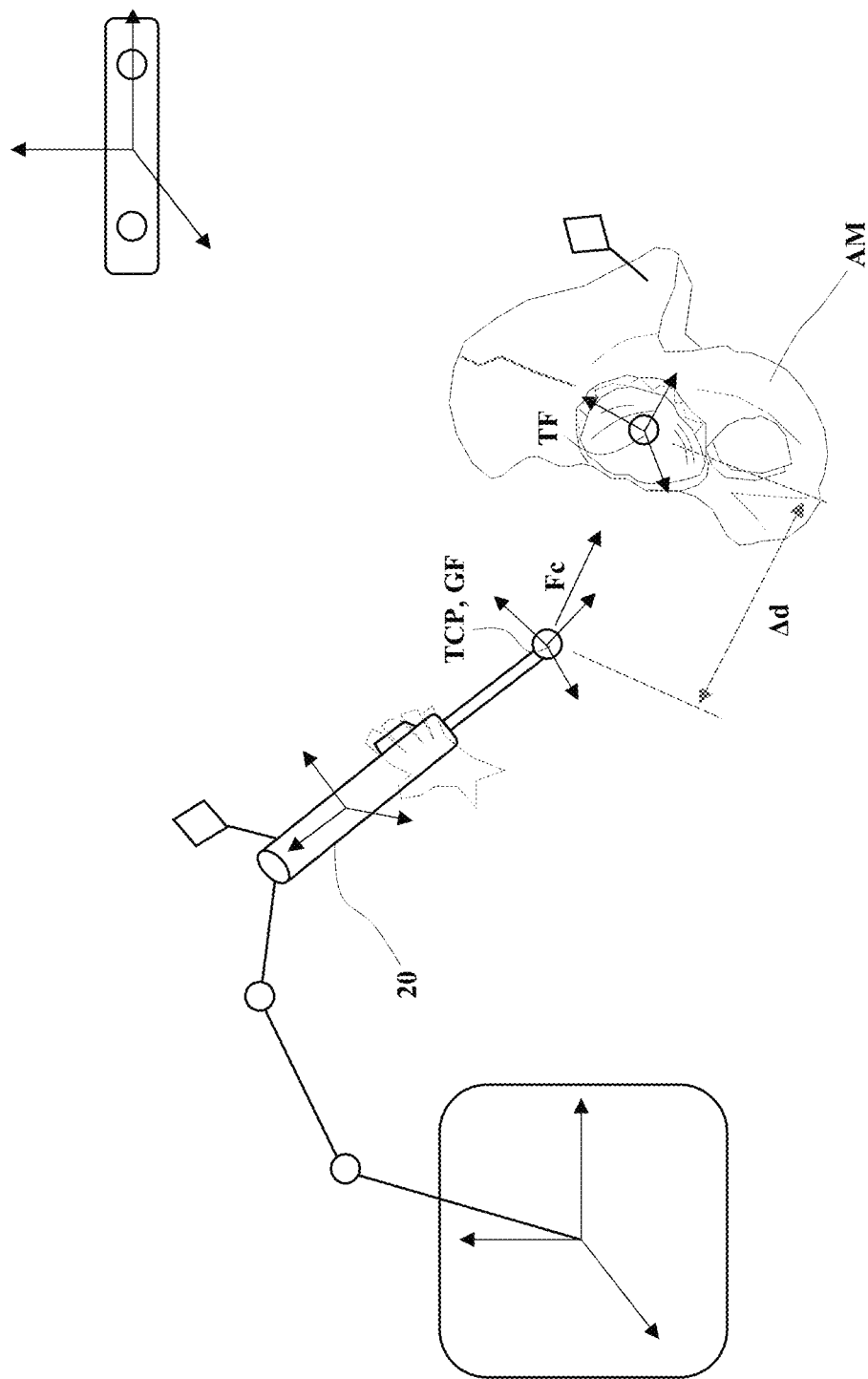
Figure 16C:
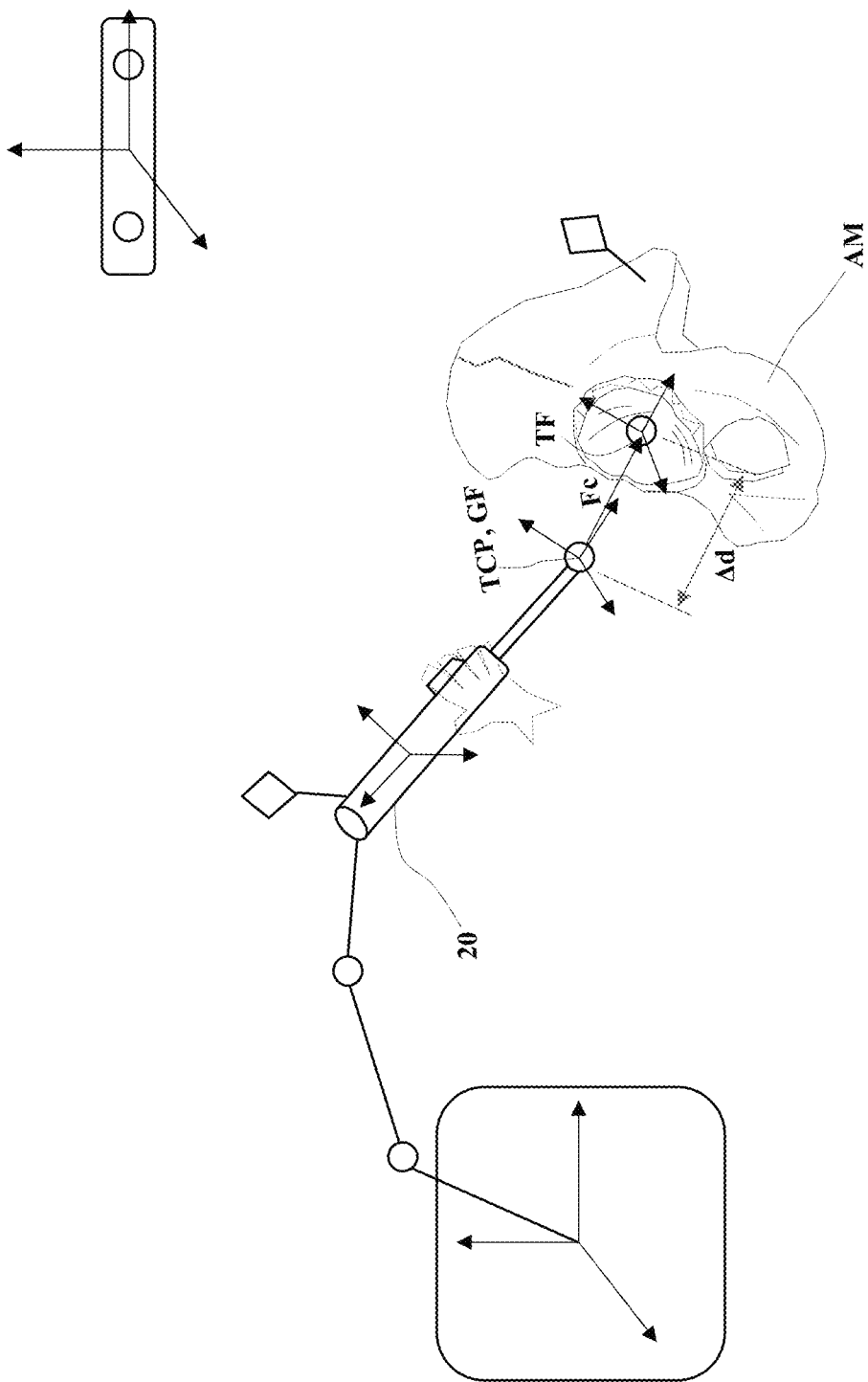
Figure 16D:
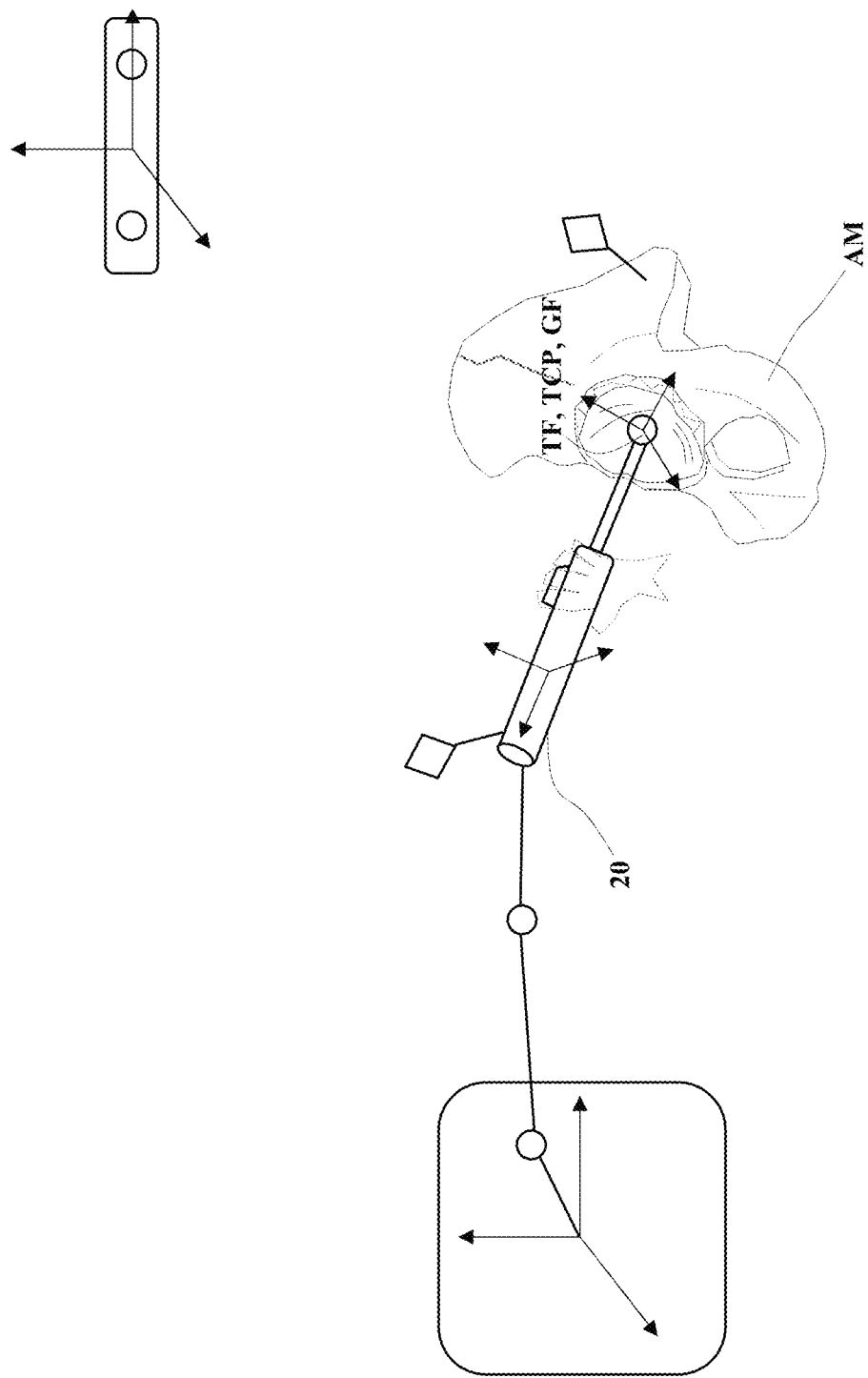

FIG. 15 summarizes various steps carried out by the behavior control 74. These include steps performed by the constraint solver 86 and the virtual simulator 88 as described above. In step 100, the external force $F_{ext}$ is calculated based on readings taken from the force/torque sensor S. In step 102, the constraints data associated with the various virtual constraints are fed into the constraint solver 86 from the path handler 82, from the guide handler 84, from the boundary handler 89, and/or from other constraint sources.

In steps 104-108, rigid body calculations are carried out by the virtual simulator 88 to determine the inverse mass matrix $M^{-1}$, the inertial force $F_{inertial}$, and the damping force $F_{damping}$ of the virtual rigid body. In steps 110-114, the constraint solver 86 utilizes the output from the rigid body calculations performed in steps 104-108 and the constraints data provided in step 102 to perform the constraint force calculations previously described to ultimately yield the constraint force $F_c$. In step 116, the constraint force $F_e$ is summed with the external force $F_{ext}$ transformed to the virtual mass coordinate system VM ($F_{cgext}$), the damping force $F_{damping}$, and the inertial force $F_{inertial}$ to yield the total force $F_T$. In step 118, the total force $F_T$ is applied to the virtual rigid body in the virtual simulation conducted by the virtual simulator 88 to determine a new pose and velocity of the virtual rigid body in step 120, and ultimately to transform the new pose and velocity to the TCP in step 122. The new commanded pose CP ($T_{TCP}$), and velocity ($V_{TCP}$) are output by the virtual simulator 88 in step 124.

IV. Examples a. Guide for Acetabulum Preparation

FIGS. 16A-16D illustrate an application of the guided-haptic mode. In this example, the control system 60 has activated the guided-haptic mode and the associated guide constraints to assist the user (see representation of user's hand) in placing the TCP of the tool 20 at a target position located at a center of the acetabulum of the patient and at a target orientation that is suitable to avoid collisions of the tool 20 with the acetabulum. Guide constraints are employed in six degrees of freedom to guide the user toward the target state, i.e., three position constraints along the x, y, z axes of the target coordinate system TF to guide the origin of the guided coordinate system GF to the origin of the target coordinate system TF and three orientation constraints about the x, y, z axes of the target coordinate system TF to guide the x, y, z axes of the guided coordinate system GF to align with the x, y, z axes of the target coordinate system TF. Notably, FIGS. 16A-16D only show a single guide constraint as being active along the z-axis of the target coordinate system TF (e.g., as represented by the associated Δd) and with the target coordinate system TF having zero velocity—resulting in the constraint force $F_c$ being defined directly along the z-axis of the target coordinate system TF. However, the other guide constraints (defined along the x-axis and the y-axis of the target coordinate system TF) would also typically be active as well, although not shown.

In some cases, the orientation guide constraint about the z-axis could be removed or inactive such that the x, y axes of the guided coordinate system GF may not be guided into alignment with the x, y axes of the target coordinate system TF, since the tool 20 may comprise a bur or other energy applicator that does not require precisely orienting the tool 20 about the z-axis. In some cases, only one, two, three, or four guide constraints may be used. More than six guide constraints could also be used, such as when more than one guide constraint is defined for any degree of freedom. The progression from FIG. 16A through 16D shows the guided coordinate system GF aligning with the target coordinate system TF in all six degrees of freedom by virtue of six guide constraints, for illustration purposes.

In the progression from FIG. 16A through FIG. 16D, the TCP of the tool 20 is shown moving toward the target state (in this case, toward the origin of the target coordinate system TF). At each time step, the constraint force $F_c$ is calculated and takes into account the guide constraints, to effectively guide the user into applying forces and torques that ideally move the tool 20 toward the target state. The guide constraints may be dynamic by virtue of their tuning parameters being adjusted at each time step. For example, the guide constraints may have stronger spring and/or damping properties the closer the current state gets to the target state (e.g., the closer the guided coordinate system GF gets to the target coordinate system TF—see Δd). Thus, the constraint force $F_c$ (which may comprise components of force and/or torque that correlate to the stronger spring and/or damping properties) may increase in magnitude as the guided coordinate system GF approaches the target coordinate system TF.

b. Guide for Vertebral Body Preparation

Figures 17, 18:
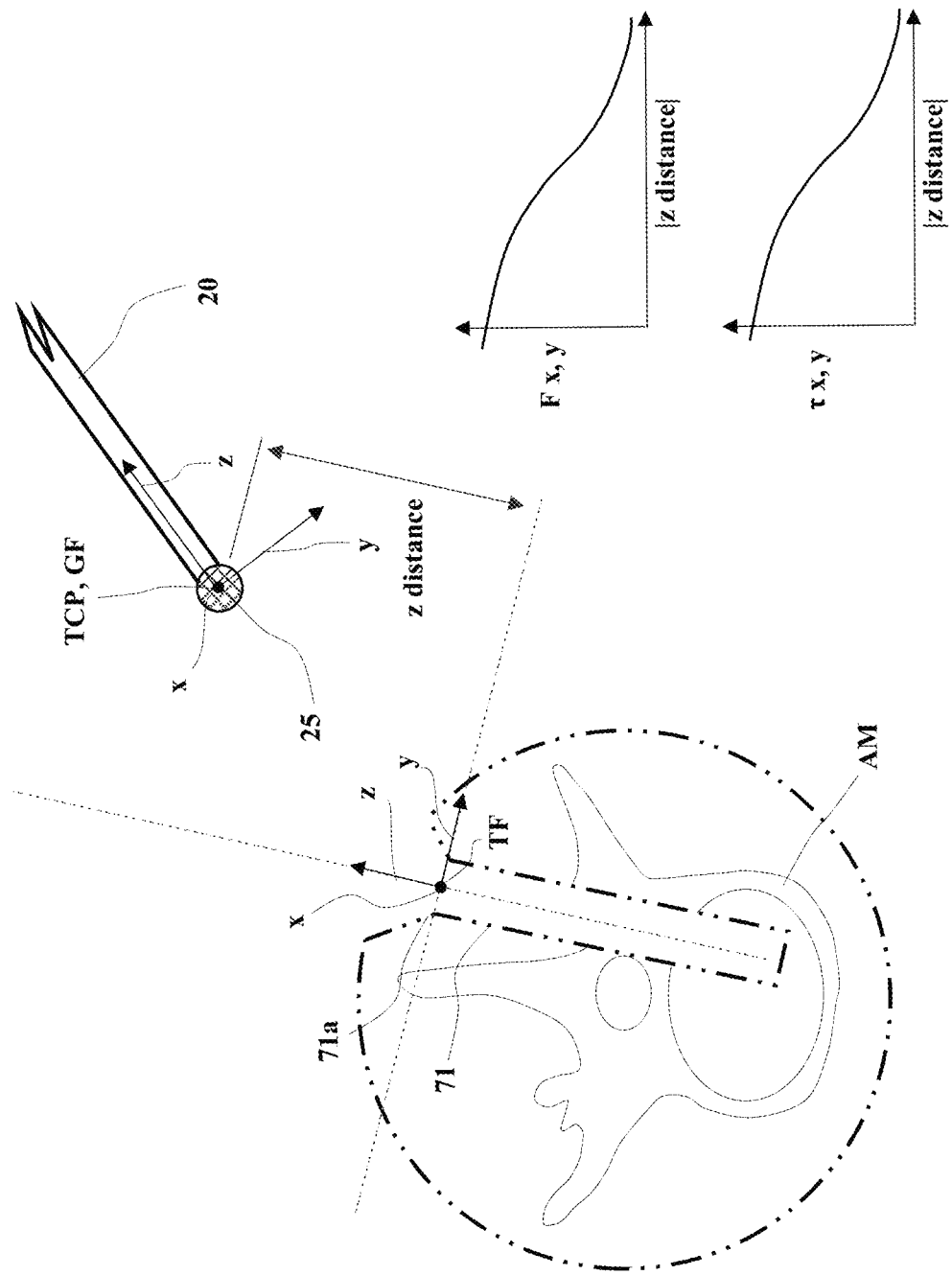
FIG. 17 illustrates another application of guide constraints to attract the tool to a target position and target orientation to prepare a hole in a vertebral body.
FIG. 18 is a pair of graphs showing the change in a constraint force in x, y directions and about x, y axes with respect to z distance.

FIGS. 17 and 18 illustrate another example of the guided-haptic mode being used to assist the user in placing the tool 20 at the target state. In this example, the control system 60 has activated the guided-haptic mode and the associated guide constraints to assist the user in placing the TCP of the tool 20 (e.g., the bur 25 or a drill) at a target position with respect to a planned bore for a pedicle screw and at a target orientation that aligns the tool 20 with the planned bore. Guide constraints are employed in four degrees of freedom to guide the user toward the target state, i.e., two position constraints along the x, y axes of the target coordinate system TF and two orientation constraints about the x, y axes of the target coordinate system TF. A similar target state could be used for multiple, parallel peg holes. Additional guide constraints (e.g., a z-axis position constraint) could be employed to help the user position and orient the tool 20 at the entry portion 71a of the virtual boundary 71 generated for the planned bore to reduce the possibility of the tool 20 violating the virtual boundary 71.

At each time step, the constraint force $F_c$ is calculated and takes into account the guide constraints, to effectively guide the user into applying forces and torques that ideally move the tool 20 toward the target state. The guide constraints may be dynamic by virtue of their tuning parameters being adjusted at each time step. For example, the guide constraints may have greater stiffness the closer the current state gets to the target state (e.g., the closer the guided coordinate system GF gets to the target coordinate system TF in the z-axis direction of the target coordinate system TF—see the z distance). Thus, referring to FIG. 18, the constraint force $F_c$ may have components of force and torque with respect to the x, y axes that increase in magnitude as the z distance magnitude (e.g., absolute value of distance) decreases. The tuning parameters of the guide constraints may also be adjusted based on other relationships between the current state and the target state, such as x, y, and/or z distances between the current state and the target state, x, y, and/or z angles between the current state and the target state, or any combination of distances and angles. In some versions, look-up tables could be accessible by the control system 60 that correlate the tuning parameters to the magnitude of x, y, and/or z distance, and/or x, y, and/or z distance projected onto a certain plane, etc., and/or based on the magnitude of x, y, and/or z angles. In some versions, the tuning parameters may be adjusted so that the constraint force $F_c$ has components of force and torque that scale or are otherwise adjusted based on a sign (+/−) of x, y, and/or z distance and/or x, y, and/or z angle. For instance, the tuning parameters of the guide constraint along the z-axis could be adjusted based on whether the TCP of the tool 20 is approaching the target coordinate system TF (e.g., the TCP of the tool 20 is approaching a peg/drill hole with z-axis position being positive) or has already reached the target coordinate system TF and is now penetrating beyond the target coordinate system TF (e.g., the TCP of the tool 20 is inside the peg/drill hole with the z-axis position being negative). This may be desirable, for example, to have gradually increasing stiffness as the TCP of the tool 20 approaches the peg/drill hole (as z distance goes from large positive value towards zero) and then continues to maintain maximum stiffness as the user moves into the peg hole (as z distance goes from zero towards increasingly negative values). Alternately, for some cases, it may be desirable to effectively disable one or more of the guide constraints by setting their stiffness to zero for negative values of z distance.

Guided alignment of the tool 20 in the guided-haptic mode may also assist, for example, with machining peg holes for certain implants by controlling the position and orientation of the energy applicator, such as the bur 25 or a drill bit, prior to and during machining of the hole. As previously discussed, the tuning parameters for the various constraints may be different, depending on the flexibility desired. For example, the guide constraints associated with the orientation of the tool 20 may be tuned to be relatively weaker than the guide constraints associated with the position of the TCP of the tool 20 so that the user is able to easily alter the orientation of the tool 20 via the forces and torques applied by the user to the tool 20, while at the same time giving the user an indication (via subtle haptic feedback) that indicate the target orientation for the tool 20. This may make it easier for the user to avoid certain anatomical structures, retractors, etc., while machining the peg hole.

c. Guide for Femur Preparation for Total Knee Implant

Figure 19:
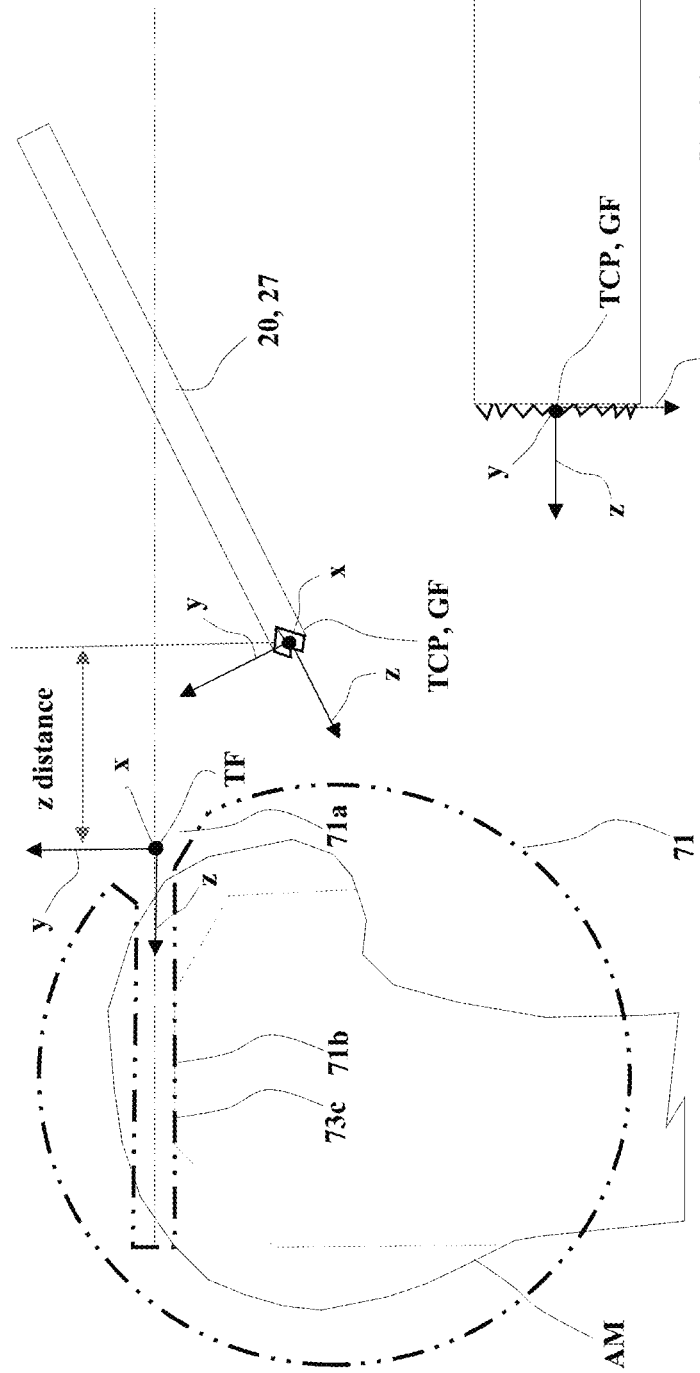
FIGS. 19 and 20 illustrate another application of guide constraints to attract the tool to a target plane.
Figure 20:
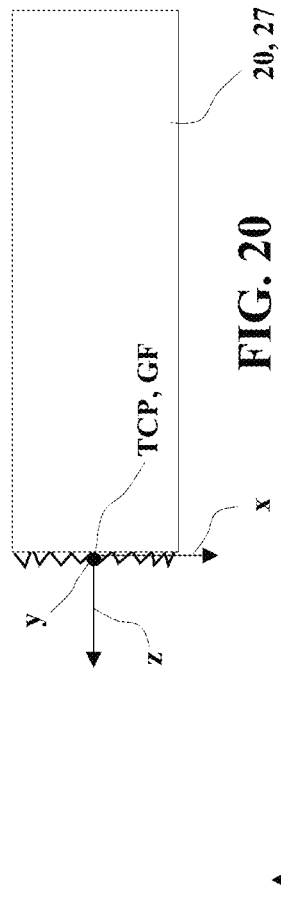

FIGS. 19 and 20 illustrate another example of the guided-haptic mode being used to assist the user in placing the tool 20 (e.g., with the saw blade 27) at the target state. In this example, the control system 60 has activated the guided-haptic mode and the associated guide constraints to assist the user in placing the TCP of the tool 20 at a target position located relative to a desired cutting plane 73c for a total knee replacement and at a target orientation that aligns the tool 20 with the desired cutting plane 73c. In this case, the origin of the target coordinate system TF is offset from the desired cutting plane 73c by at least half the blade thickness to account for blade thickness. Three guide constraints are employed in three degrees of freedom to guide the user toward the target state, i.e., one position constraint along the y axis of the target coordinate system TF and two orientation constraints about the x, z axes of the target coordinate system TF. Additional guide constraints (e.g., a z-axis position constraint) could be employed to help guide the user to position and orient the tool 20 at the entry 71a of the virtual boundary 71 to reduce the possibility of the tool 20 violating the virtual boundary 71.

Figure 21:
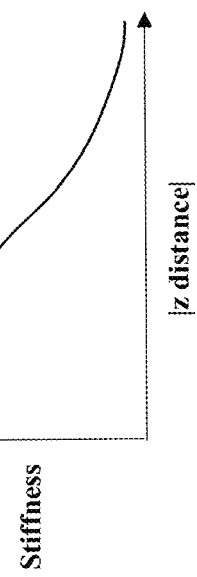
FIG. 21 illustrates how stiffness of the guide constraints vary with the z distance.

At each time step, the constraint force $F_c$ is calculated and takes into account the guide constraints, to effectively guide the user into applying forces and torques that ideally move the tool 20 toward the target state. The guide constraints may be dynamic by virtue of their tuning parameters being adjusted at each time step. For example, the guide constraints may have greater stiffness the closer the current state gets to the target state (e.g., the closer the guided coordinate system GF gets to the target coordinate system TF in the z-axis direction—based on z distance magnitude). Thus, referring to FIG. 21, the stiffness associated with the tuning parameters for the guide constraints may increase in magnitude as the z distance magnitude decreases. In some versions, the tuning parameters may be adjusted so that the constraint force $F_c$ has components of force and/or torque that scale or are otherwise adjusted based on a sign (+/−) of z distance. For instance, the tuning parameters of the guide constraint along the z-axis could be adjusted based on whether the TCP of the tool 20 has a positive or negative z-axis position.

Alignment of the tool 20 to the desired cutting plane assists the user in making precise cuts along the femur and/or tibia to make room for a total knee implant, for example. Referring back to FIG. 9, guide constraints could be used to align the tool 20 to each of the five cutting planes 73a-73e that may be required for the femur. The guide constraints can similarly remain active during the cutting process so that the user is continually guided toward the target state. This may work to reduce the likelihood that the user applies forces and torques to the tool 20 that virtually cause the tool 20 to violate the virtual boundary 71. In some versions, the target coordinate system TF could define the virtual boundary (e.g., an infinite planar virtual boundary defined by the xz plane). The guide handler 84 would initially generate guide constraints to draw the tool 20 to the xz plane and then the guide handler 84 would effectively act as the boundary handler 89 by generating guide constraints to keep the tool 20 on the xz plane. In this case, the stiffness of each guide constraint may be increased as the tool 20 approaches the xz plane to help keep the tool 20 on the xz plane. Accordingly, the guide constraints could also be considered boundary constraints. With a planar virtual boundary, the user could control width and depth of cut to avoid soft tissue, etc. or separate virtual boundaries could be defined to control width and/or depth.

d. Guide for Starting Position for Autonomous Machining

Referring to FIGS. 22A-22F, the guided-haptic mode may also be used to guide the user when readying the system 10 for operation in the semi-autonomous mode. More specifically, the guided-haptic mode may help guide the user in moving the tool 20 to a starting position and/or starting orientation with respect to a tool path TP, such as the milling path 72 shown. This may include guiding the user to a starting position on the milling path 72 or spaced from the milling path 72. The starting position may be located in free space off the milling path 72, or in free space on the milling path 72, so that the energy applicator 24 can be energized prior to engaging any tissue to reduce stalling, etc. The starting orientation may be a preferred orientation stored in the control system 60. Guide constraints can be defined to place the TCP of the tool 20 at the starting position (e.g., three position constraints along the x, y, z axes) and at the starting orientation with respect to two degrees of freedom (e.g., two orientation constraints about the x, y axes).

FIG. 22A illustrates the tool 20 having already been placed at the starting position and starting orientation defined with respect to the target coordinate system TF, i.e., the user has already placed the tool 20 and the guided coordinate system GF, via the guided-haptic mode, at the starting position and starting orientation defined by the target coordinate system TF. As shown in FIG. 22A, when the semi-autonomous mode is activated (or beforehand), the control system 60 generates a lead-in path 72a from the starting position to the start of the milling path 72. As previously noted, the starting position may be spaced from the milling path 72 to enable the energy applicator 24 to be energized prior to engaging any tissue. The lead-in path 72a, which can be generated by the path handler 82, may define an autonomous tool path segment (linear in some cases) to guide the tool 20 the start of the milling path 72 so that the energy applicator engages the tissue after the energy applicator 24 has been powered. The control system 60 then instructs the manipulator 14 to move the tool 20 so that the TCP of the tool 20 follows along the lead-in path 72a. When activating the semi-autonomous mode, the tool controller 21 may simultaneously supply energy to the energy applicator 24 so that the energy applicator 24 is active as the energy applicator 24 autonomously moves along the lead-in path 72a, e.g., the bur 25 may be rotating at a desired speed for removing material. The lead-in path 72a may not be employed in some versions. In some cases, the starting position is located at a start of the milling path 72, but the start of the milling path 72 is located in free space to enable the energy applicator 24 to be energized prior to engaging any tissue.

Figure 22C:
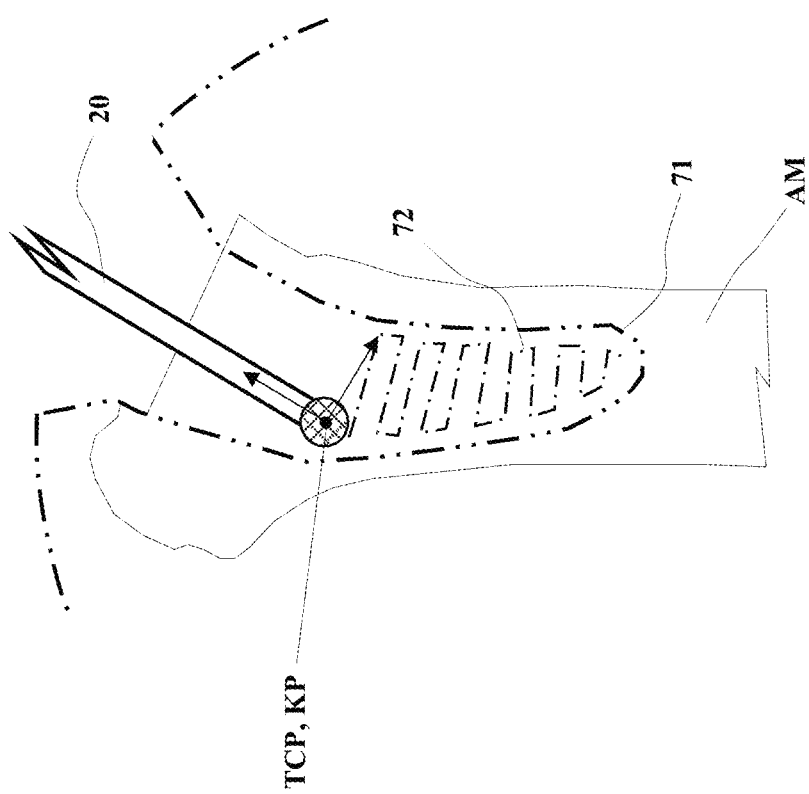

FIGS. 22B and 22C illustrate the control system 60 being operated in the semi-autonomous mode to move the TCP of the tool 20 along the milling path 72 to remove material from the femur to make room for a femur stem implant. Referring to FIG. 22C, when the control system 60 is operating in the semi-autonomous mode and the user instructs the control system 60 to switch to the manual mode (or some other mode), or when the control system 60 automatically switches to the manual mode (or some other mode), the control system 60 records the last known position/point KP on the milling path 72 that the tool 20 occupied in the semi-autonomous mode before switching.

Figure 22D:
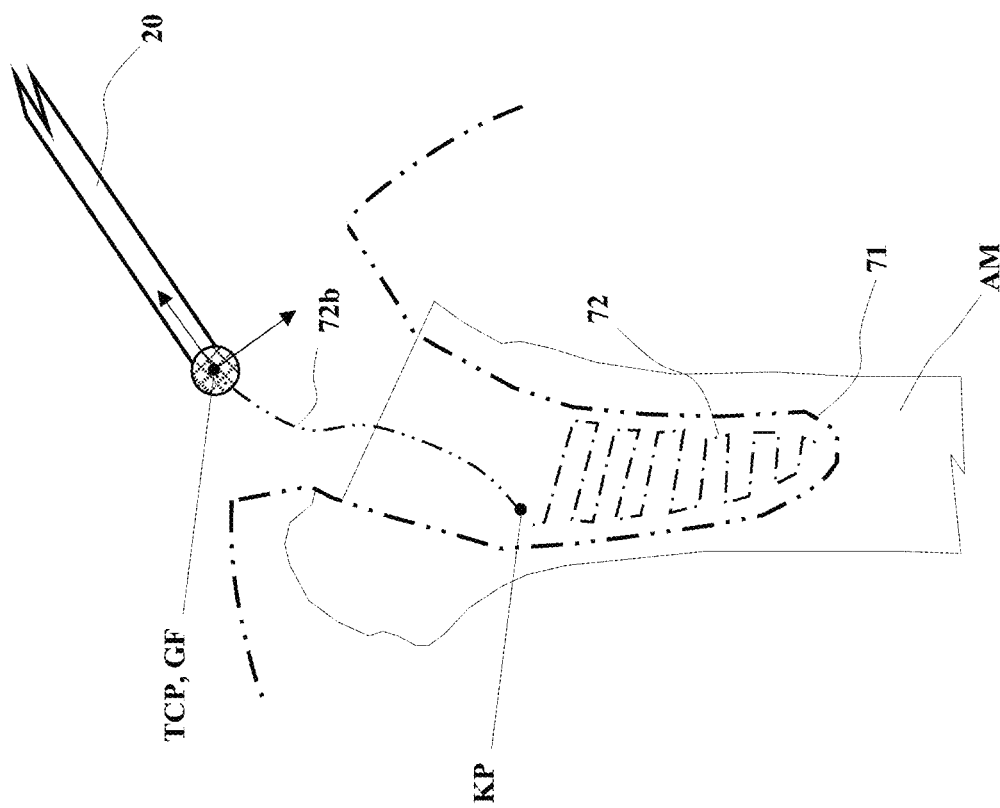
FIG. 22D illustrates movement of the tool away from the milling path.

FIG. 22D illustrates the user having caused the TCP of the tool 20 to be moved (pulled) away from the last known position/point KP along a withdrawal path 72b, e.g., in the manual mode. The control system 60 may store each commanded pose CP of the tool 20 that was computed in the manual mode along the withdrawal path 72b. Thereafter, the withdrawal path 72b may be used, as described further below, to help guide the user back to the last known position/point KP.

Figure 22E:
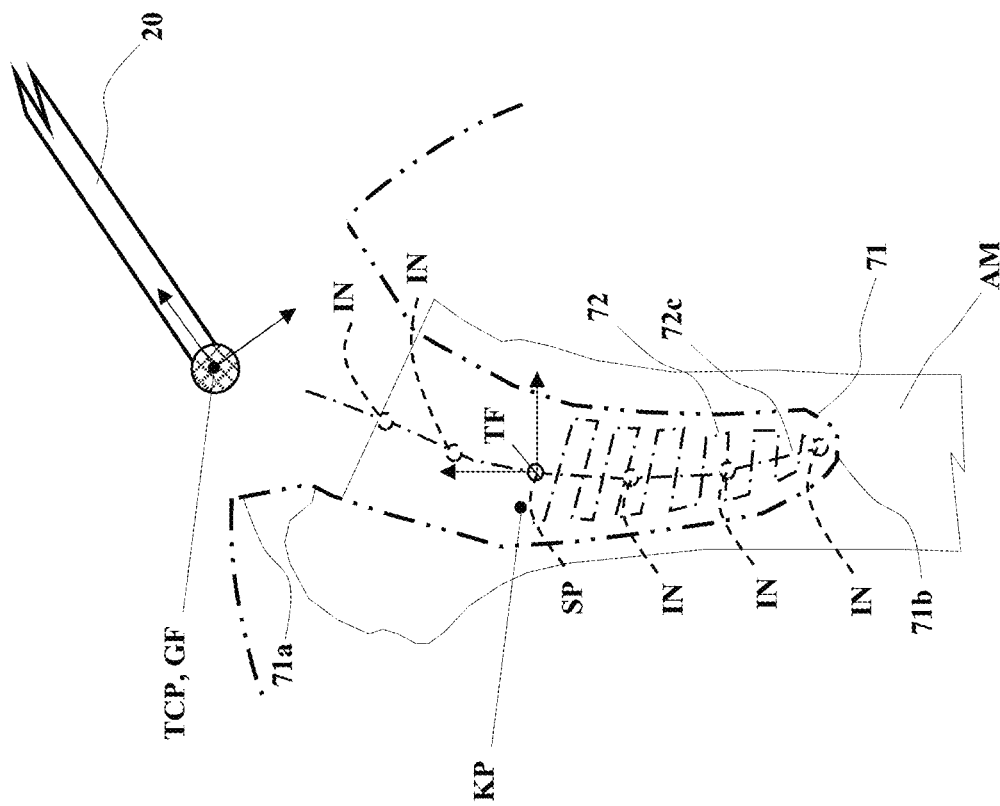
FIGS. 22E and 22F illustrate application of guide constraints to attract the tool to a target position and target orientation in a guided-haptic mode prior to resuming operation in the semi-autonomous mode.

Referring to FIG. 22E, during machining in the semi-autonomous mode, the control system 60 may track the progress of the tool 20 in order to determine how to help guide the user into returning to machining in the semi-autonomous mode after the user has moved the tool 20 away from the milling path 72 as shown in FIG. 22D. For instance, the control system 60 may determine a new starting position for the tool 20 to be guided to (also referred to as a restart position SP) depending on the progress of machining. As shown in FIG. 22E, the restart position SP is defined as the origin of a new target coordinate system TF. The restart position SP may also be selected from among a plurality of possible restart positions IN that are defined along a restart path 72c. The restart path 72c may be based on a shape of the virtual boundary 71. In some cases, the restart path 72c is centrally defined relative to the virtual boundary 71 and extends from the entry portion 71a of the virtual boundary 71 to a distal tip of the canal portion 71b of the virtual boundary 71. The restart path 72c may also be based on the withdrawal path 72b, and may be the same as the withdrawal path 72b.

The restart position SP may be as shown or selected from the plurality of other possible restart positions IN based on the last known position/point KP of the tool 20 on the milling path 72 before being moved off the milling path 72. As previously described, the control system 60 determines the last known position/point KP on the milling path 72 traversed by the tool 20 before the tool 20 moves off the milling path 72 and stores the last known position/point KP in memory for later retrieval. The restart position SP may be calculated by the control system 60 to be the closest point on the restart path 72c to the last known position/point KP. In some versions, after the closest point on the restart path 72c is found, the restart position SP (and subsequent setting of the target coordinate system TF) could be set a fixed distance (e.g., 0.1, 0.5, 1.0 inches, or the like) along the restart path 72c towards the beginning of the restart path 72c to ensure that the restart position SP is not covered or partially covered in tissue.

The control system 60 may also define and store a plurality of possible restart positions along the restart path 72c that, as milling progresses, become activated when each position is virtually uncovered by the tool 20, i.e., when the tool 20 has removed the material that occupies the same virtual space as the restart position, or when the tool 20 has virtually uncovered the possible restart position by at least a predetermined depth (e.g., free space of at least 0.1, 0.5, 1.0 inches, or the like surrounds the possible restart position in all directions). As the tool 20 progresses further into the volume of material to be removed from the target site, deeper and deeper restart positions are uncovered. As a result, the active restart position becomes the restart position that has been uncovered and that is closest to the last known position/point KP of the TCP of the tool 20 on the milling path 72. See, e.g., the restart position SP selected in FIG. 22E from the other inactive restart positions IN.

Figure 22F:
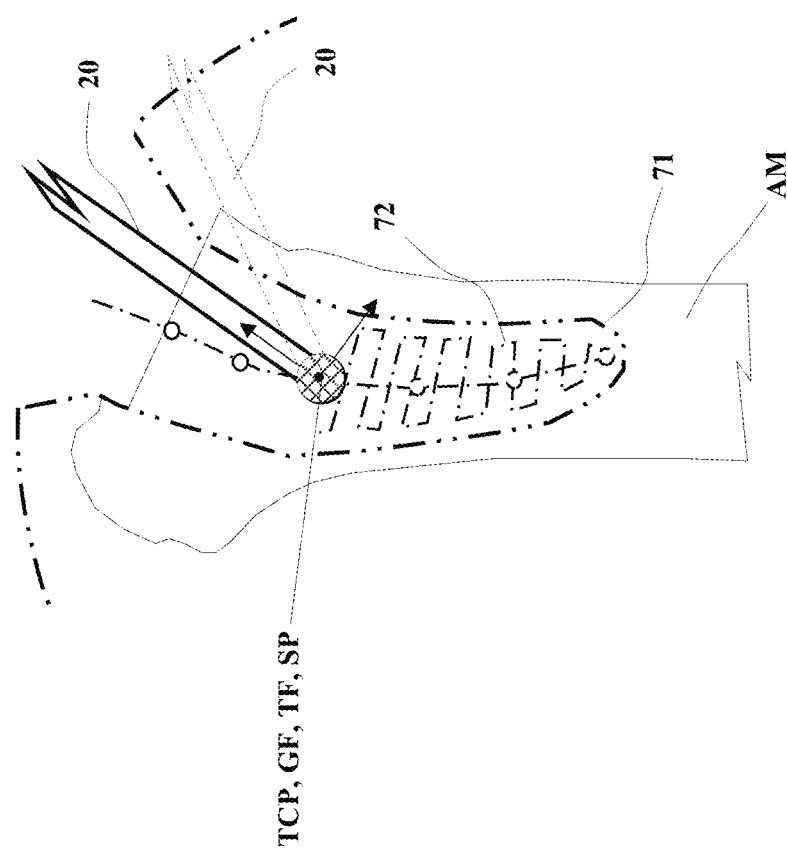

As shown in FIGS. 22E and 22F, once the restart position SP is determined, the guided-haptic mode can be activated to guide the user in placing the tool 20 at the restart position SP. As previously described, this may include guiding the user with position constraints defined in the x, y, z axes of the target coordinate system TF.

In some versions, the guided-haptic mode may be employed to guide the user to follow along the restart path 72c until the active restart position SP is reached, by applying guide constraints at increments along the restart path 72c. These increments could be defined as equal increments along the restart path 72c, at each of the other uncovered, inactive restart positions IN above the active restart position SP, or the like. As a result, the user is guided to trace the restart path 72c to avoid collisions of the TCP of the tool 20 with the anatomy. Orientation constraints could also be applied along the restart path 72c as well with the same, less, or varying stiffness.

Once the user has been guided to within a predefined threshold distance from the restart position SP, the control system 60 is able to generate a lead-in path from the current position of the TCP of the tool 20 (based on the last commanded pose CP) to the last known position/point KP. Generation of the lead-in path may be in response to the user switching to the semi-autonomous mode, or in response to the control system 60 automatically switching to the semi-autonomous mode. The system 10 can then be operated by the user to autonomously move the tool 20 along the lead-in path to the last known position/point KP in the semi-autonomous mode. Thus, the control system 60, when switching back to the semi-autonomous mode, can return back to the last known position/point KP to pick up where the semi-autonomous mode left off. In other words, once the tool 20 is at or within the predefined threshold distance of the restart position SP, then semi-autonomous operation can start automatically or following user prompting and selection, and the lead-in path can then be generated to get back to the last known position/point KP. When activating the semi-autonomous mode, the tool controller 21 may simultaneously supply energy to the energy applicator 24 so that the energy applicator 24 is active as the energy applicator 24 autonomously moves along the lead-in path.

A restart orientation may also be defined along with the restart position SP. The restart orientation may be desired to improve machining efficiency, improve access to the last known position/point KP, and generally assist the user in understanding how best to orient the tool 20, in particular for cases where there is limited visibility of the tissue to be machined. For example, burs are often designed to achieve optimized cutting performance given a specific angle between a bur shaft and the bone (or other tissue), depending on bur flute geometry, direction of cut, conventional/climb milling approach, etc. In many cases, it may be desirable to avoid end cutting (even partially end cutting) with a bur, which can be avoided by ensuring a suitable starting orientation relative to the bone and, optionally, further maintaining that orientation during successive milling. As another example, referring to FIG. 22F, if no orientation guide constraints are provided to guide the user with respect to orientation of the tool 20, the user may orient the tool 20 in a manner in which a shaft of the tool 20 could collide with the virtual boundary 71 and/or with unremoved bone (see hidden lines of tool 20). In some cases, only the TCP of the tool 20 is monitored for collisions with the virtual boundary 71, rather than monitoring a shaft of the tool 20. Accordingly, in those cases, orientation guide constraints can help to keep the shaft of the tool 20 away from the virtual boundary 71 and/or unremoved bone. A preferred tool orientation can be used as the restart orientation to help guide the user when moving the tool 20 to the restart position SP (effectively now considered a restart pose to account for orientation). The restart orientation may be defined in one or more rotational degrees of freedom in the target coordinate system TF. In that case, one or more of the axes for the target coordinate system TF could be chosen to give the desired orientation of the guided coordinate system GF. Thus, the guided-haptic mode may assist users in guiding the TCP of the tool 20 to the restart pose SP. The position and orientation constraints can have different stiffness/damping tuning parameters to give a desired user interaction and feel, as described above. The tuning parameters may also be scaled as previously described to increase the virtual attractive forces and torques as the tool 20 approaches the restart pose SP (e.g., as the distance/angle to the restart position/orientation decreases).

Referring back to FIGS. 22B and 22C, when the control system 60 operates the manipulator 14 in the semi-autonomous mode, the control system 60 may employ an orientation regulator that maintains a preferred orientation of the tool 20 as the tool 20 moves along the milling path 72. The preferred orientation could be a path-defined orientation included as part of the milling path 72 along with position information, e.g., preferred orientation could be given for each segment of the milling path 72 or range of segments along the milling path 72, and it could be updated automatically as the tool 20 traverses the milling path 72. The preferred orientation may be one or more discrete orientations or a range of orientations, and may be defined by a virtual pivot and aperture guide. Such an orientation regulator and its operation are described in detail in U.S. Pat. No. 9,681,920, filed on Jun. 15, 2015, entitled, "Robotic System and Method for Reorienting a Surgical Instrument Moving Along a Tool Path," which is hereby incorporated herein by reference. An input device on the user interface UI of the tool 20 (e.g., a button, gesture control, touch sensor, foot pedal, etc.) can be actuated by the user to reorient the tool 20 as needed during autonomous movement of the tool 20 along the milling path 72 in the semi-autonomous mode. When the input device is actuated, the orientation regulator is temporarily disabled and the user is able to reorient the tool 20 as desired, e.g., to avoid soft tissue or retractors, to improve visibility, or for some other reason. More specifically, the manipulator 14 is operable to reorient the tool 20 in response to user forces and torques applied to the tool 20 by the user while the tool 20 (e.g., the TCP) remains on the milling path 72. When the input device is released, the orientation regulator is reset to keep the orientation of the tool 20 at the new orientation set by the user. The preferred orientation during autonomous machining along the milling path 72 may be embodied in orientation constraints generated by the path handler 82 (e.g., path constraints that control/regulate orientation). Such orientation constraints would be temporarily disabled when the user actuates the input device to reorient the tool 20, but the path constraints generated by the path handler 82 that are associated with position would remain enabled to hold the TCP of the tool 20 on the milling path 72. When the input device is released after the user reorients to the tool 20, the orientation constraints are re-enabled to keep the tool 20 at the new user-defined orientation.

In some cases, it may be desirable for the user to return to the preferred orientation after the user has reoriented the tool 20. For example, the user may initially reorient the tool 20 to avoid soft tissue or a retractor, but once the tool 20 has passed such an obstacle, the user may wish to return to the preferred orientation, which may provide more efficient milling, visibility, etc. Accordingly, the guided-haptic mode can be employed separately from, or in combination with, the semi-autonomous mode to guide the user into moving the tool 20 to the preferred orientation. In this case, when the input device is depressed to reorient the tool 20, a target state comprising a target orientation in one, two, or three rotational degrees of freedom may be enabled. The target orientation (e.g., the preferred orientation) is obtained by the guide handler 84 and the guide handler 84 then generates one or more guide constraints based on the target orientation (preferred orientation) and the current orientation. The constraint solver 86 then calculates the constraint force $F_c$ that is adapted to attract the tool 20 toward the target orientation from the current orientation based on the one or more guide constraints. The constraint force $F_c$ thus has components of force and/or torque that apply a subtle virtual attraction to guide the user towards restoring the preferred orientation as previously described by providing haptic feedback to the user that guides the user toward placing the tool 20 at the preferred orientation. Effectively, in this embodiment, the input device is used to toggle between two different sets of constraints, i.e., between: (1) the orientation constraints provided by the orientation regulator that maintain the preferred orientation (e.g., orientation constraints generated by the path handler 82 or even guide constraints in some cases); and (2) the guide constraints that act to provide haptic feedback to the user indicating the preferred orientation. When the input device is actuated (e.g., pressed), the guide constraints described above are enabled to suggest the preferred orientation to the user and the orientation constraints provided by the orientation regulator are disabled. When the input device is released, the orientation constraints provided by the orientation regulator are enabled to maintain the preferred orientation and the guide constraints are disabled. In some cases, the orientation constraints provided by the orientation regulator are stronger (in terms of stiffness/damping) than the guide constraints provided to indicate the preferred orientation.

The virtual attractive forces and torques associated with guiding the user to the preferred orientation can be overcome by the forces and torques applied to the tool 20 by the user to allow the user to reorient the tool 20 away from the preferred orientation. However, the virtual attractive forces and torques are strong enough to give the user haptic feedback to indicate to the user how to move the tool 20 to return to the preferred orientation. The guide constraints and associated virtual attractive forces and torques are disabled once the input device is released and the orientation regulator then again takes over to control the orientation of the tool 20 as the semi-autonomous mode continues. Other orientation alignment methods may be used to suggest the preferred orientation to the user. Virtual attractive (or repulsive) forces may also be used for returning to (or avoiding) certain orientations, such as when transitioning from one mode of operation to another mode of operation, e.g., when returning to the semi-autonomous mode of operation from the manual mode or from another mode.

e. Guided Alignment Using Alignment Points

Figure 23:
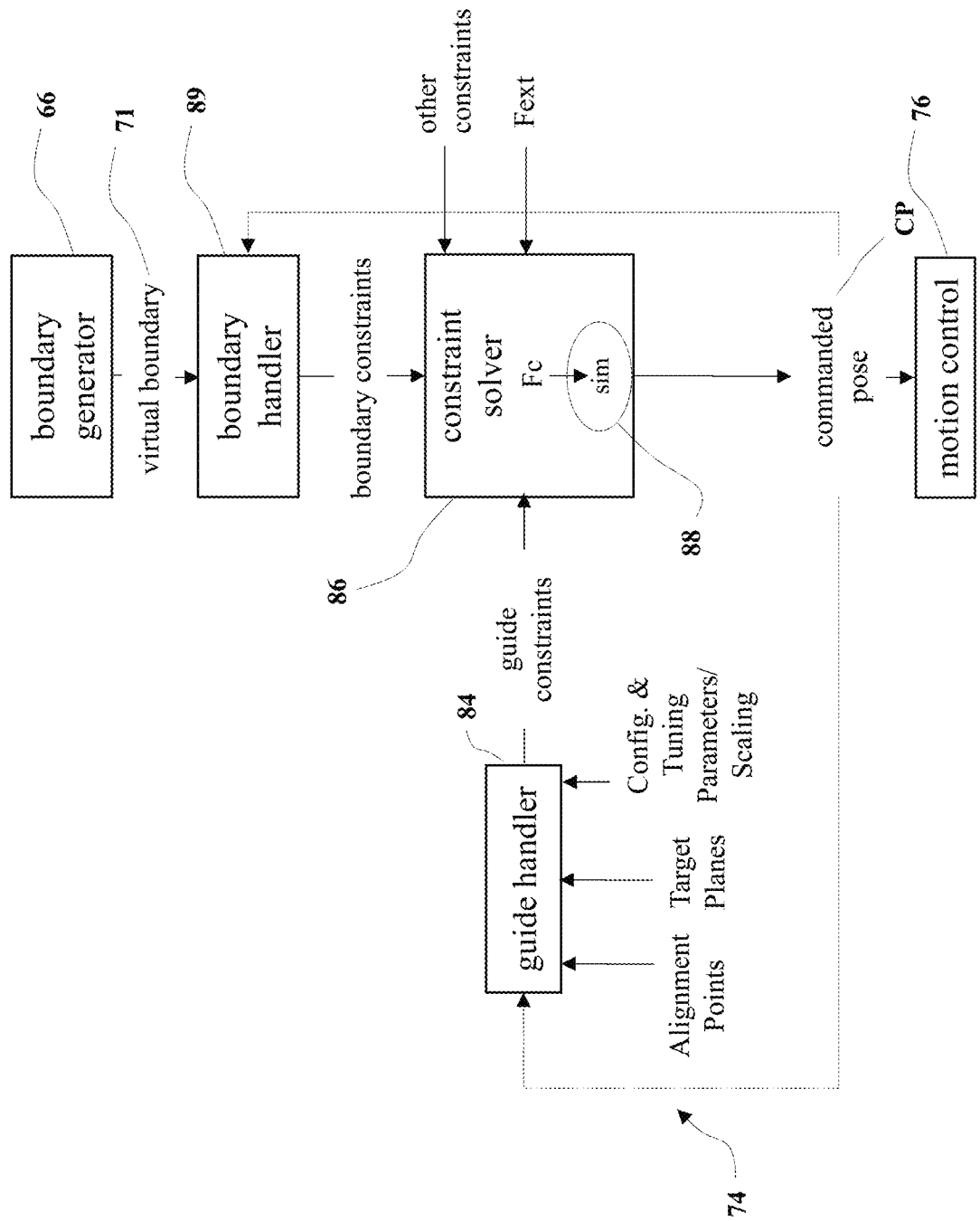
FIG. 23 is a block diagram of modules operable by the control system.

FIG. 23 illustrates processes carried out to execute the guided-haptic mode, such as when the tool 20 comprises the saw blade 27. In this version, the behavior control 74 comprises the guide handler 84, the constraint solver 86, and the virtual simulator 88. The behavior control 74 further comprises the boundary handler 89 to generate virtual boundary constraints based on the one or more virtual boundaries 71 generated by the boundary generator 66. The guide handler 84, constraint solver 86, virtual simulator 88, and boundary handler 89 each comprise executable software stored in a non-transitory memory of any one or more of the aforementioned controllers and implemented by the control system 60. The path generator 68 and path handler 82 are absent in FIG. 23 but could be used to direct autonomous movement of the saw blade 27 as well.

In this version, the current state of the tool 20 is represented by one or more sets of alignment points APi, such as AP1, AP2, with each set including a plurality of points AP1, AP2. In some cases, there may be more than two sets of alignment points. The target state of the tool 20 is represented by one or more target planes TP1, TP2 for the tool 20. As in the previously described versions, the guide handler 84 generates one or more guide constraints based on relative positions of the current state and the target state, i.e., based on the relative positions of the plurality of alignment points AP1, AP2 and the one or more target planes TP1, TP2. Consequently, as shown in FIG. 23, one input into the guide handler 84 comprises the plurality of alignment points AP1, AP2, which are typically predefined and fixed in the TCP coordinate system (see FIGS. 24-27). The location of the alignment points AP1, AP2 could be based on serial no. or model no. of tool, stored in memory, etc. Another input into the guide handler 84 comprises the target planes TP1, TP2. The alignment concept described below with respect to saw blade alignment is merely one example, as this alignment methodology could be employed for other uses. The target planes TP1, TP2, include a first target plane TP1 associated with a desired cutting plane 73*c* (the first target plane TP1 may be offset from the desired cutting plane 73*c* to account for blade thickness) and a second target plane TP2 that is disposed orthogonally to the first target plane TP1 down an approximate centerline of the planar cut PC to be made to the femur on the desired cutting plane 73*c* (see FIG. 26). The target planes TP1, TP2 differ for different cutting planes 73*a*-73*e* (see FIG. 9) when multiple planar cuts are required for a particular surgical procedure, such as for a total knee procedure.

Figures 26, 27:
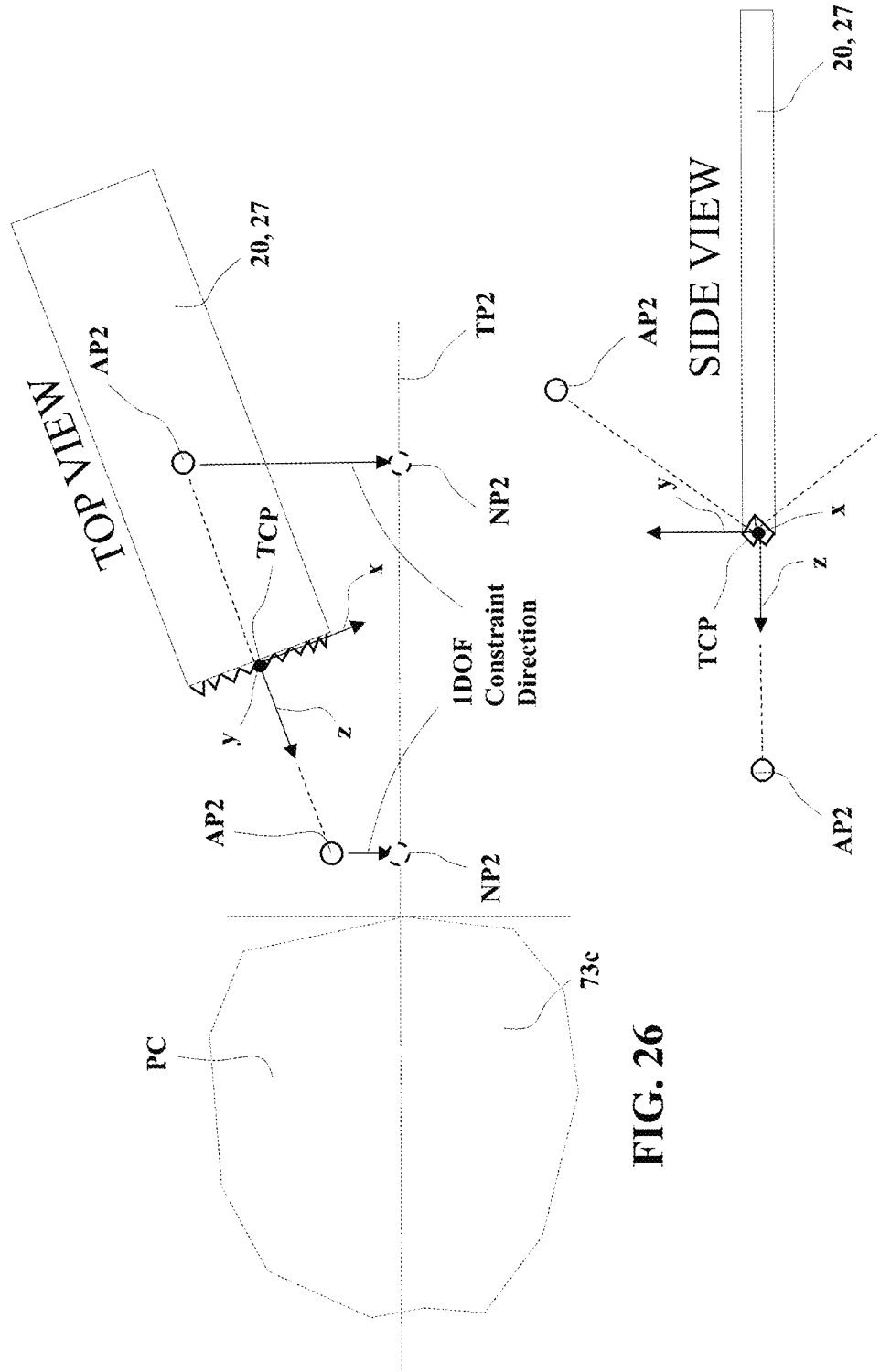

As shown in FIGS. 24-27, six alignment points AP1, AP2 may be used to align the saw blade 27 to the target planes TP1, TP2. Three first alignment points AP1 are used to align the saw blade 27 to the first target plane TP1 as shown in FIGS. 24 and 25 and three second alignment points AP2 are used to align the saw blade 27 to the second target plane TP2 as shown in FIGS. 26 and 27. The alignment points AP1, AP2 may be disposed at 120-degree increments from each other about a circle defined with the TCP as its center. The first alignment points AP1 are defined in the x, z-plane of the saw blade 27 and the second alignment points AP2 are defined in the y, z-plane of the saw blade 27. The y, z-plane of the saw blade 27 is disposed generally perpendicular to the saw blade 27 and down a centerline of the saw blade 27. In some versions, only three alignment points AP1 may be employed to align the saw blade 27 with only the first target plane TP1. The alignment points AP1, AP2 may be defined with respect to the TCP coordinate system, since they are associated with the tool 20, e.g., with the saw blade 27. The last commanded pose CP correlates to the current pose of the tool 20 and gives the pose of the TCP coordinate system with respect to the manipulator coordinate system MNPL and/or gives the pose of the virtual mass coordinate system VM with respect to the manipulator coordinate system MNPL. Thus, the current position of each of the alignment points AP1, AP2 are known with respect to the manipulator coordinate system MNPL, and can be transformed to any other coordinate system.

One-dimensional guide constraints are defined at the target planes TP1, TP2 to attract the alignment points AP1, AP2 to their respective target planes TP1, TP2 in the same manner as described above. More specifically, at each time step, the guide handler 84 determines locations of normal points NPi, such as normal points NP1, NP2 in the respective target planes TP1, TP2 based on a normal vector from each alignment point AP1, AP2 to its corresponding target plane TP1, TP2, and then generates the guide constraints along these normal vectors. In the embodiment shown, six guide constraints are generated, including three for interactions involving alignment points AP1 and normal points NP1 and three for interactions involving alignment points AP2 and normal points NP2. A constraint direction, constraint Jacobian Jp, desired velocity $V_{des}$, and constraint distance $\Delta d$ are computed for each guide constraint. For example, the constraint direction is the normal vector between APi and NPi. The desired velocity $V_{des}$ is the component of the anatomy velocity (e.g., bone velocity based upon the associated anatomy tracker velocity) projected along the constraint direction. The constraint distance $\Delta d$ is the distance between APi and NPi projected along this constraint direction. The constraint Jacobian Jp is the constraint Jacobian that maps 1-dof velocity/force applied along the constraint direction at APi (as if it was rigidly attached to the tool 20) to its equivalent 6-dof effect at the virtual mass coordinate system VM.

The constraint solver 86 calculates the constraint force $F_e$ which is adapted to attract the saw blade 27 toward the one or more target planes TP1, TP2 based on the one or more guide constraints. The constraint force $F_e$ thus comprises virtual attractive forces based on the guide constraints that are applied at each alignment point AP1, AP2. The magnitude and direction of each virtual attractive force is based on the relative locations of the corresponding normal point NP1, NP2 and alignment point AP1, AP2. Note that the normal points NP1, NP2 are always being recomputed on the target planes TP1, TP2 each time step, i.e., they move based on movement of the saw blade 27. In some cases, a target coordinate system TF fixed relative to the anatomy could be introduced and z distance or z distance magnitude, as previously discussed, could be used to vary spring and/or damping parameters such that the user is more strongly guided into alignment with the desired cutting plane the closer the saw blade 27 is brought to the anatomy. Once the saw blade 27 is inside the virtual boundary 71 defining a virtual cutting guide slot, the guide constraints can be disabled or their parameters otherwise changed. In some cases, such as when the virtual boundary 71 is the target plane TP1, the spring and/or damping parameters for the guide constraints associated with the alignment points AP1 can be stiffened and the guide constraints associated with the alignment points AP2 can be disabled to allow the user to freely move the saw blade 27 from side to side in the target plane TP1, while keeping the saw blade 27 on the target plane TP1.

f. Enabling/Disabling Guide Constraints

Figure 28:
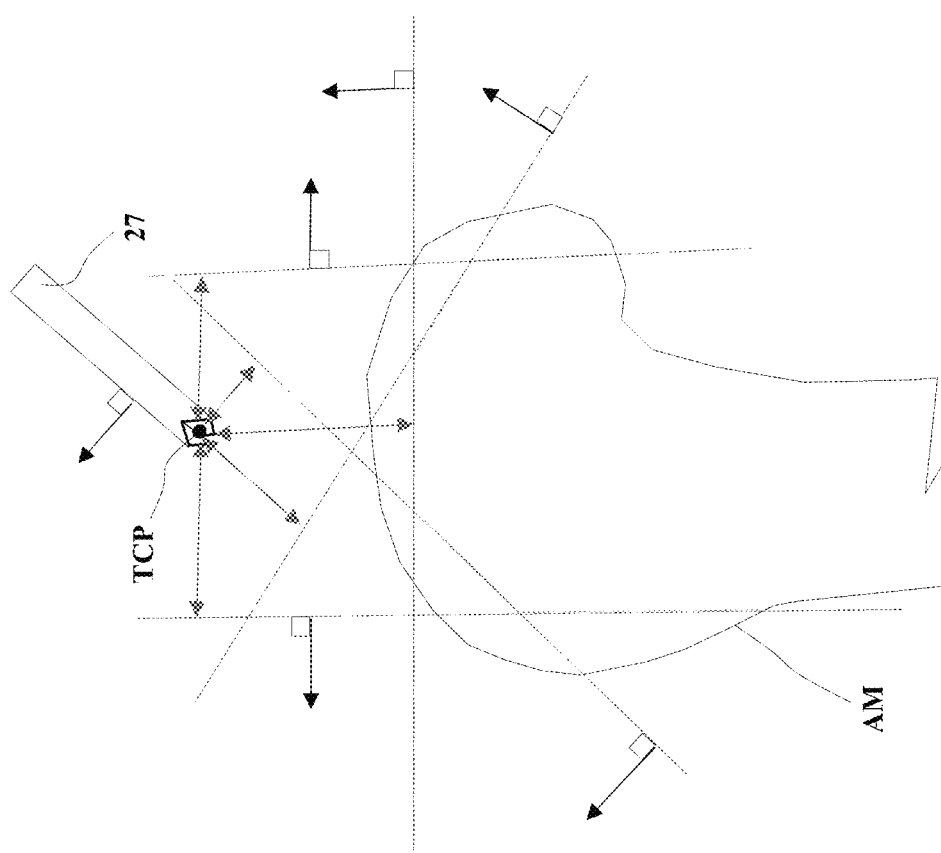
FIG. 28 illustrates how the control system can determine which desired cutting plane is being selected by a user based on a location of the tool.

Referring to FIG. 28, the user may be able to enable/disable various guide constraints and/or virtual boundaries 71 associated with a plurality of different features to be created with respect to the anatomy of the patient. Such features include, for example, planar cuts, resected volumes, burred/drilled holes, and the like. Enabling/disabling of the guide constraints and/or virtual boundaries 71 associated with the different features may be done via the user interface UI on the tool 20, manipulator 14, navigation system 32, or the like. For instance, the user may select a particular planar cut to be made from the possible six planar cuts that are needed in a total knee procedure (5 planar cuts on the femur and 1 planar cut on the tibia). By selecting one of the cuts, e.g., via one of the user interfaces UI, the control system 60 may enable the associated guide constraints and the associated virtual boundaries 71, while disabling the guide constraints and the virtual boundaries 71 associated with the other planar cuts. A different target state (e.g., position, orientation, and/or velocity) for the tool 20 is associated with each of the features such that different guide constraints will need to be generated to guide the user into moving the tool 20 to the respective target states, depending on which feature is selected by the user. Selection of one of the features can also be performed by the control system 60 based on the proximity of the tool 20 to the target states for the features, e.g., a distance and/or angle difference between the current state of the tool 20 and the target states. Selection of one of the features can also be performed by the control system 60 based on the proximity of the tool 20 to a plurality of virtual boundaries 71 associated with the different features (e.g., a virtual boundary associated with cutting a volume from a femur vs. a virtual boundary associated with cutting a volume from a pelvis). Selection could be done automatically, or after confirmation by the user, and may be done in the manual mode, in a free mode, in a selection mode, or the like.

As shown in FIG. 28, the tool 20 is positioned such that the TCP of the tool 20 is closest to an anterior chamfer cutting plane. The control system 60 may measure a closest distance of the TCP (the current state) to each of the cutting planes (the target states) that define the planar cuts (e.g., the features) in a common coordinate system to select the particular planar cut to be performed and thus control (i.e., enable/disable) the guide constraints and/or virtual boundaries 71 accordingly. Dot products of a normal vector from a plane defining the saw blade 27 and normal vectors for each cutting plane can also be compared to further determine the user's selection, e.g., to understand the pose of the saw blade 27 compared to each of the cutting planes. The largest dot product reveals the lowest angle and the selection could be made accordingly, e.g., the lowest angle further indicates that the user intends to cut next at this cutting plane since the saw blade 27 is most closely aligned with it. The displays 38 could provide visual feedback to the user to indicate which cutting plane was being selected. For example, the displays 38 could show a selection screen that visually highlights the selected cutting plane/cut. To select the next cutting plane/cut, the user can move the tool 20 away from the current cutting plane and repeat the selection process.

Other methods of selecting a feature and its associated cutting plane, cutting axis, or the like, and enabling the associated guide constraints and/or associated virtual boundaries 71 are also contemplated. For example, in some versions, the control system 60 may simply measure an angle between the plane defining the saw blade 27 and each of the cutting planes and choose the planar cut to be made based on the cutting plane that forms the lowest angle (magnitude). In this case, the xz plane of the TCP defines the plane of the saw blade 27 (see FIG. 24) and the control system 60 measures the angle between the xz plane (current state) and each of the cutting planes (the target states) to find the lowest magnitude angle (e.g., largest dot product of their normal vectors, for example). This could similarly be done to select a burred/drilled hole to be created, i.e., by determining angles between an axis defined by a bur or drill shaft and a plurality of cutting axes associated with the burred/drilled holes and finding the lowest magnitude angle.

When two or more cutting planes have nearly the same normal vector (such as anterior and posterior cutting planes), i.e., there are multiple candidate planar cuts because the measured angles between the saw blade 27 and their associated cutting planes are within a threshold of each other (e.g., 5 degrees, 10 degrees, etc.), then a distance from the TCP of the tool 20 to each of the candidate's cutting planes would help determine which planar cut to select. Once the planar cut is selected and executed, this planar cut could be eliminated as a candidate for the next selection. Accordingly, the number of candidates remaining for the next selection would be reduced, thus possibly avoiding multiple candidates for the next selection.

In another method, instead of evaluating the distance from the TCP of the tool 20 to each of the cutting planes, the control system 60 projects a ray forward from the TCP of the tool 20 (e.g., along the z-axis in FIG. 24) and chooses a projected point a fixed distance from the TCP of the tool 20 along that ray (e.g., 0.5, 1.0, 2.0 inches, or the like) forward from the TCP of the tool 20 (similar to the centerline alignment point AP1 shown in FIG. 24). The control system 60 then selects the active planar cut based on the distance between this projected point and each of the cutting planes. The projected point effectively ascertains which cutting plane the user is pointing at or heading towards, not which plane is closest. In some cases, a virtual representation of the projected point could be displayed on one or more of the displays along with a virtual representation of the saw blade 27.

In another method, movement of the tool 20 by the user could be employed as an input device to select the desired planar cut (or for other selections) via any of the user interfaces UI. In this case, for example, a change in angle of the xz plane of the saw blade 27 (e.g., relative to the anatomy, base 16, or the like) would act to scroll through a list of each of the planar cuts shown on one or more of the displays, e.g., one at a time in sequence, while displaying the currently selected planar cut. For instance, a positive angle change moves a cursor or other virtual selector up in the list and a negative angle change moves the cursor or other virtual selector down in the list. An input device on the tool 20, or other input device, could then be actuated to make a final selection.

The same or similar methods can also be used to select: (i) a hole to next cut (e.g., a burred/drilled hole) from a plurality of holes that require tissue removal; (ii) which bone to machine next out of a plurality of bones that require tissue removal: (iii) which of a plurality of virtual boundaries to enable on a given bone; or (iv) combinations thereof, and the like. These methods could make such selections based on movement of the tool 20, patient anatomy location (e.g., relative to the tool 20), and reasonable assumptions of anticipated workflow. Also, any of the selection methods described herein could be combined/weighted in any suitable fashion.

For any of the selection methods described herein, once a final candidate for selection (e.g., planar cut, hole, bone, virtual boundary, etc.) is identified, a final acceptance check can be made based on angle and/or distance being within acceptance criteria. For example, if the final candidate for a planar cut has an associated cutting plane within an acceptance angle of 15 degrees (between the plane xz of the saw blade 27 and the cutting plane), then that cutting plane is activated (e.g., any one or more associated guide constraints and/or virtual boundaries 71 for that planar cut are enabled). If the acceptance criteria are not met, then the final candidate is not selected. Alternatively, or additionally, a protective virtual boundary 71 (e.g., spherical or other shape) may be enabled around the patient's anatomy, such as around the patient's knee (having no slots) to prevent the user from contacting the bone until a feature meeting the acceptance criteria is selected. In addition, workflow information can be used to further reduce candidates prior to applying any of the selection methods described herein. For example, the tool 20 may be operable in one or more configurations, with certain configurations being indicative of a user's selection. For example, the saw blade 27, and the xz plane thereof, may be flipped 180 degrees to perform certain cuts and not flipped for other cuts. So, depending on which configuration the user places the tool 20 (e.g., flipped or not flipped), the candidate planar cuts and associated cutting planes can be effectively narrowed down accordingly before the control system 60 makes a final selection. Additionally, in some cases, planar cuts (or other features) that have been completed can be removed as candidates and/or have a reduced weighting factor (or tightened criteria) applied to lower their likelihood of being selected again.

In some versions, when using a selection method such as those described above, a selection region (e.g., a spherical region, or other shaped region or volume) may be defined around the anatomy (e.g., the knee) to facilitate selection, changes to selection, etc. For instance, the selection region could be defined by a sphere of a predetermined radius located relative to a knee center (e.g., with a 5.0, 6.0, 7.0 inch radius or the like). When the TCP of the tool 20 is outside the selection region for more than a predefined amount of time (e.g., greater than 0, 1, 2, 3 seconds, or the like), the control system 60 may enter a selection mode in which any guide constraints and/or virtual boundaries 71 associated with the last selected feature are disabled (although a protective virtual boundary may be enabled) and the selection method (such as any of those described above, or combinations thereof) is employed to make a new selection (e.g., to select a new feature to be created). In the selection mode, the selection is displayed to the user on one or more of the user interfaces UI. For instance, for a total knee procedure, one or more of the displays shows a side view (sagittal) of the knee to allow better visualization of the various planar cuts. Once a selection is made in the selection mode, and in response to the user moving the TCP of the tool 20 into the selection region (e.g., towards the knee), the guide constraints and/or the virtual boundaries for the selection are enabled. Typically, the control system 60 would then update one or more of the displays to show a specific visualization/orientation best suited for the selection (e.g., for the selected planar cut). While inside the selection region, the selection is effectively frozen and remains enabled, until the user again moves the TCP of the tool 20 outside of the selection region to repeat the selection process. This helps the user to avoid inadvertently making a new selection while inside the selection region.

The guided-haptic mode may also be employed in various other ways. For example, the guided-haptic mode may help guide a user when transitioning from other modes of operation to the semi-autonomous mode to get the TCP of the tool 20 back to the tool path TP. The guided-haptic mode may also assist the user in moving the tool 20 off the tool path TP when transitioning from the semi-autonomous mode to some other mode, such as to the manual mode. The guided-haptic mode may be used to align a drill bit and/or tap for a screw, anchor, or other fastener. The guided-haptic mode may be used to align an impactor with a desired trajectory for impacting an acetabular cup implant to seat the acetabular cup implant into a prepared acetabulum. The guided-haptic mode may be used to align tools used to seat other types of implants. The guided-haptic mode may be used for aligning/guiding tools for placing k-wires, cannulae, trocars, retractors, and the like.

The remote control RC may be employed to switch between the various modes of operation of the manipulator 14. Other input devices, such as on the various user interfaces UI may also be employed to switch/activate the various modes of operation of the manipulator 14. For example, the UI of the tool 20 may have an input device (button, touch sensor, gesture input, foot pedal, etc.) that can be actuated to activate the one or more guide constraints so that the constraint force $F_c$ comprises components of force and torque associated with attracting the tool toward the target state. The control system 60 may be configured to automatically switch modes in certain situations. For example, if the control system 60 was operating the manipulator 14 in the semi-autonomous mode initially (i.e., prior to switching to the guided-haptic mode), the control system 60 may automatically restart the semi-autonomous mode once the user switches off the guided-haptic mode. The control system 60 may also first prompt the user before automatically continuing in the semi-autonomous mode, such as by providing selectable prompts on one or more of the displays 38 to continue in the semi-autonomous mode. The user may select to continue in the manual mode, guided-haptic mode, semi-autonomous mode, etc.

In some cases, the user may exert a force on the tool 20 of suitable magnitude and direction indicating a desire to end operation in the guided-haptic mode, such as by applying a force in a direction opposite the target state. In this case, when such a force exceeds a predefined threshold in a direction opposite the target state, the control system 60 may automatically switch back to the manual mode or to a free mode.

The current state of the tool 20 relative to the target state, milling path 72 and/or relative to the surgical site may be output by the navigation system 32 and represented on the displays 38 via graphical representations of the tool 20, target state, virtual boundaries 71, milling path 72, and/or the surgical site, e.g., the femur F, tibia T, pelvis PEL, vertebral body, or other anatomy. These graphical representations may update in real-time so that the user is able to visualize their movement in the guided-haptic mode relative to the target state, virtual boundaries 71, milling path 72, anatomy, etc. For example, the graphical representations of the tool 20 and anatomy may move on the displays 38 in real-time with actual movement of the tool 20 by the manipulator 14 and actual movement of the anatomy.

The guided-haptic mode described herein may be employed in various types of surgical systems. For example, the manipulator may comprise a tele-manipulated robotic arm that is controlled via a user interface that is remotely located relative to the tele-manipulated robotic arm to control the tele-manipulated robotic arm. The user interface may comprise a separate manipulator such as a 6-DOF control unit that is manually manipulated by a user, e.g., a separate manipulator with active joints to provide haptic feedback to the user. This haptic feedback, provided to the user interface, can make use of attractive/repulsive forces and torques to align a guided coordinate system GF to a target coordinate system TF based on generation of guide constraints, etc.

For all of the examples set forth herein, the boundary constraints may be set with a significantly higher stiffness than the guide constraints to minimize penetrations of the tool 20 beyond the virtual boundaries 71.

The principles described herein for attracting the tool 20 to the target state may also be employed to repel the tool 20 from the target state. This may be accomplished by applying the guide constraints in the opposite direction to indicate to the user how the tool 20 needs to be moved to keep away from the target state.

This application is related to U.S. Provisional Patent Application No. 62/815,739, filed on Mar. 8, 2019, the disclosure of which is hereby incorporated herein by reference in its entirety.

Several embodiments have been described in the foregoing description. However, the embodiments discussed herein are not intended to be exhaustive or limit the invention to any particular form. The terminology, which has been used, is intended to be in the nature of words of description rather than of limitation. Many modifications and variations are possible in light of the above teachings and the invention may be practiced otherwise than as specifically described.

V. Clauses

Any aspects or implementations of the systems, methods, and/or techniques described above may be described with reference to any of the following clauses (which are not claims): C1. A hand-held manipulator system for performing surgery, the hand-held manipulator system comprising: a hand-held manipulator comprising a base portion to be held free-hand by a user and a tool tip movable relative to the base portion, the tool tip including a sagittal saw blade; and a control system to control movement of the tool tip, said control system comprising: a guide handler to obtain a target state for the saw blade and generate one or more virtual constraints based on the target state and a current state of the saw blade, the one or more virtual constraints including a guide constraint; a constraint solver to calculate a constraint force adapted to move the saw blade toward the target state based on the one or more virtual constrains; and a virtual simulator to simulate dynamics of the saw blade in a virtual simulation based on input from the constraint force, and to output a commanded pose, the control system being configured to command the hand-held manipulator to move the saw blade based on the commanded pose and to place the saw blade at the target state. C2. The hand-held manipulator system of clause C1, wherein the target state comprises a target position, a target orientation, or a target pose, and the current state comprises a current position, a current orientation, or a current pose. C3. The hand-held manipulator system of clause C2, wherein the one or more virtual constraints comprise up to three virtual constraints associated with the target position and up to three virtual constraints associated with the target orientation. C4. The hand-held manipulator system of clause C1, wherein the target state comprises a target coordinate system and the saw blade comprises a guided coordinate system, the constraint force adapted to attract the guided coordinate system toward the target coordinate system. C5. The hand-held manipulator system of clause C1, wherein the guide handler is configured to compute the one or more virtual constraints with respect to one or more degrees of freedom based on a difference between the current state and the target state. C6. The hand-held manipulator system of clause C1, wherein the control system comprises a user interface to activate the one or more virtual constraints so that the constraint force comprises components of force and torque associated with attracting the saw blade toward the target state. C7. The hand-held manipulator system of clause C1, wherein the guide handler is configured to compute the one or more virtual constraints based on a relationship between the current state and the target state. C8. The hand-held manipulator system of clause C1, wherein each of the one or more virtual constraints has a value for a tuning parameter, the guide handler being configured to change the value of the tuning parameter based on a relationship between the current state and the target state. C9. The hand-held manipulator system of clause C1, wherein the one or more virtual constraints comprises a first virtual constraint that has a first value for a tuning parameter and a second virtual constraint that has a second value for the tuning parameter, the first value being different than the second value so that a resulting constraint force is adapted to move the saw blade more strongly as a result of the first virtual constraint as compared to the second virtual constraint. C10. The hand-held manipulator system of clause C1, wherein the virtual simulator is configured to simulate dynamics of the saw blade by representing the saw blade as a virtual rigid body having a virtual mass and by applying the constraint force to the virtual mass in the virtual simulation to yield the commanded pose. C11. The hand-held manipulator system of clause C1, wherein the control system is configured to: calculate an external force applied to the hand-held robotic saw; and calculate a total force for use in the virtual simulation based on the constraint force and the external force. C12. A hand-held manipulator system comprising: a hand-held manipulator comprising a base portion to be held free-hand by a user and a tool tip movable relative to the base portion, the tool tip including a sagittal saw blade; and a control system to control movement of the tool tip, said control system comprising: a guide handler to obtain a plurality of alignment points and one or more target planes for the saw blade and generate one or more virtual constraints based on relative positions of the plurality of alignment points and the one or more target planes; a constraint solver to calculate a constraint force adapted to move the saw blade toward the one or more target planes based on the one or more virtual constraints; and a virtual simulator to simulate dynamics of the saw blade in a virtual simulation based on input from the constraint force, and to output a commanded pose, the control system being configured to command the manipulator to move the saw blade based on the commanded pose to place the saw blade at the one or more target planes. C13. A method of controlling a saw blade of a hand-held manipulator comprising a base portion to be held free-hand by a user and a tool tip movable relative to the base portion, the tool tip including a sagittal saw blade, the method comprising the steps of: obtaining a target state for the saw blade; generating one or more virtual constraints based on the target state and a current state of the saw blade; calculating a constraint force adapted to move the saw blade toward the target state based on the one or more virtual constraints; simulating dynamics of the saw blade in a virtual simulation based on the constraint force; outputting a commanded pose based on the virtual simulation; and commanding the manipulator to move the saw blade based on the commanded pose to place the saw blade at the target state. C14. The method of clause C13, wherein the target state comprises a target position, a target orientation, or a target pose, and the current state comprises a current position, a current orientation, or a current pose. C15. The method of clause C14, wherein the one or more virtual constraints comprise up to three virtual constraints associated with the target position and up to three virtual constraints associated with the target orientation. C16. The method of clause C13, wherein the target state comprises a target coordinate system and the saw blade comprises a guided coordinate system, the constraint force adapted to move the guided coordinate system toward the target coordinate system. C17. The method of clause C13, comprising computing the one or more virtual constraints with respect to one or more degrees of freedom based on a difference between the current state and the target state. C18. The method of clause C13, comprising activating the one or more virtual constraints so that the constraint force comprises components of force and torque associated with moving the saw blade toward the target state. C19. The method of clause C13, comprising computing the one or more virtual constraints based on a relationship between the current state and the target state. C20. The method of clause C13, comprising changing a value of a tuning parameter of the one or more virtual constraints based on a relationship between the current state and the target state. C21. The method of clause C13, comprising setting a tuning parameter for a first virtual constraint of the one or more virtual constraints at a first value and setting the tuning parameter for a second virtual constraint of the one or more virtual constraints at a second value, the first value being different than the second value so that a resulting constraint force is adapted to move the saw blade more strongly as a result of the first virtual constraint as compared the second virtual constraint. C22. The method of clause C13, comprising simulating dynamics of the saw blade by representing the saw blade as a virtual rigid body having a virtual mass and by applying the constraint force to the virtual mass in the virtual simulation to yield the commanded pose. C23. The method of clause C13, comprising: calculating an external force; and calculating a total force for use in the virtual simulation based on the constraint force and the external force. C24. The method of clause C14, comprising defining three virtual constraints of the one or more virtual constraints to move the saw blade toward a desired cutting plane. C25. A method of guiding a saw blade supported by a hand-held manipulator comprising a base portion to be held free-hand by a user and a tool tip movable relative to the base portion, the tool tip including a sagittal saw blade, the manipulator supporting and moving the saw blade, the method comprising the steps of: obtaining a plurality of alignment points and one or more target planes for the saw blade; generating one or more virtual constraints based on relative positions of the plurality of alignment points and the one or more target planes; calculating a constraint force adapted to move the saw blade toward the one or more target planes based on the one or more virtual constraints; simulating dynamics of the saw blade in a virtual simulation based on the input from the constraint force; outputting a commanded pose based on the virtual simulation; and commanding the manipulator to move the saw blade based on the commanded pose to place the saw blade at the one or more target planes. C26. A method of controlling movement of a saw blade of a hand-held manipulator to create a plurality of features, wherein each of the plurality of features has a different target state for the saw blade, the method comprising the steps of: determining, in a known coordinate system, a current state of the saw blade relative to the target states of the saw blade for the plurality of features to determine which one of the plurality of features is being selected be created; enabling one or more guide constraints for the hand-held manipulator, from a plurality of guide constraints, based on the feature selected; and controlling movement of the saw blade based on the one or more guide constraints, wherein the one or more guide constraints act to place the saw blade at the target state for the feature selected. C27. The method of clause C26, wherein enabling the one or more guide constraints includes generating the one or more guide constraints based on the target state associated with the feature selected and based on the current state of the saw blade and wherein controlling movement of the saw blade based on the one or more guide constraints includes: calculating a constraint force adapted to move the saw blade toward the target state from the current state based on the one or more guide constraints; simulating dynamics of the saw blade in a virtual simulation based at least partially on the constraint force; outputting a commanded pose based on the virtual simulation; and commanding the hand-held manipulator to move the saw blade based on the commanded pose to place the saw blade at the target state. C28. The method of clause C26, wherein determining, in the known coordinate system, the current state of the saw blade relative to the target states of the saw blade for the plurality of features includes determining a location of a plane defined by a saw blade relative to a plurality of cutting planes in the known coordinate system. C29. The method of clause C28, wherein determining, in the known coordinate system, a current state of the saw blade relative to the target states of the saw blade for the plurality of features includes determining angles between a current orientation of the saw blade and a plurality of target orientations of the saw blade, determining distances between a current position of the saw blade and a plurality of target positions of the saw blade, or determining both the angles and the distances, and determining the one of the plurality of features selected based on values of the angles, values of the distances, or both the values of the angles and the values of the distances. C30. The method of clause C26, comprising enabling one or more virtual boundaries for the saw blade based on the feature selected. C31. The method of clause C30, comprising defining a selection region with respect to the plurality of features wherein the one or more virtual boundaries and the one or more guide constraints associated with the feature selected are enabled when the saw blade is inside the selection region to create the feature selected and are disabled when the saw blade is moved outside of the selection region so that a new feature can be created. C32. A hand-held manipulator system for performing surgery, the hand-held manipulator system comprising: a hand-held manipulator comprising a base portion to be held free-hand by a user and a tool tip movable relative to the base portion, the tool tip including a sagittal saw blade; and a control system to control movement of the tool tip, said control system comprising: a guide handler to obtain a target state for the saw blade and generate one or more virtual constraints based on the target state and a current state of the saw blade; and a constraint solver to calculate a constraint force adapted to move the saw blade toward the target state based on the one or more virtual constraints, wherein movement of the saw blade is controlled by the manipulator, based on the constraint force, to place the saw blade at the target state. C33. A hand-held manipulator system for performing surgery, the hand-held manipulator system comprising: a hand-held manipulator comprising a base portion to be held free-hand by a user and a tool tip movable relative to the base portion, the tool tip including a sagittal saw blade; and a control system to control movement of the tool tip, said control system comprising: a guide handler to obtain a plurality of alignment points and one or more target planes for the saw blade and generate one or more virtual constraints based on relative positions of the plurality of alignment points and the one or more target planes; and a constraint solver to calculate a constraint force adapted to move the saw blade toward the one or more target planes based on the one or more virtual constraints, wherein movement of the saw blade is controlled by the manipulator, based on the constraint force, to place the saw blade at the one or more target planes. C34. A method of guiding a saw blade of a hand-held manipulator, the method comprising the steps of: obtaining a target state for the saw blade; generating one or more virtual constraints based on the target state and a current state of the saw blade; calculating a constraint force adapted to move the saw blade toward the target state based on the one or more virtual constraints; and controlling movement of the saw blade based on the constraint force to place the saw blade at the target state. C35. A method of guiding a saw blade supported by a hand-held manipulator, the method comprising the steps of: obtaining a plurality of alignment points and one or more target planes for the saw blade; generating one or more virtual constraints based on relative positions of the plurality of alignment points and the one or more target planes; calculating a constraint force adapted to move the saw blade toward the one or more target planes based on the one or more virtual constraints; and controlling movement of the saw blade based on the constraint force to place the saw blade at the one or more target planes. C36. A hand-held manipulator system for performing surgery, the hand-held manipulator system comprising: a hand-held manipulator comprising a base portion to be held free-hand by a user and a tool tip movable relative to the base portion, the tool tip including a sagittal saw blade; and a control system to control movement of the tool tip, said control system comprising: a guide handler to obtain a target state for the saw blade and generate one or more virtual constraints based on the target state and a current state of the saw blade, the one or more virtual constraints comprising a guide constraint, the guide handler is configured to compute the guide constraint based on a relationship between the current state and the target state, wherein the guide constraint has a value for a tuning parameter, the guide handler being configured to change the value of the tuning parameter based on a relationship between the current state and the target state, a constraint solver to calculate a constraint force adapted to move the saw blade toward the target state based on the guide constraint; and a virtual simulator to simulate dynamics of the saw blade in a virtual simulation based on input from the constraint force, and to output a commanded pose, the control system being configured to command the manipulator to move the saw blade based on the commanded pose and to place the saw blade at the target state. C37. A surgical system comprising: a tool; a manipulator to support the tool and move the tool in response to user forces and torques applied to the tool by a user; one or more sensors to provide a sensor input signal; and a control system comprising: a guide handler to obtain a target state for the tool and generate one or more virtual constraints based on the target state and a current state of the tool; a constraint solver to calculate a constraint force adapted to attract the tool toward the target state or repel the tool away from the target state based on the one or more virtual constraints; and a virtual simulator to simulate dynamics of the tool in a virtual simulation based on the sensor input signal from the one or more sensors and the constraint force, and to output a commanded pose, the control system being configured to command the manipulator to move the tool based on the commanded pose and to thereby provide haptic feedback to the user that guides the user toward placing the tool at the target state or away from the target state.

What is claimed is:

1. A surgical system comprising:
   a tool;
   a manipulator to support the tool and move the tool in response to user forces and torques applied to the tool by a user;
   one or more sensors to measure forces and torques applied to the tool; and
   a control system comprising:
      a guide handler to obtain a target state for the tool and generate one or more virtual constraints based on a relationship between the target state and a current state of the tool, wherein the target state comprises a target position, a target orientation, or a target pose, and the current state comprises a current position, a current orientation, or a current pose;
      a constraint solver to calculate constraint forces adapted to attract the tool toward the target state or repel the tool away from the target state based on the one or more virtual constraints generated by the guide handler; and
      a virtual simulator to simulate dynamics of the tool in a virtual simulation based on input from the one or more sensors and the constraint forces calculated by the constraint solver, and to output commanded poses,
      the control system being configured to command the manipulator to move the tool based on the commanded poses outputted by the virtual simulator, and to thereby provide haptic feedback to the user that guides the user toward placing the tool at the target state or away from the target state.

2. The surgical system of claim 1, wherein the one or more virtual constraints comprise up to three virtual constraints associated with the target position and up to three virtual constraints associated with the target orientation.

3. The surgical system of claim 1, wherein the control system is configured to enable the user to reorient the tool away from the target orientation.

4. The surgical system of claim 1, wherein the control system is configured to enable the user to reposition the tool away from the target position.

5. The surgical system of claim 1, wherein the target state comprises a target coordinate system and the tool comprises a guided coordinate system, the constraint forces adapted to attract the guided coordinate system toward the target coordinate system.

6. The surgical system of claim 1, wherein the guide handler is configured to compute the one or more virtual constraints with respect to one or more degrees of freedom based on a difference between the current state and the target state.

7. The surgical system of claim 1, wherein the control system comprises a user interface to activate the one or more virtual constraints so that the constraint forces comprises components of force and torque associated with attracting the tool toward the target state.

8. The surgical system of claim 1, wherein each of the one or more virtual constraints has a value for a tuning parameter, the guide handler being configured to change the value of the tuning parameter based on a relationship between the current state and the target state.

9. The surgical system of claim 1, wherein the one or more virtual constraints comprises a first virtual constraint that has a first value for a tuning parameter and a second virtual constraint that has a second value for the tuning parameter, the first value being different than the second value so that the calculated constraint forces are is adapted to attract or repel the tool more strongly as a result of the first virtual constraint as compared the second virtual constraint.

10. The surgical system of claim 1, wherein the virtual simulator is configured to simulate dynamics of the tool by representing the tool as a virtual rigid body having a virtual mass and by applying the constraint forces to the virtual mass in the virtual simulation to yield the commanded poses.

11. The surgical system of claim 1, wherein the control system is configured to:
   calculate an external force based on input from the one or more sensors; and
   calculate a total force for use in the virtual simulation based on the constraint forces and the external force, wherein the external force is capable of having components of force with magnitude and direction sufficient to overcome the constraint forces.

12. The surgical system of claim 1, wherein the tool comprises a bur or a drill and the one or more virtual constraints comprise two virtual constraints defined to attract the bur or the drill toward a desired orientation.

13. The surgical system of claim 1, wherein the tool comprises a bur and the one or more virtual constraints comprise three virtual constraints defined to attract the bur toward a desired starting position.

14. The surgical system of claim 1, wherein the tool comprises a saw blade and the one or more virtual constraints comprise three virtual constraints defined to attract the saw blade toward a desired cutting plane.

15. A method of guiding a tool supported by a manipulator of a surgical system, the manipulator supporting and moving the tool in response to user forces and torques applied to the tool by a user, the method comprising the steps of:
   receiving input from one or more sensors that measure forces and torques applied to the tool;
   obtaining a target state for the tool, the target state comprises a target position, a target orientation, or a target pose;
   generating one or more virtual constraints based on a relationship between the target state and a current state of the tool, wherein the current state comprises a current position, a current orientation, or a current pose;
   calculating constraint forces adapted to attract the tool toward the target state or repel the tool away from the target state based on the one or more virtual constraints generated from the relationship between the target state and the current state;
   simulating dynamics of the tool in a virtual simulation based on the input from the one or more sensors and the constraint forces; outputting commanded poses based on the virtual simulation; and commanding the manipulator to move the tool based on the commanded poses to thereby provide haptic feedback to the user that guides the user toward placing the tool at the target state or away from the target state.

16. The method of claim 15, wherein the one or more virtual constraints comprise up to three virtual constraints associated with the target position and up to three virtual constraints associated with the target orientation.

17. The method of claim 15, comprising enabling the user to reorient the tool away from the target orientation.

18. The method of claim 15, comprising enabling the user to reposition the tool away from the target position.

19. The method of claim 15, wherein the target state comprises a target coordinate system and the tool comprises a guided coordinate system, the constraint forces adapted to attract the guided coordinate system toward the target coordinate system.

20. The method of claim 15, comprising computing the one or more virtual constraints with respect to one or more degrees of freedom based on a difference between the current state and the target state.

21. The method of claim 15, comprising activating the one or more virtual constraints so that the constraint forces comprise components of force and torque associated with attracting the tool toward the target state.

22. The method of claim 15, comprising changing a value of a tuning parameter of the one or more virtual constraints based on a relationship between the current state and the target state.

23. The method of claim 15, comprising setting a tuning parameter for a first virtual constraint of the one or more virtual constraints at a first value and setting the tuning parameter for a second virtual constraint of the one or more virtual constraints at a second value, the first value being different than the second value so that the calculated constraint forces are is adapted to attract or repel the tool more strongly as a result of the first virtual constraint as compared the second virtual constraint.

24. The method of claim 15, comprising simulating dynamics of the tool by representing the tool as a virtual rigid body having a virtual mass and by applying the constraint forces to the virtual mass in the virtual simulation to poses.

25. The method of claim 15, comprising:
calculating an external force based on the input from the one or more sensors; and
calculating a total force for use in the virtual simulation based on the constraint forces and the external force, wherein the external force is capable of having components of force with magnitude and direction sufficient to overcome the constraint forces.

26. The method of claim 15, comprising defining two virtual constraints of the one or more virtual constraints to attract the tool toward a desired orientation, wherein the tool comprises a bur or a drill.

27. The method of claim 15, comprising defining three virtual constraints of the one or more virtual constraints to attract the tool toward a desired starting position, wherein the tool comprises a bur.

28. The method of claim 15, comprising defining three virtual constraints of the one or more virtual constraints to attract the tool toward a desired cutting plane, wherein the tool comprises a saw blade.

29. A surgical system comprising:
a tool;
a manipulator to support the tool and move the tool; and
a control system comprising:
  a guide handler to obtain a target state for the tool and generate one or more virtual constraints based on a relationship between the target state and a current state of the tool, wherein the target state comprises a target position, a target orientation, or a target pose, and the current state comprises a current position, a current orientation, or a current pose; and
  a constraint solver to calculate constraint forces force adapted to attract the tool toward the target state or repel the tool away from the target state based on the one or more virtual constraints generated by the guide handler,
wherein movement of the tool is controlled by the manipulator, based on the constraint forces based on the output of the guide handler and constraint solver, to provide haptic feedback to guide a user toward placing the tool at the target state or away from the target state.

30. A method of guiding a tool supported by a manipulator of a surgical system, the method comprising the steps of:
obtaining a target state for the tool wherein the target state comprises a target position, a target orientation, or a target pose;
generating one or more virtual constraints based on a relationship between the target state and a current state of the tool, wherein the current state comprises a current position, a current orientation, or a current pose;
calculating constraint forces force adapted to attract the tool toward the target state or repel the tool away from the target state based on the one or more virtual constraints generated based on the relationship between the target state and the current state; and
controlling movement of the tool based on the constraint forces to provide haptic feedback that guides a user toward placing the tool at the target state or away from the target state.

31. The surgical system of claim 29, wherein the one or more virtual constraints comprise up to three virtual constraints associated with the target position and up to three virtual constraints associated with the target orientation.

32. The surgical system of claim 29, wherein the control system is configured to enable the user to reorient the tool away from the target orientation.

* * * * *